US012574208B2

(12) United States Patent
McNutt et al.

(10) Patent No.: US 12,574,208 B2
(45) Date of Patent: Mar. 10, 2026

(54) DATA ENCRYPTION AND DECRYPTION USING SCREENS AND LFSR-GENERATED LOGIC BLOCKS

(71) Applicant: CERULEANT SYSTEMS, LLC, Crystal, MN (US)

(72) Inventors: Jason McNutt, Plymouth, MN (US); Amy J. Witty, Plymouth, MN (US); Scott Hanson, North Oaks, MN (US)

(73) Assignee: CERULEANT SYSTEMS, LLC, Plymouth, MN (US)

( * ) Notice: Subject to any disclaimer, the term of this patent is extended or adjusted under 35 U.S.C. 154(b) by 477 days.

(21) Appl. No.: 18/075,792

(22) Filed: Dec. 6, 2022

(65) Prior Publication Data

US 2024/0187209 A1    Jun. 6, 2024

(51) Int. Cl.
H04L 9/06    (2006.01)

(52) U.S. Cl.
CPC .................................. H04L 9/0618 (2013.01)

(58) Field of Classification Search
None
See application file for complete search history.

(56) References Cited

U.S. PATENT DOCUMENTS

| | | | |
|---|---|---|---|
| 5,003,596 A | 3/1991 | Wood | |
| 6,668,325 B1 | 12/2003 | Collberg et al. | |
| 7,103,180 B1 | 9/2006 | McGregor, Jr. | |
| 8,588,406 B2 | 11/2013 | Dellow et al. | |

| | | | |
|---|---|---|---|
| 9,635,011 B1 | 4/2017 | Wu et al. | |
| 2001/0009579 A1 | 7/2001 | Inoha et al. | |
| 2004/0003282 A1 | 1/2004 | Smith | |
| 2005/0251865 A1 | 11/2005 | Mont et al. | |
| 2007/0121943 A1 | 5/2007 | Dellow et al. | |
| 2010/0195820 A1 | 8/2010 | Frank | |
| 2011/0194687 A1 | 8/2011 | Brothers | |

(Continued)

FOREIGN PATENT DOCUMENTS

| | | |
|---|---|---|
| CN | 106788974 A | 5/2017 |
| IN | 202411012346 A1 | 3/2024 |
| WO | 2016/187529 | 11/2016 |

OTHER PUBLICATIONS

US 9,251,311 B2, 02/2016, Guirguis et al. (withdrawn)

(Continued)

*Primary Examiner* — Nicholas P Celani
(74) *Attorney, Agent, or Firm* — Stinson LLP

(57)    ABSTRACT

A data encryption method using linear-feedback shift registers (LFSRs) is disclosed. The method includes identifying one or more objects each of which comprises a sequence of object bits, and using each object to generate a plurality of logic blocks by: creating an LFSR seed comprising at least a portion of the object bits of the object, wherein the LFSR seed provides an initial state of an LFSR; implementing the LFSR to generate a plurality of LFSR outputs; and using the LFSR outputs to generate the logic blocks. The method also includes encrypting a plurality of data blocks in accordance with an encryption scheme that applies a screen and the LFSR-generated logic blocks. The encrypted data blocks may then be decrypted in accordance with a decryption scheme that applies an inverse screen and the same LFSR-generated logic blocks that were used in the encryption scheme.

50 Claims, 61 Drawing Sheets

100a

| | A | B | C | D | E | F | G | H |
|---|---|---|---|---|---|---|---|---|
| 1 | 0 | 1 | 2 | 3 | 4 | 5 | 6 | 7 |
| 2 | 8 | 9 | 10 | 11 | 12 | 13 | 14 | 15 |
| 3 | 16 | 17 | 18 | 19 | 20 | 21 | 22 | 23 |
| 4 | 24 | 25 | 26 | 27 | 28 | 29 | 30 | 31 |
| 5 | 32 | 33 | 34 | 35 | 36 | 37 | 38 | 39 |
| 6 | 40 | 41 | 42 | 43 | 44 | 45 | 46 | 47 |
| 7 | 48 | 49 | 50 | 51 | 52 | 53 | 54 | 55 |
| 8 | 56 | 57 | 58 | 59 | 60 | 61 | 62 | 63 |

100b y

| | 0 | 1 | 2 | 3 | 4 | 5 | 6 | 7 | x |
|---|---|---|---|---|---|---|---|---|---|
| 0 | 0 | 1 | 2 | 3 | 4 | 5 | 6 | 7 | |
| -1 | 8 | 9 | 10 | 11 | 12 | 13 | 14 | 15 | |
| -2 | 16 | 17 | 18 | 19 | 20 | 21 | 22 | 23 | |
| -3 | 24 | 25 | 26 | 27 | 28 | 29 | 30 | 31 | |
| -4 | 32 | 33 | 34 | 35 | 36 | 37 | 38 | 39 | |
| -5 | 40 | 41 | 42 | 43 | 44 | 45 | 46 | 47 | |
| -6 | 48 | 49 | 50 | 51 | 52 | 53 | 54 | 55 | |
| -7 | 56 | 57 | 58 | 59 | 60 | 61 | 62 | 63 | |

(56) References Cited

U.S. PATENT DOCUMENTS

| | | | |
|---|---|---|---|
| 2012/0159186 A1 | 6/2012 | Farrugia et al. | |
| 2014/0380037 A1 | 12/2014 | Matsuda et al. | |
| 2015/0229621 A1 | 8/2015 | Kariman et al. | |
| 2016/0026829 A1* | 1/2016 | Brocker | G06F 21/87 |
| | | | 726/34 |
| 2017/0293572 A1 | 10/2017 | Satpathy et al. | |
| 2017/0331624 A1 | 11/2017 | Samid | |
| 2017/0353302 A1 | 12/2017 | Fernandez et al. | |
| 2018/0097618 A1* | 4/2018 | Kumar | H03K 19/215 |
| 2019/0007390 A1 | 1/2019 | Wu et al. | |
| 2020/0159944 A1* | 5/2020 | McNutt | H04L 9/3247 |
| 2020/0169383 A1 | 5/2020 | Durham et al. | |
| 2021/0211271 A1 | 7/2021 | Kuang et al. | |
| 2021/0258514 A1 | 8/2021 | Braness et al. | |
| 2022/0358203 A1 | 11/2022 | Qureshi et al. | |

OTHER PUBLICATIONS

International Search Report and Written Opinion from related PCT application, PCT/US2023/082467, dated Mar. 13, 2024 (14 pgs).

Armknecht, F., et al., Article, "A Guide to Fully Homomorphic Encryption", IACR Cryptology ePrint Archive (2015) (35 pgs).

NIST, FIPS PUB 197: Announcing the Advanced Encryption Standard (AES), 2001. (51 pgs).

International Search Report and Written Opinion for related application, PCT/US2018/054807, mailed on Feb. 8, 2019 (21 pgs).

* cited by examiner

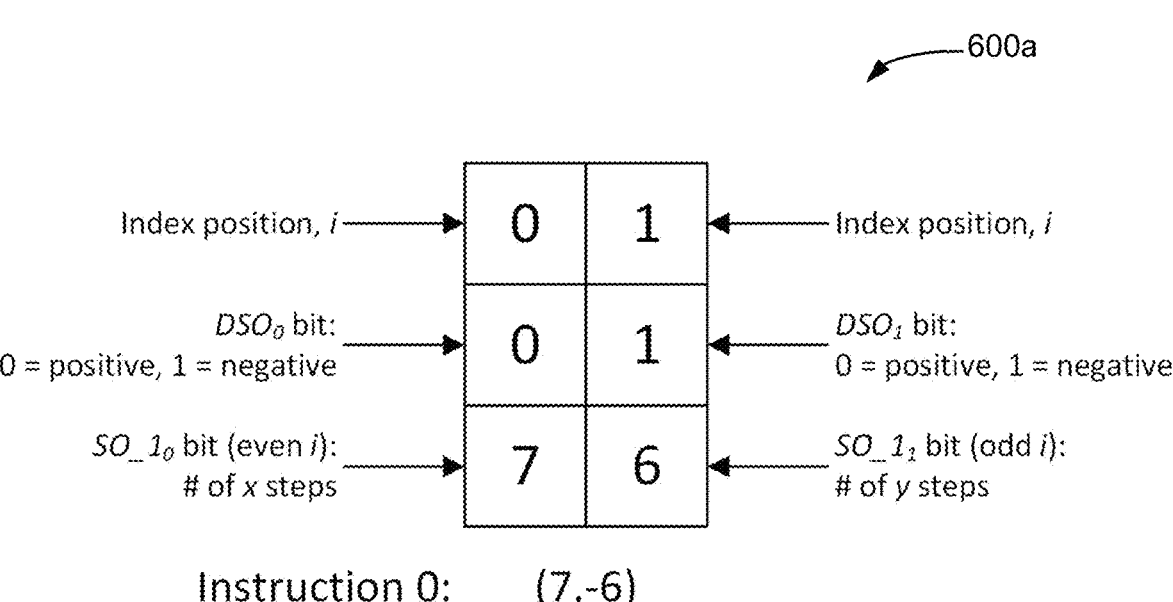
Instruction 0:     (7,-6)
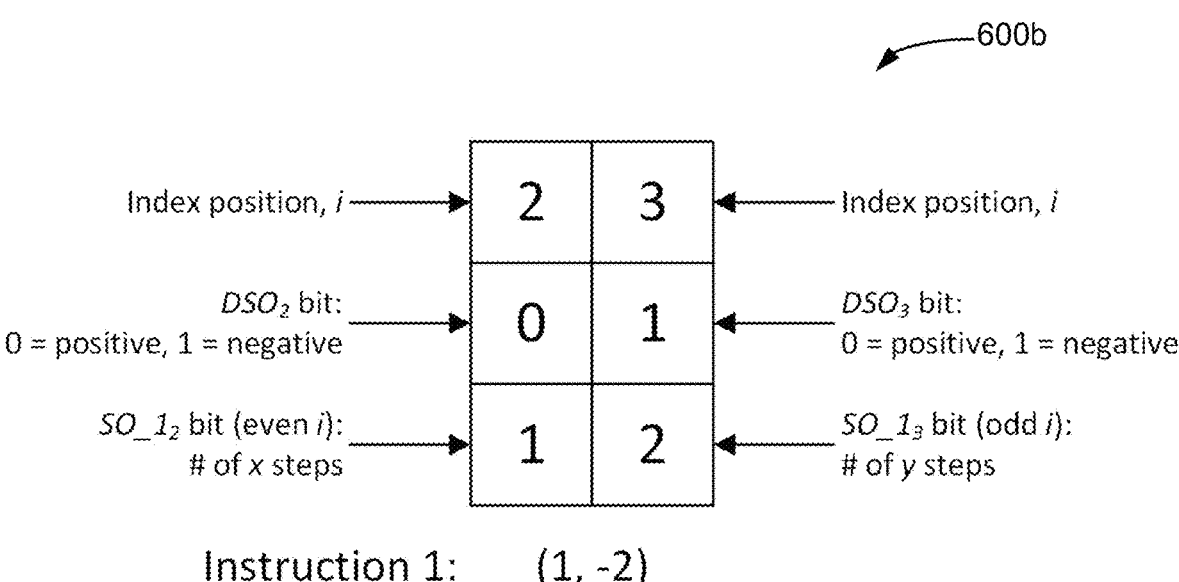
Instruction 1:     (1, -2)
FIG. 6

| Input Block | | | | Output Block | |
|---|---|---|---|---|---|
| Index | Cell | | | Index | Cell |
| 0 | A1 | remaps to → | | 7 | B3 |
| 1 | B1 | remaps to → | | 2 | C1 |
| 2 | C1 | remaps to → | | 4 | B2 |
| 3 | A2 | remaps to → | | 6 | A3 |
| 4 | B2 | remaps to → | | 8 | C3 |
| 5 | C2 | remaps to → | | 0 | A1 |
| 6 | A3 | remaps to → | | 3 | A2 |
| 7 | B3 | remaps to → | | 1 | B1 |
| 8 | C3 | remaps to → | | 5 | C2 |

Figure 14:
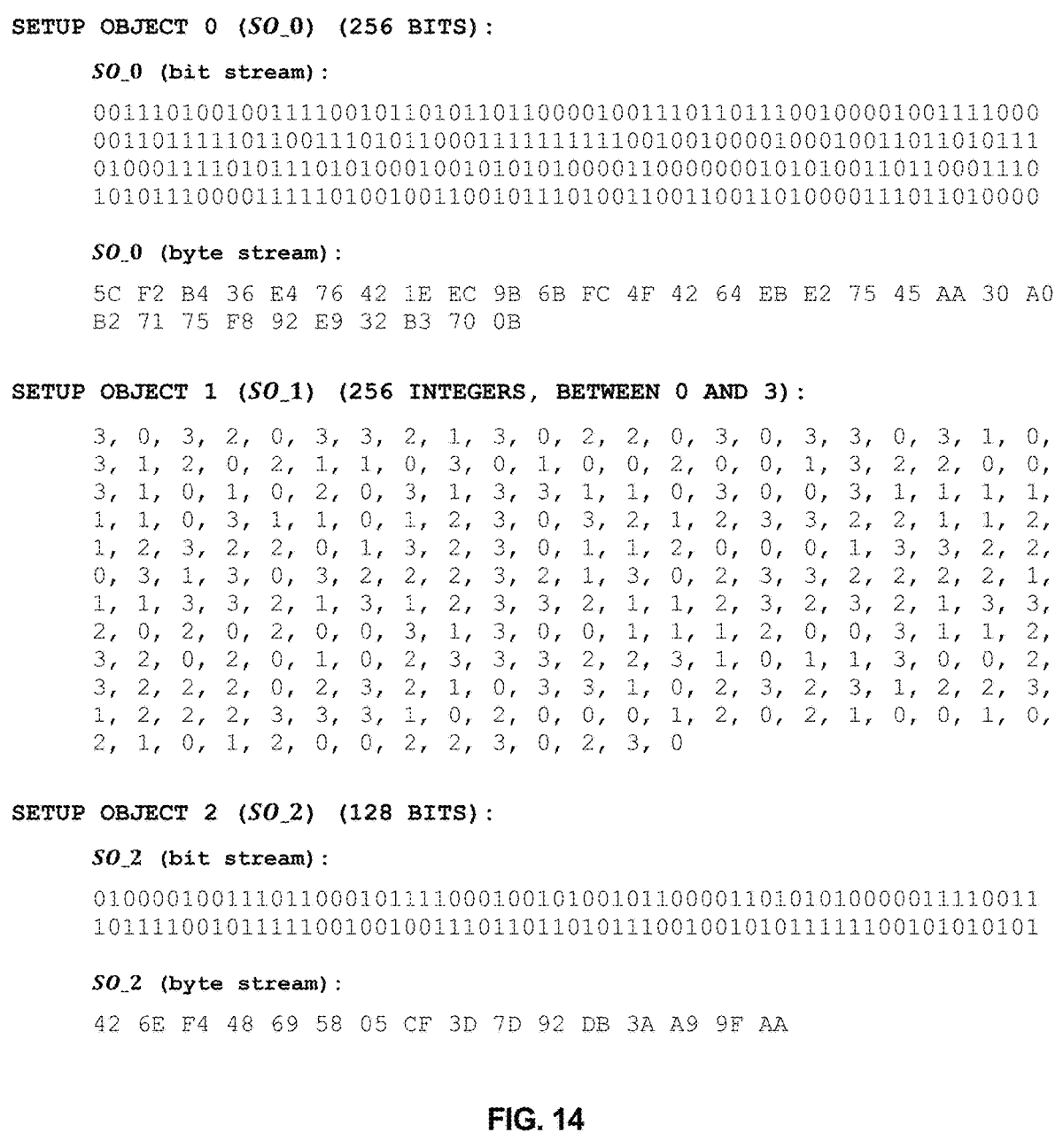

**SETUP OBJECT 0 (*SO_0*) (256 BITS):**

*SO_0* (bit stream):

00111010010011110010110101101100001001110110111001000010011111000
00110111110110011101011000111111111100100100001000100110110101111
01000111101011101010001001010101000011000000010101001101100011100
10101110000111110100100110010111010011001100110100001110110100000

*SO_0* (byte stream):

5C  F2  B4  36  E4  76  42  1E  EC  9B  6B  FC  4F  42  64  EB  E2  75  45  AA  30  A0
B2  71  75  F8  92  E9  32  B3  70  0B

**SETUP OBJECT 1 (*SO_1*) (256 INTEGERS, BETWEEN 0 AND 3):**

3, 0, 3, 2, 0, 3, 3, 2, 1, 3, 0, 2, 2, 0, 3, 0, 3, 3, 0, 3, 1, 0,
3, 1, 2, 0, 2, 1, 1, 0, 3, 0, 1, 0, 0, 2, 0, 0, 1, 3, 2, 2, 0, 0,
3, 1, 0, 1, 0, 2, 0, 3, 1, 3, 3, 1, 1, 0, 3, 0, 0, 3, 1, 1, 1, 1,
1, 1, 0, 3, 1, 1, 0, 1, 2, 3, 0, 3, 2, 1, 2, 3, 3, 2, 2, 1, 1, 2,
1, 2, 3, 2, 2, 0, 1, 3, 2, 3, 0, 1, 1, 2, 0, 0, 0, 1, 3, 3, 2, 2,
0, 3, 1, 3, 0, 3, 2, 2, 2, 3, 2, 1, 3, 0, 2, 3, 3, 2, 2, 2, 2, 1,
1, 1, 3, 3, 2, 1, 3, 1, 2, 3, 3, 2, 1, 1, 2, 3, 2, 3, 2, 1, 3, 3,
2, 0, 2, 0, 2, 0, 0, 3, 1, 3, 0, 0, 1, 1, 1, 2, 0, 0, 3, 1, 1, 2,
3, 2, 0, 2, 0, 1, 0, 2, 3, 3, 3, 2, 2, 3, 1, 0, 1, 1, 3, 0, 0, 2,
3, 2, 2, 2, 0, 2, 3, 2, 1, 0, 3, 3, 1, 0, 2, 3, 2, 3, 1, 2, 2, 3,
1, 2, 2, 2, 3, 3, 3, 1, 0, 2, 0, 0, 0, 1, 2, 0, 2, 1, 0, 0, 1, 0,
2, 1, 0, 1, 2, 0, 0, 2, 2, 3, 0, 2, 3, 0

**SETUP OBJECT 2 (*SO_2*) (128 BITS):**

*SO_2* (bit stream):

01000010011101100010111100010010100101100001101010100000011110011
10111100101111100100100111011011010111001001010111111001010101 01

*SO_2* (byte stream):

Figure 15A:
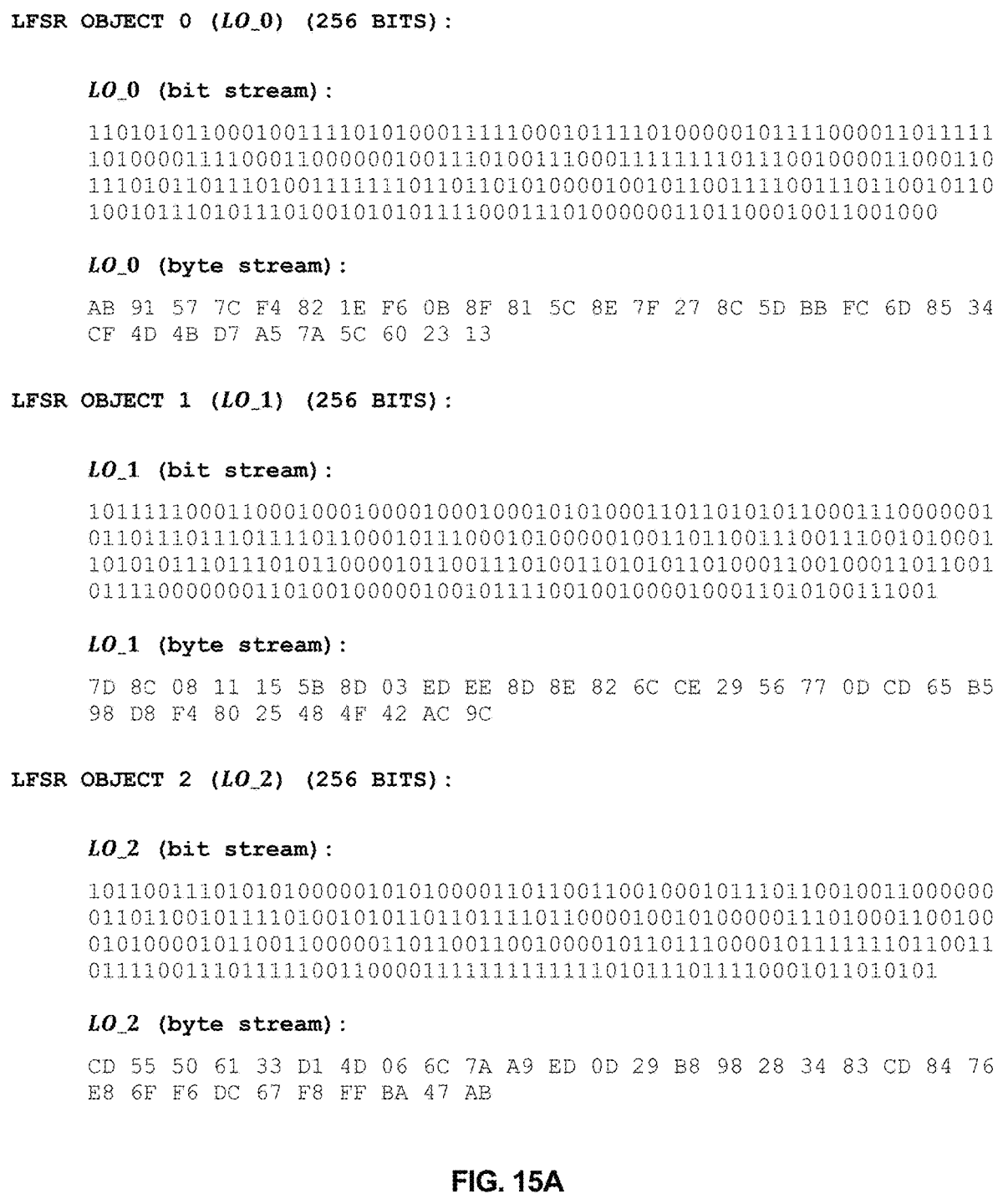

LFSR OBJECT 0 (*LO_0*) (256 BITS):

*LO_0* (bit stream):

11010101100010011110101000111110001011110100000101111000011011111
   10100001111000110000001001110100111000111111110111001000011000110
   11101011011101001111111011011010100001001011001111001110110010110
   100101110101110100101010111100011101000000110110001001100100 0

*LO_0* (byte stream):

AB 91 57 7C F4 82 1E F6 0B 8F 81 5C 8E 7F 27 8C 5D BB FC 6D 85 34
   CF 4D 4B D7 A5 7A 5C 60 23 13

LFSR OBJECT 1 (*LO_1*) (256 BITS):

*LO_1* (bit stream):

10111110001100010001000010001000101010001101101010110001110000001
   01101110111011110110001011100010100000100110110011100111001010001
   10101011101110101100001011001110100110101011010001100100011011001
   0111100000001101001000001001011100100100000100011010100111001

*LO_1* (byte stream):

7D 8C 08 11 15 5B 8D 03 ED EE 8D 8E 82 6C CE 29 56 77 0D CD 65 B5
   98 D8 F4 80 25 48 4F 42 AC 9C

LFSR OBJECT 2 (*LO_2*) (256 BITS):

*LO_2* (bit stream):

10110011101010100000101010000110110011001000101110110010011000000
   01101100101111010010101101101111011000010010100000111010001100100
   01010000101100110000011011001100100001011011100001011111110110011
   0111100111011111001100001111111111110101110111100010110101 01

*LO_2* (byte stream):

Figure 15B:
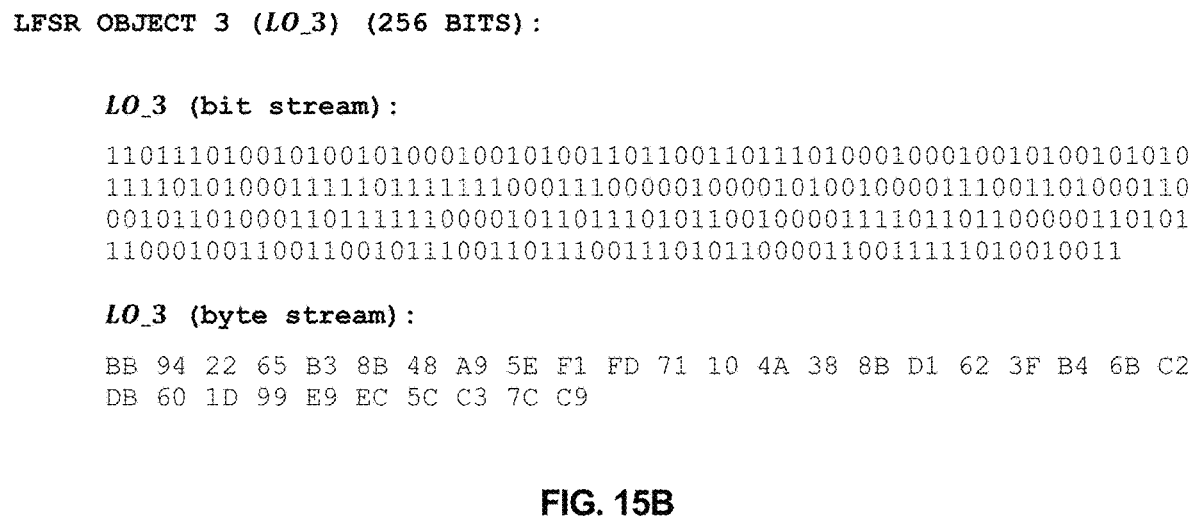

LFSR OBJECT 3 (*LO_3*) (256 BITS):

*LO_3* (bit stream):

1101110100101001010001001010011011001101110100010001001010100101010
1111010100011111011111110001110000010000101001000011100110100011̲0
0010110100011011111100001011011101011001000011110110110000011010̲1
1100010011001100101110011011100111010110000110011111010010011

*LO_3* (byte stream):

INITIALIZATION VECTOR

BINARY IV SETUP OBJECT (BIVSO) (256 BITS):

BIVSO (bit stream):

0011011011100001001101011010101001110110100000010110011110110011
1000011010010110000010111100010011100101101010111100100110000101 0
0010000010010110010111000010110000001100010100000100111101010110 0
1100010100010110101001001010010111011101110000011001010001010

BIVSO (Byte stream):

6C 87 AC 55 6E 81 E6 8D C3 D2 A0 47 4E AB 27 43 11 A4 E9 D0 C0 28
C8 AB 19 45 2B 29 DD 1D 4C 51

IV OFFSET VECTOR $(p, q)$:

$(2, -3)$

LFSR OBJECT PARAMETERS:

| XOR Block | LFSR Object | LFSR Seed Length $\lambda$ | LFSR Rate $\rho$ | Start Bit Position $i$ | Tap Bit Positions |
|---|---|---|---|---|---|
| A | LO_0 | 129 | 16 | 199 | 128, 123 |
| B | LO_2 | 130 | 16 | 42 | 129, 126 |
| C | LO_3 | 131 | 16 | 252 | 130, 129, 83, 82 |
| D | LO_1 | 132 | 16 | 18 | 131, 102 |

FIG. 16

Figures 17, 18:
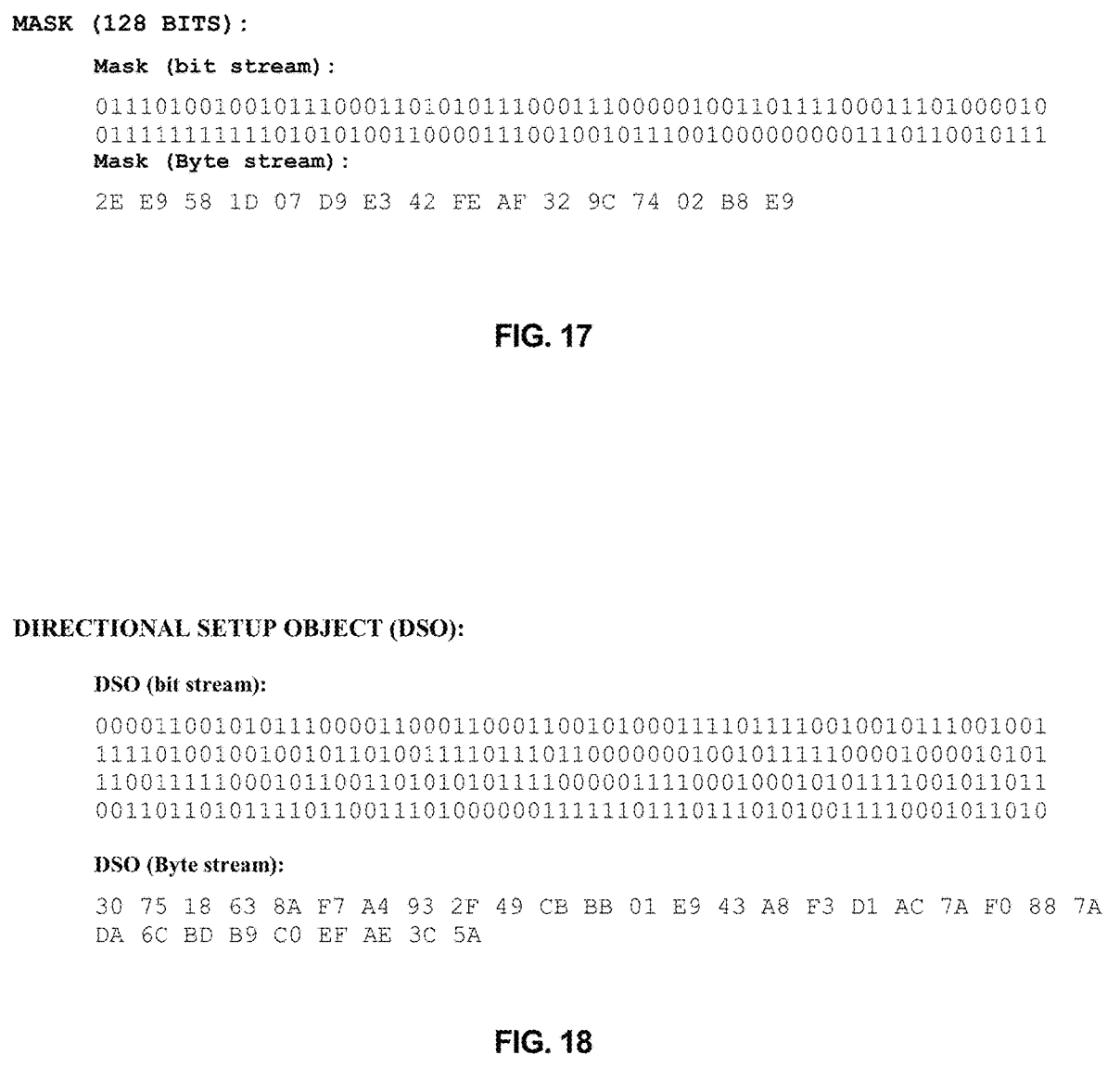

MASK (128 BITS):

Mask (bit stream):

01110100100101110001101010111000111000001001101111100011101000010
01111111111101010100110000111001001011100100000000001110110010111

Mask (Byte stream):

DIRECTIONAL SETUP OBJECT (DSO):

DSO (bit stream):

00001100101011100001100011000110010100011110111100100010111001001
11110100100100101101001111011101100000001001011111000010000010101
11001111100010110011010101011110000011110001000101011110010110110
01101101011110110011101000000111111011101110101001111000101110 10

DSO (Byte stream):

| $i$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| DSO | 0 | 0 | 0 | 0 | 1 | 1 | 0 | 0 | 1 | 0 | 1 | 0 | 1 | 1 | 1 | 0 |
| $SO\_1$ | 3 | 0 | 3 | 2 | 0 | 3 | 3 | 2 | 1 | 3 | 0 | 2 | 2 | 0 | 3 | 0 |

| $i$ | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| DSO | 0 | 0 | 0 | 1 | 1 | 0 | 0 | 0 | 1 | 1 | 0 | 0 | 0 | 1 | 1 | 0 |
| $SO\_1$ | 3 | 3 | 0 | 3 | 1 | 0 | 3 | 1 | 2 | 0 | 2 | 1 | 1 | 0 | 3 | 0 |

| $i$ | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| DSO | 0 | 1 | 0 | 1 | 0 | 0 | 0 | 1 | 1 | 1 | 1 | 0 | 1 | 1 | 1 | 1 |
| $SO\_1$ | 1 | 0 | 0 | 2 | 0 | 0 | 1 | 3 | 2 | 2 | 0 | 0 | 3 | 1 | 0 | 1 |

| $i$ | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|
| DSO | 0 | 0 | 1 | 0 | 0 | 1 | 0 | 1 | 1 | 1 | 0 | 0 | 1 | 0 | 0 | 1 |
| $SO\_1$ | 0 | 2 | 0 | 3 | 1 | 3 | 3 | 1 | 1 | 0 | 3 | 0 | 0 | 3 | 1 | 1 |

| $i$ | 64 | 65 | 66 | 67 | 68 | 69 | 70 | 71 | 72 | 73 | 74 | 75 | 76 | 77 | 78 | 79 |
|---|---|---|---|---|---|---|---|---|---|---|---|---|---|---|---|---|
| DSO | 1 | 1 | 1 | 1 | 0 | 1 | 0 | 0 | 1 | 0 | 0 | 1 | 0 | 0 | 1 | 0 |
| $SO\_1$ | 1 | 1 | 1 | 1 | 0 | 3 | 1 | 1 | 0 | 1 | 2 | 3 | 0 | 3 | 2 | 1 |

| $i$ | 80 | 81 | 82 | 83 | 84 | 85 | 86 | 87 | 88 | 89 | 90 | 91 | 92 | 93 | 94 | 95 |
|---|---|---|---|---|---|---|---|---|---|---|---|---|---|---|---|---|
| DSO | 1 | 1 | 0 | 1 | 0 | 0 | 1 | 1 | 1 | 1 | 0 | 1 | 1 | 1 | 0 | 1 |
| $SO\_1$ | 2 | 3 | 3 | 2 | 2 | 1 | 1 | 2 | 1 | 2 | 3 | 2 | 2 | 0 | 1 | 3 |

| $i$ | 96 | 97 | 98 | 99 | 100 | 101 | 102 | 103 | 104 | 105 | 106 | 107 | 108 | 109 | 110 | 111 |
|---|---|---|---|---|---|---|---|---|---|---|---|---|---|---|---|---|
| DSO | 1 | 0 | 0 | 0 | 0 | 0 | 0 | 0 | 1 | 0 | 0 | 1 | 0 | 1 | 1 | 1 |
| $SO\_1$ | 2 | 3 | 0 | 1 | 1 | 2 | 0 | 0 | 0 | 1 | 3 | 3 | 2 | 2 | 0 | 3 |

| $i$ | 112 | 113 | 114 | 115 | 116 | 117 | 118 | 119 | 120 | 121 | 122 | 123 | 124 | 125 | 126 | 127 |
|---|---|---|---|---|---|---|---|---|---|---|---|---|---|---|---|---|
| DSO | 1 | 1 | 0 | 0 | 0 | 0 | 1 | 0 | 0 | 0 | 0 | 1 | 0 | 1 | 0 | 1 |
| $SO\_1$ | 1 | 3 | 0 | 3 | 2 | 2 | 2 | 3 | 2 | 1 | 3 | 0 | 2 | 3 | 3 | 2 |

| $i$ | 128 | 129 | 130 | 131 | 132 | 133 | 134 | 135 | 136 | 137 | 138 | 139 | 140 | 141 | 142 | 143 |
|---|---|---|---|---|---|---|---|---|---|---|---|---|---|---|---|---|
| DSO | 1 | 1 | 0 | 0 | 1 | 1 | 1 | 1 | 1 | 0 | 0 | 0 | 1 | 0 | 1 | 1 |
| $SO\_1$ | 2 | 2 | 2 | 1 | 1 | 1 | 3 | 3 | 2 | 1 | 3 | 1 | 2 | 3 | 3 | 2 |

| $i$ | 144 | 145 | 146 | 147 | 148 | 149 | 150 | 151 | 152 | 153 | 154 | 155 | 156 | 157 | 158 | 159 |
|---|---|---|---|---|---|---|---|---|---|---|---|---|---|---|---|---|
| DSO | 0 | 0 | 1 | 1 | 0 | 1 | 0 | 1 | 0 | 1 | 0 | 1 | 1 | 1 | 1 | 0 |
| $SO\_1$ | 1 | 1 | 2 | 3 | 2 | 3 | 2 | 1 | 3 | 3 | 2 | 0 | 2 | 0 | 2 | 0 |

FIG. 19A

| $i$ | 160 | 161 | 162 | 163 | 164 | 165 | 166 | 167 | 168 | 169 | 170 | 171 | 172 | 173 | 174 | 175 |
|---|---|---|---|---|---|---|---|---|---|---|---|---|---|---|---|---|
| DSO | 0 | 0 | 0 | 0 | 1 | 1 | 1 | 1 | 0 | 0 | 0 | 1 | 0 | 0 | 0 | 1 |
| $SO\_1$ | 0 | 3 | 1 | 3 | 0 | 0 | 1 | 1 | 1 | 2 | 0 | 0 | 3 | 1 | 1 | 2 |

| $i$ | 176 | 177 | 178 | 179 | 180 | 181 | 182 | 183 | 184 | 185 | 186 | 187 | 188 | 189 | 190 | 191 |
|---|---|---|---|---|---|---|---|---|---|---|---|---|---|---|---|---|
| DSO | 0 | 1 | 0 | 1 | 1 | 1 | 1 | 0 | 0 | 1 | 0 | 1 | 1 | 0 | 1 | 1 |
| $SO\_1$ | 3 | 2 | 0 | 2 | 0 | 1 | 0 | 2 | 3 | 3 | 3 | 2 | 2 | 3 | 1 | 0 |

| $i$ | 192 | 193 | 194 | 195 | 196 | 197 | 198 | 199 | 200 | 201 | 202 | 203 | 204 | 205 | 206 | 207 |
|---|---|---|---|---|---|---|---|---|---|---|---|---|---|---|---|---|
| DSO | 0 | 0 | 1 | 1 | 0 | 1 | 1 | 0 | 1 | 0 | 1 | 1 | 1 | 1 | 0 | 1 |
| $SO\_1$ | 1 | 1 | 3 | 0 | 0 | 2 | 3 | 2 | 2 | 2 | 0 | 2 | 3 | 2 | 1 | 0 |

| $i$ | 208 | 209 | 210 | 211 | 212 | 213 | 214 | 215 | 216 | 217 | 218 | 219 | 220 | 221 | 222 | 223 |
|---|---|---|---|---|---|---|---|---|---|---|---|---|---|---|---|---|
| DSO | 1 | 0 | 0 | 1 | 1 | 1 | 0 | 1 | 0 | 0 | 0 | 0 | 0 | 0 | 1 | 1 |
| $SO\_1$ | 3 | 3 | 1 | 0 | 2 | 3 | 2 | 3 | 1 | 2 | 2 | 3 | 1 | 2 | 2 | 2 |

| $i$ | 224 | 225 | 226 | 227 | 228 | 229 | 230 | 231 | 232 | 233 | 234 | 235 | 236 | 237 | 238 | 239 |
|---|---|---|---|---|---|---|---|---|---|---|---|---|---|---|---|---|
| DSO | 1 | 1 | 1 | 1 | 0 | 1 | 1 | 1 | 0 | 1 | 1 | 1 | 0 | 1 | 0 | 1 |
| $SO\_1$ | 3 | 3 | 3 | 1 | 0 | 2 | 0 | 0 | 0 | 1 | 2 | 0 | 2 | 1 | 0 | 0 |

| $i$ | 240 | 241 | 242 | 243 | 244 | 245 | 246 | 247 | 248 | 249 | 250 | 251 | 252 | 253 | 254 | 255 |
|---|---|---|---|---|---|---|---|---|---|---|---|---|---|---|---|---|
| DSO | 0 | 0 | 1 | 1 | 1 | 1 | 0 | 0 | 0 | 1 | 0 | 1 | 1 | 0 | 1 | 0 |
| $SO\_1$ | 1 | 0 | 2 | 1 | 0 | 1 | 2 | 0 | 0 | 2 | 2 | 3 | 0 | 2 | 3 | 0 |

FIG. 19B

| Sub-Screen | $i_B$ | $i_R$ | $\Delta x$ | $\Delta y$ | $(\Delta x, \Delta y)$ |
|---|---|---|---|---|---|
| 1 | 0 | 0 | 3 | 0 | (3,0) |
| 1 | 1 | 1 | 3 | 2 | (3,2) |
| 1 | 2 | 2 | 0 | -3 | (0,-3) |
| 1 | 3 | 3 | 3 | 2 | (3,2) |
| 1 | 4 | 4 | -1 | 3 | (-1,3) |
| 1 | 5 | 5 | 0 | 2 | (0,2) |
| 1 | 6 | 6 | -2 | 0 | (-2,0) |
| 1 | 7 | 7 | -3 | 0 | (-3,0) |
| 1 | 8 | 8 | 3 | 3 | (3,3) |
| 1 | 9 | 9 | 0 | -3 | (0,-3) |
| 1 | 10 | 10 | -1 | 0 | (-1,0) |
| 1 | 11 | 11 | 3 | 1 | (3,1) |
| 1 | 12 | 12 | -2 | 0 | (-2,0) |
| 1 | 13 | 13 | 2 | 1 | (2,1) |
| 1 | 14 | 14 | 1 | 0 | (1,0) |
| 1 | 15 | 15 | -3 | 0 | (-3,0) |
| 2 | 16 | 0 | 1 | 0 | (1,0) |
| 2 | 17 | 1 | 0 | -2 | (0,-2) |
| 2 | 18 | 2 | 0 | 0 | (0,0) |
| 2 | 19 | 3 | 1 | -3 | (1,-3) |
| 2 | 20 | 4 | -2 | -2 | (-2,-2) |
| 2 | 21 | 5 | 0 | 0 | (0,0) |
| 2 | 22 | 6 | -3 | -1 | (-3,-1) |
| 2 | 23 | 7 | 0 | -1 | (0,-1) |
| 2 | 24 | 8 | 0 | 2 | (0,2) |
| 2 | 25 | 9 | 0 | 3 | (0,3) |
| 2 | 26 | 10 | 1 | -3 | (1,-3) |
| 2 | 27 | 11 | 3 | -1 | (3,-1) |
| 2 | 28 | 12 | -1 | 0 | (-1,0) |
| 2 | 29 | 13 | 3 | 0 | (3,0) |
| 2 | 30 | 14 | 0 | 3 | (0,3) |
| 2 | 31 | 15 | 1 | -1 | (1,-1) |
| 3 | 32 | 0 | -1 | -1 | (-1,-1) |
| 3 | 33 | 1 | -1 | -1 | (-1,-1) |
| 3 | 34 | 2 | 0 | -3 | (0,-3) |
| 3 | 35 | 3 | 1 | 1 | (1,1) |
| 3 | 36 | 4 | 0 | 1 | (0,1) |
| 3 | 37 | 5 | 2 | -3 | (2,-3) |
| 3 | 38 | 6 | 0 | 3 | (0,3) |
| 3 | 39 | 7 | -2 | 1 | (-2,1) |
| 3 | 40 | 8 | -2 | -3 | (-2,-3) |
| 3 | 41 | 9 | 3 | -2 | (3,-2) |
| 3 | 42 | 10 | 2 | 1 | (2,1) |
| 3 | 43 | 11 | -1 | -2 | (-1,-2) |
| 3 | 44 | 12 | -1 | -2 | (-1,-2) |
| 3 | 45 | 13 | 3 | -2 | (3,-2) |
| 3 | 46 | 14 | -2 | 0 | (-2,0) |
| 3 | 47 | 15 | 1 | -3 | (1,-3) |
| 4 | 48 | 0 | -2 | 3 | (-2,3) |
| 4 | 49 | 1 | 0 | 1 | (0,1) |
| 4 | 50 | 2 | 1 | 2 | (1,2) |
| 4 | 51 | 3 | 0 | 0 | (0,0) |
| 4 | 52 | 4 | 0 | 1 | (0,1) |
| 4 | 53 | 5 | 3 | -3 | (3,-3) |
| 4 | 54 | 6 | 2 | -2 | (2,-2) |
| 4 | 55 | 7 | 0 | -3 | (0,-3) |
| 4 | 56 | 8 | -1 | -3 | (-1,-3) |
| 4 | 57 | 9 | 0 | 3 | (0,3) |
| 4 | 58 | 10 | 2 | 2 | (2,2) |
| 4 | 59 | 11 | -2 | 3 | (-2,3) |
| 4 | 60 | 12 | 2 | 1 | (2,1) |
| 4 | 61 | 13 | 3 | 0 | (3,0) |
| 4 | 62 | 14 | 2 | -3 | (2,-3) |
| 4 | 63 | 15 | 3 | -2 | (3,-2) |
| 5 | 64 | 0 | -2 | -2 | (-2,-2) |
| 5 | 65 | 1 | 2 | 1 | (2,1) |
| 5 | 66 | 2 | -1 | -1 | (-1,-1) |
| 5 | 67 | 3 | -3 | -3 | (-3,-3) |
| 5 | 68 | 4 | -2 | 1 | (-2,1) |
| 5 | 69 | 5 | 3 | 1 | (3,1) |

FIG. 20A

| Sub-Screen | $i_B$ | $i_R$ | $\Delta x$ | $\Delta y$ | $(\Delta x, \Delta y)$ |
|---|---|---|---|---|---|
| 5 | 70 | 6 | -2 | 3 | (-2,3) |
| 5 | 71 | 7 | -3 | -2 | (-3,-2) |
| 5 | 72 | 8 | 1 | 1 | (1,1) |
| 5 | 73 | 9 | -2 | -3 | (-2,-3) |
| 5 | 74 | 10 | 2 | -3 | (2,-3) |
| 5 | 75 | 11 | 2 | -1 | (2,-1) |
| 5 | 76 | 12 | 3 | -3 | (3,-3) |
| 5 | 77 | 13 | 2 | 0 | (2,0) |
| 5 | 78 | 14 | -2 | 0 | (-2,0) |
| 5 | 79 | 15 | -2 | 0 | (-2,0) |
| 6 | 80 | 0 | 0 | 3 | (0,3) |
| 6 | 81 | 1 | 1 | 3 | (1,3) |
| 6 | 82 | 2 | 0 | 0 | (0,0) |
| 6 | 83 | 3 | -1 | -1 | (-1,-1) |
| 6 | 84 | 4 | 1 | 2 | (1,2) |
| 6 | 85 | 5 | 0 | 0 | (0,0) |
| 6 | 86 | 6 | 3 | 1 | (3,1) |
| 6 | 87 | 7 | 1 | -2 | (1,-2) |
| 6 | 88 | 8 | 3 | -2 | (3,-2) |
| 6 | 89 | 9 | 0 | -2 | (0,-2) |
| 6 | 90 | 10 | 0 | -1 | (0,-1) |
| 6 | 91 | 11 | 0 | 2 | (0,2) |
| 6 | 92 | 12 | 3 | -3 | (3,-3) |
| 6 | 93 | 13 | 3 | -2 | (3,-2) |
| 6 | 94 | 14 | -2 | 3 | (-2,3) |
| 6 | 95 | 15 | -1 | 0 | (-1,0) |
| 7 | 96 | 0 | 1 | 1 | (1,1) |
| 7 | 97 | 1 | -3 | 0 | (-3,0) |
| 7 | 98 | 2 | 0 | -2 | (0,-2) |

| Sub-Screen | $i_B$ | $i_R$ | $\Delta x$ | $\Delta y$ | $(\Delta x, \Delta y)$ |
|---|---|---|---|---|---|
| 7 | 99 | 3 | -3 | 2 | (-3,2) |
| 7 | 100 | 4 | -2 | 2 | (-2,2) |
| 7 | 101 | 5 | 0 | -2 | (0,-2) |
| 7 | 102 | 6 | -3 | -2 | (-3,-2) |
| 7 | 103 | 7 | 1 | 0 | (1,0) |
| 7 | 104 | 8 | -3 | 3 | (-3,3) |
| 7 | 105 | 9 | 1 | 0 | (1,0) |
| 7 | 106 | 10 | -2 | -3 | (-2,-3) |
| 7 | 107 | 11 | 2 | -3 | (2,-3) |
| 7 | 108 | 12 | 1 | 2 | (1,2) |
| 7 | 109 | 13 | 2 | 3 | (2,3) |
| 7 | 110 | 14 | 1 | 2 | (1,2) |
| 7 | 111 | 15 | -2 | -2 | (-2,-2) |
| 8 | 112 | 0 | -3 | -3 | (-3,-3) |
| 8 | 113 | 1 | -3 | -1 | (-3,-1) |
| 8 | 114 | 2 | 0 | -2 | (0,-2) |
| 8 | 115 | 3 | 0 | 0 | (0,0) |
| 8 | 116 | 4 | 0 | -1 | (0,-1) |
| 8 | 117 | 5 | -2 | 0 | (-2,0) |
| 8 | 118 | 6 | 2 | -1 | (2,-1) |
| 8 | 119 | 7 | 0 | 0 | (0,0) |
| 8 | 120 | 8 | 1 | 0 | (1,0) |
| 8 | 121 | 9 | -2 | -1 | (-2,-1) |
| 8 | 122 | 10 | 0 | -1 | (0,-1) |
| 8 | 123 | 11 | 2 | 0 | (2,0) |
| 8 | 124 | 12 | 0 | -2 | (0,-2) |
| 8 | 125 | 13 | 2 | -3 | (2,-3) |
| 8 | 126 | 14 | 0 | 2 | (0,2) |
| 8 | 127 | 15 | -3 | 0 | (-3,0) |

FIG. 20B

Mask (Sub-Screen 1)
|   | A | B | C | D |
|---|---|---|---|---|
| 1 | 0 | 1 | 1 | 1 |
| 2 | 0 | 1 | 0 | 0 |
| 3 | 1 | 0 | 0 | 1 |
| 4 | 0 | 1 | 1 | 1 |
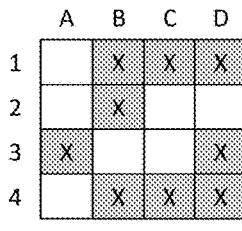
Mask (Sub-Screen 2)
|   | A | B | C | D |
|---|---|---|---|---|
| 1 | 0 | 0 | 0 | 1 |
| 2 | 1 | 0 | 1 | 0 |
| 3 | 1 | 0 | 1 | 1 |
| 4 | 1 | 0 | 0 | 0 |
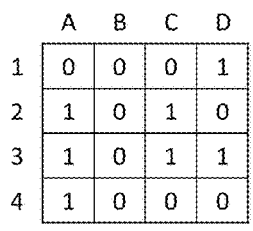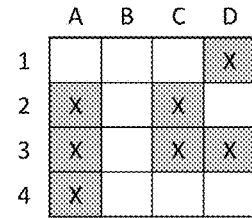
Mask (Sub-Screen 3)
|   | A | B | C | D |
|---|---|---|---|---|
| 1 | 1 | 1 | 1 | 0 |
| 2 | 0 | 0 | 0 | 0 |
| 3 | 1 | 0 | 0 | 1 |
| 4 | 1 | 0 | 1 | 1 |
Mask (Sub-Screen 4)
|   | A | B | C | D |
|---|---|---|---|---|
| 1 | 1 | 1 | 0 | 0 |
| 2 | 0 | 1 | 1 | 1 |
| 3 | 0 | 1 | 0 | 0 |
| 4 | 0 | 0 | 1 | 0 |
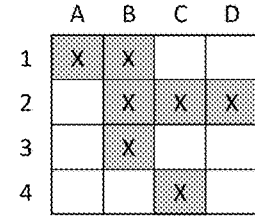
Mask (Sub-Screen 5)
|   | A | B | C | D |
|---|---|---|---|---|
| 1 | 0 | 1 | 1 | 1 |
| 2 | 1 | 1 | 1 | 1 |
| 3 | 1 | 1 | 1 | 1 |
| 4 | 0 | 1 | 0 | 1 |
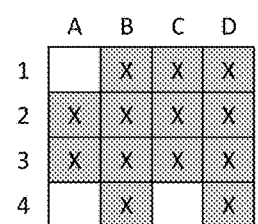
Mask (Sub-Screen 6)
|   | A | B | C | D |
|---|---|---|---|---|
| 1 | 0 | 1 | 0 | 0 |
| 2 | 1 | 1 | 0 | 0 |
| 3 | 0 | 0 | 1 | 1 |
| 4 | 1 | 0 | 0 | 1 |
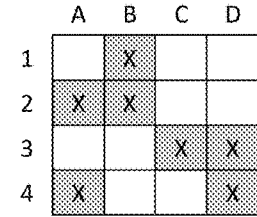
Mask (Sub-Screen 7)
|   | A | B | C | D |
|---|---|---|---|---|
| 1 | 0 | 0 | 1 | 0 |
| 2 | 1 | 1 | 1 | 0 |
| 3 | 0 | 1 | 0 | 0 |
| 4 | 0 | 0 | 0 | 0 |
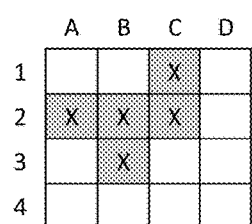
Mask (Sub-Screen 8)
|   | A | B | C | D |
|---|---|---|---|---|
| 1 | 0 | 0 | 0 | 1 |
| 2 | 1 | 1 | 0 | 1 |
| 3 | 1 | 0 | 0 | 1 |
| 4 | 0 | 1 | 1 | 1 |
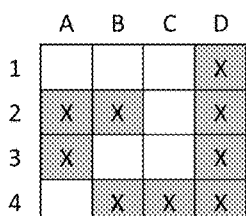
FIG. 21

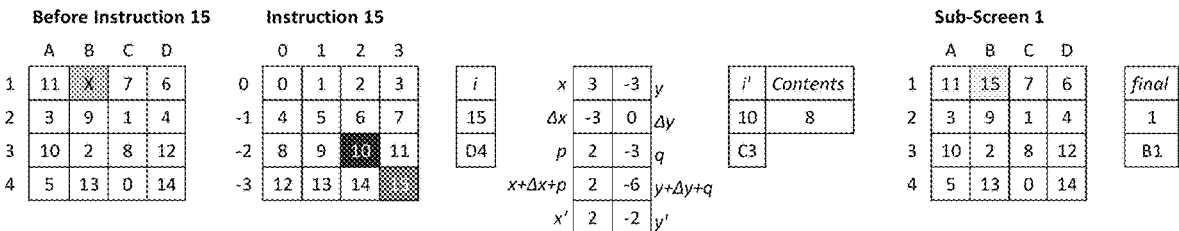
FIG. 22D
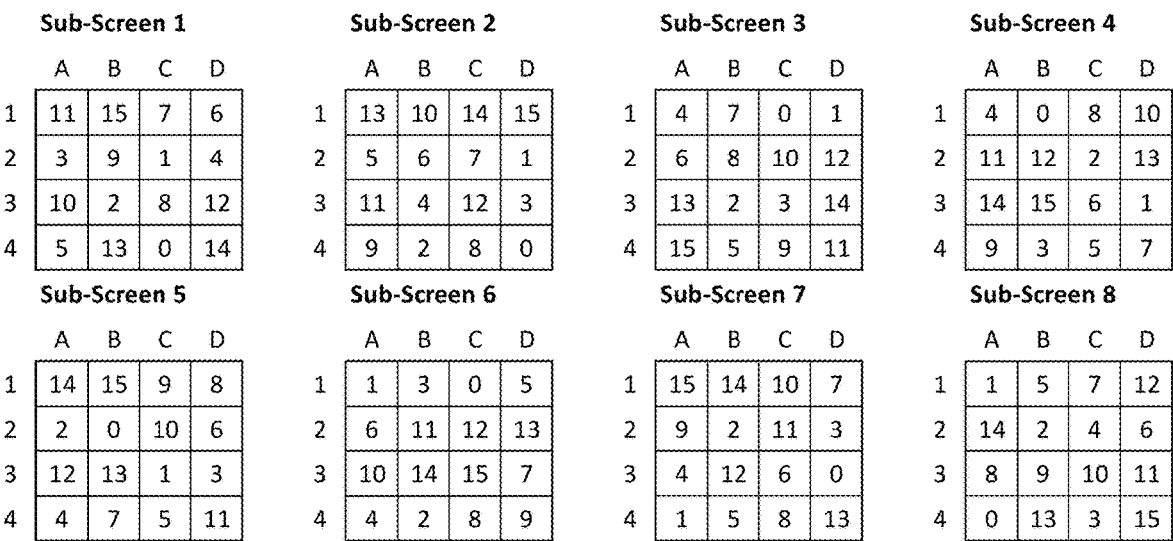
FIG. 23
Screen
| | A | B | C | D | E | F | G | H | I | J | K | L | M | N | O | P |
|---|---|---|---|---|---|---|---|---|---|---|---|---|---|---|---|---|
| from Sub-Screen 1 --> 1 | 11 | 15 | 7 | 6 | 3 | 9 | 1 | 4 | 10 | 2 | 8 | 12 | 5 | 13 | 0 | 14 |
| from Sub-Screen 2 --> 2 | 29 | 26 | 30 | 31 | 21 | 22 | 23 | 17 | 27 | 20 | 28 | 19 | 25 | 18 | 24 | 16 |
| from Sub-Screen 3 --> 3 | 36 | 39 | 32 | 33 | 38 | 40 | 42 | 44 | 45 | 34 | 35 | 46 | 47 | 37 | 41 | 43 |
| from Sub-Screen 4 --> 4 | 52 | 48 | 56 | 58 | 59 | 60 | 50 | 61 | 62 | 63 | 54 | 49 | 57 | 51 | 53 | 55 |
| from Sub-Screen 5 --> 5 | 78 | 79 | 73 | 72 | 66 | 64 | 74 | 70 | 76 | 77 | 65 | 67 | 68 | 71 | 69 | 75 |
| from Sub-Screen 6 --> 6 | 81 | 83 | 80 | 85 | 86 | 91 | 92 | 93 | 90 | 94 | 95 | 87 | 84 | 82 | 88 | 89 |
| from Sub-Screen 7 --> 7 | 111 | 110 | 106 | 103 | 105 | 98 | 107 | 99 | 100 | 108 | 102 | 96 | 97 | 101 | 104 | 109 |
| from Sub-Screen 8 --> 8 | 113 | 117 | 119 | 124 | 126 | 114 | 116 | 118 | 120 | 121 | 122 | 123 | 112 | 125 | 115 | 127 |
FIG. 24

Screen

| | A | B | C | D | E | F | G | H | I | J | K | L | M | N | O | P |
|---|---|---|---|---|---|---|---|---|---|---|---|---|---|---|---|---|
| 1 | 11 | 15 | 7 | 6 | 3 | 9 | 1 | 4 | 10 | 2 | 8 | 12 | 5 | 13 | 0 | 14 |
| 2 | 29 | 26 | 30 | 31 | 21 | 22 | 23 | 17 | 27 | 20 | 28 | 19 | 25 | 18 | 24 | 16 |
| 3 | 36 | 39 | 32 | 33 | 38 | 40 | 42 | 44 | 45 | 34 | 35 | 46 | 47 | 37 | 41 | 43 |
| 4 | 52 | 48 | 56 | 58 | 59 | 60 | 50 | 61 | 62 | 63 | 54 | 49 | 57 | 51 | 53 | 55 |
| 5 | 78 | 79 | 73 | 72 | 66 | 64 | 74 | 70 | 76 | 77 | 65 | 67 | 68 | 71 | 69 | 75 |
| 6 | 81 | 83 | 80 | 85 | 86 | 91 | 92 | 93 | 90 | 94 | 95 | 87 | 84 | 82 | 88 | 89 |
| 7 | 111 | 110 | 106 | 103 | 105 | 98 | 107 | 99 | 100 | 108 | 102 | 96 | 97 | 101 | 104 | 109 |
| 8 | 113 | 117 | 119 | 124 | 126 | 114 | 116 | 118 | 120 | 121 | 122 | 123 | 112 | 125 | 115 | 127 |

| | A | B | C | D | E | F | G | H | I | J | K | L | M | N | O | P |
|---|---|---|---|---|---|---|---|---|---|---|---|---|---|---|---|---|
| 1 | L1 | P1 | H1 | G1 | D1 | J1 | B1 | E1 | K1 | C1 | I1 | M1 | F1 | N1 | A1 | O1 |
| 2 | N2 | K2 | O2 | P2 | F2 | G2 | H2 | B2 | L2 | E2 | M2 | D2 | J2 | C2 | I2 | A2 |
| 3 | E3 | H3 | A3 | B3 | G3 | I3 | K3 | M3 | N3 | C3 | D3 | O3 | P3 | F3 | J3 | L3 |
| 4 | E4 | A4 | I4 | K4 | L4 | M4 | C4 | N4 | O4 | P4 | G4 | B4 | J4 | D4 | F4 | H4 |
| 5 | O5 | P5 | J5 | I5 | C5 | A5 | K5 | G5 | M5 | N5 | B5 | D5 | E5 | H5 | F5 | L5 |
| 6 | B6 | D6 | A6 | F6 | G6 | L6 | M6 | N6 | K6 | O6 | P6 | H6 | E6 | C6 | I6 | J6 |
| 7 | P7 | O7 | K7 | H7 | J7 | C7 | L7 | D7 | E7 | M7 | G7 | A7 | B7 | F7 | I7 | N7 |
| 8 | B8 | F8 | H8 | M8 | O8 | C8 | E8 | G8 | I8 | J8 | K8 | L8 | A8 | N8 | D8 | P8 |

FIG. 25

Inverse Screen

| | A | B | C | D | E | F | G | H | I | J | K | L | M | N | O | P |
|---|---|---|---|---|---|---|---|---|---|---|---|---|---|---|---|---|
| 1 | 14 | 6 | 9 | 4 | 7 | 12 | 3 | 2 | 10 | 5 | 8 | 0 | 11 | 13 | 15 | 1 |
| 2 | 31 | 23 | 29 | 27 | 25 | 20 | 21 | 22 | 30 | 28 | 17 | 24 | 26 | 16 | 18 | 19 |
| 3 | 34 | 35 | 41 | 42 | 32 | 45 | 36 | 33 | 37 | 46 | 38 | 47 | 39 | 40 | 43 | 44 |
| 4 | 49 | 59 | 54 | 61 | 48 | 62 | 58 | 63 | 50 | 60 | 51 | 52 | 53 | 55 | 56 | 57 |
| 5 | 69 | 74 | 68 | 75 | 76 | 78 | 71 | 77 | 67 | 66 | 70 | 79 | 72 | 73 | 64 | 65 |
| 6 | 82 | 80 | 93 | 81 | 92 | 83 | 84 | 91 | 94 | 95 | 88 | 85 | 86 | 87 | 89 | 90 |
| 7 | 107 | 108 | 101 | 103 | 104 | 109 | 106 | 99 | 110 | 100 | 98 | 102 | 105 | 111 | 97 | 96 |
| 8 | 124 | 112 | 117 | 126 | 118 | 113 | 119 | 114 | 120 | 121 | 122 | 123 | 115 | 125 | 116 | 127 |

| | A | B | C | D | E | F | G | H | I | J | K | L | M | N | O | P |
|---|---|---|---|---|---|---|---|---|---|---|---|---|---|---|---|---|
| 1 | O1 | G1 | J1 | E1 | H1 | M1 | D1 | C1 | K1 | F1 | I1 | A1 | L1 | N1 | P1 | B1 |
| 2 | P2 | H2 | N2 | L2 | J2 | E2 | F2 | G2 | O2 | M2 | B2 | I2 | K2 | A2 | C2 | D2 |
| 3 | C3 | D3 | J3 | K3 | A3 | N3 | E3 | B3 | F3 | O3 | G3 | P3 | H3 | I3 | L3 | M3 |
| 4 | B4 | L4 | G4 | N4 | A4 | O4 | K4 | P4 | C4 | M4 | D4 | E4 | F4 | H4 | I4 | J4 |
| 5 | F5 | K5 | E5 | L5 | M5 | O5 | H5 | N5 | D5 | C5 | G5 | P5 | I5 | J5 | A5 | B5 |
| 6 | C6 | A6 | N6 | B6 | M6 | D6 | E6 | L6 | O6 | P6 | I6 | F6 | G6 | H6 | J6 | K6 |
| 7 | L7 | M7 | F7 | H7 | I7 | N7 | K7 | D7 | O7 | E7 | C7 | G7 | J7 | P7 | B7 | A7 |
| 8 | M8 | A8 | F8 | O8 | G8 | B8 | H8 | C8 | I8 | J8 | K8 | L8 | D8 | N8 | E8 | P8 |

FIG. 26

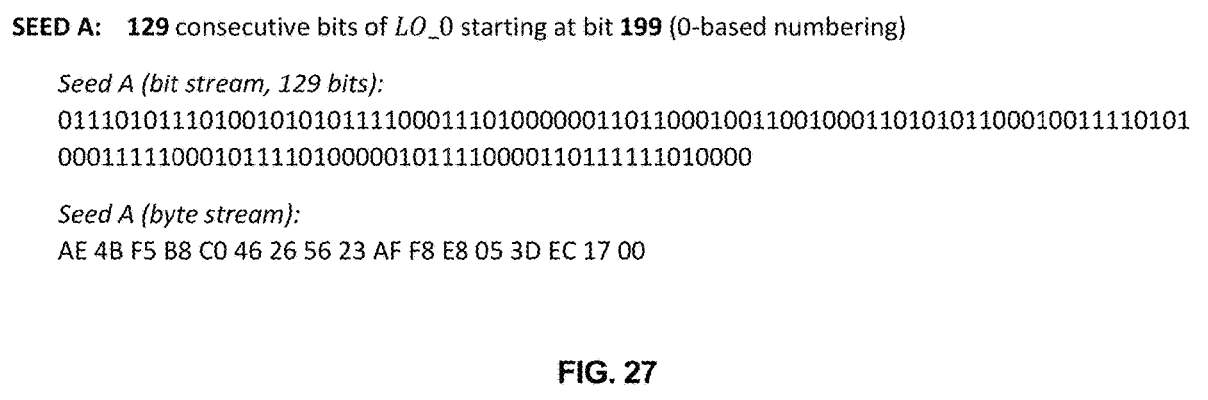

SEED A:   129 consecutive bits of *LO_0* starting at bit 199 (0-based numbering)

*Seed A (bit stream, 129 bits):*
01110101110100101010111100011101000000011011000100110010001101010110001001110101
0001111100010111101000000101111000011011111111010000

*Seed A (byte stream):*
AE 4B F5 B8 C0 46 26 56 23 AF F8 E8 05 3D EC 17 00

FIG. 27

| LFSR step | bit 0 (output) | bit 1 | bit 2 | bit 3 | bit 4 | bit 5 | ... | bit 118 | bit 119 | bit 120 | bit 121 | bit 122 | bit 123 (tap) | bit 124 | bit 125 | bit 126 | bit 127 | bit 128 (tap) |
|---|---|---|---|---|---|---|---|---|---|---|---|---|---|---|---|---|---|---|
| 0 (seed) | 0 | 1 | 1 | 1 | 0 | 1 | ... | 1 | 1 | 1 | 1 | 1 | 0 | 1 | 0 | 0 | 0 | 0 |
| 1 | 0 | 0 | 1 | 1 | 1 | 0 | ... | 1 | 1 | 1 | 1 | 1 | 1 | 0 | 1 | 0 | 0 | 0 |
| 2 | 1 | 0 | 0 | 1 | 1 | 1 | ... | 0 | 1 | 1 | 1 | 1 | 1 | 1 | 0 | 1 | 0 | 0 |
| 3 | 1 | 1 | 0 | 0 | 1 | 1 | ... | 1 | 0 | 1 | 1 | 1 | 1 | 1 | 1 | 0 | 1 | 0 |
| 4 | 1 | 1 | 1 | 0 | 0 | 1 | ... | 1 | 1 | 0 | 1 | 1 | 1 | 1 | 1 | 1 | 0 | 1 |
| 5 | 0 | 1 | 1 | 1 | 0 | 0 | ... | 0 | 1 | 1 | 0 | 1 | 1 | 1 | 1 | 1 | 1 | 0 |
| 6 | 1 | 0 | 1 | 1 | 1 | 0 | ... | 0 | 0 | 1 | 1 | 0 | 1 | 1 | 1 | 1 | 1 | 1 |
| 7 | 0 | 1 | 0 | 1 | 1 | 1 | ... | 0 | 0 | 0 | 1 | 1 | 0 | 1 | 1 | 1 | 1 | 1 |
| 8 | 1 | 0 | 1 | 0 | 1 | 1 | ... | 0 | 0 | 0 | 0 | 1 | 1 | 0 | 1 | 1 | 1 | 1 |
| 9 | 0 | 1 | 0 | 1 | 0 | 1 | ... | 1 | 0 | 0 | 0 | 0 | 1 | 1 | 0 | 1 | 1 | 1 |
| 10 | 0 | 0 | 1 | 0 | 1 | 0 | ... | 1 | 1 | 0 | 0 | 0 | 0 | 1 | 1 | 0 | 1 | 1 |
| 11 | 1 | 0 | 0 | 1 | 0 | 1 | ... | 1 | 1 | 1 | 0 | 0 | 0 | 0 | 1 | 1 | 0 | 1 |
| 12 | 1 | 1 | 0 | 0 | 1 | 0 | ... | 1 | 1 | 1 | 1 | 0 | 0 | 0 | 0 | 1 | 1 | 0 |
| 13 | 0 | 1 | 1 | 0 | 0 | 1 | ... | 0 | 1 | 1 | 1 | 1 | 0 | 0 | 0 | 0 | 1 | 1 |
| 14 | 1 | 0 | 1 | 1 | 0 | 0 | ... | 1 | 0 | 1 | 1 | 1 | 1 | 0 | 0 | 0 | 0 | 1 |
| 15 | 0 | 1 | 0 | 1 | 1 | 0 | ... | 0 | 1 | 0 | 1 | 1 | 1 | 1 | 0 | 0 | 0 | 0 |
| 16 | 1 | 0 | 1 | 0 | 1 | 1 | ... | 0 | 0 | 1 | 0 | 1 | 1 | 1 | 1 | 0 | 0 | 0 |
| 17 | 1 | 1 | 0 | 1 | 0 | 1 | ... | 0 | 0 | 0 | 1 | 0 | 1 | 1 | 1 | 1 | 0 | 0 |
| 18 | 1 | 1 | 1 | 0 | 1 | 0 | ... | 0 | 0 | 0 | 0 | 1 | 0 | 1 | 1 | 1 | 1 | 0 |
| 19 | 0 | 1 | 1 | 1 | 0 | 1 | ... | 0 | 0 | 0 | 0 | 0 | 1 | 0 | 1 | 1 | 1 | 1 |
| 20 | 0 | 0 | 1 | 1 | 1 | 0 | ... | 1 | 0 | 0 | 0 | 0 | 0 | 1 | 0 | 1 | 1 | 1 |
| 21 | 1 | 0 | 0 | 1 | 1 | 1 | ... | 0 | 1 | 0 | 0 | 0 | 0 | 0 | 1 | 0 | 1 | 1 |
| 22 | 1 | 1 | 0 | 0 | 1 | 1 | ... | 1 | 0 | 1 | 0 | 0 | 0 | 0 | 0 | 1 | 0 | 1 |
| 23 | 1 | 1 | 1 | 0 | 0 | 1 | ... | 1 | 1 | 0 | 1 | 0 | 0 | 0 | 0 | 0 | 1 | 0 |
| 24 | 0 | 1 | 1 | 1 | 0 | 0 | ... | 1 | 1 | 1 | 0 | 1 | 0 | 0 | 0 | 0 | 0 | 1 |
| 25 | 1 | 0 | 1 | 1 | 1 | 0 | ... | 1 | 1 | 1 | 1 | 0 | 1 | 0 | 0 | 0 | 0 | 0 |
| 26 | 1 | 1 | 0 | 1 | 1 | 1 | ... | 0 | 1 | 1 | 1 | 1 | 0 | 1 | 0 | 0 | 0 | 0 |
| 27 | 0 | 1 | 1 | 0 | 1 | 1 | ... | 1 | 0 | 1 | 1 | 1 | 1 | 0 | 1 | 0 | 0 | 0 |
| 28 | 1 | 0 | 1 | 1 | 0 | 1 | ... | 0 | 1 | 0 | 1 | 1 | 1 | 1 | 0 | 1 | 0 | 0 |

FIG. 28A

| LFSR step | bit 0 (output) | bit 1 | bit 2 | bit 3 | bit 4 | bit 5 | ... | bit 118 | bit 119 | bit 120 | bit 121 | bit 122 | bit 123 (tap) | bit 124 | bit 125 | bit 126 | bit 127 | bit 128 (tap) |
|---|---|---|---|---|---|---|---|---|---|---|---|---|---|---|---|---|---|---|
| 29 | 1 | 1 | 0 | 1 | 1 | 0 | ... | 0 | 0 | 1 | 0 | 1 | 1 | 1 | 1 | 0 | 1 | 0 |
| 30 | 1 | 1 | 1 | 0 | 1 | 1 | ... | 0 | 0 | 0 | 1 | 0 | 1 | 1 | 1 | 1 | 0 | 1 |
| 31 | 0 | 1 | 1 | 1 | 0 | 1 | ... | 1 | 0 | 0 | 0 | 1 | 0 | 1 | 1 | 1 | 1 | 0 |
| 32 | 0 | 0 | 1 | 1 | 1 | 0 | ... | 1 | 1 | 0 | 0 | 0 | 1 | 0 | 1 | 1 | 1 | 1 |
| 33 | 0 | 0 | 0 | 1 | 1 | 1 | ... | 1 | 1 | 1 | 0 | 0 | 0 | 1 | 0 | 1 | 1 | 1 |
| 34 | 1 | 0 | 0 | 0 | 1 | 1 | ... | 1 | 1 | 1 | 1 | 0 | 0 | 0 | 1 | 0 | 1 | 1 |
| 35 | 1 | 1 | 0 | 0 | 0 | 1 | ... | 1 | 1 | 1 | 1 | 1 | 0 | 0 | 0 | 1 | 0 | 1 |
| 36 | 1 | 1 | 1 | 0 | 0 | 0 | ... | 0 | 1 | 1 | 1 | 1 | 1 | 0 | 0 | 0 | 1 | 0 |
| 37 | 1 | 1 | 1 | 1 | 0 | 0 | ... | 0 | 0 | 1 | 1 | 1 | 1 | 1 | 0 | 0 | 0 | 1 |
| 38 | 0 | 1 | 1 | 1 | 1 | 0 | ... | 0 | 0 | 0 | 1 | 1 | 1 | 1 | 1 | 0 | 0 | 0 |
| 39 | 1 | 0 | 1 | 1 | 1 | 1 | ... | 1 | 0 | 0 | 0 | 1 | 1 | 1 | 1 | 1 | 0 | 0 |
| 40 | 1 | 1 | 0 | 1 | 1 | 1 | ... | 0 | 1 | 0 | 0 | 0 | 1 | 1 | 1 | 1 | 1 | 0 |
| 41 | 1 | 1 | 1 | 0 | 1 | 1 | ... | 1 | 0 | 1 | 0 | 0 | 0 | 1 | 1 | 1 | 1 | 1 |
| 42 | 1 | 1 | 1 | 1 | 0 | 1 | ... | 0 | 1 | 0 | 1 | 0 | 0 | 0 | 1 | 1 | 1 | 1 |
| 43 | 1 | 1 | 1 | 1 | 1 | 0 | ... | 1 | 0 | 1 | 0 | 1 | 0 | 0 | 0 | 1 | 1 | 1 |
| 44 | 1 | 1 | 1 | 1 | 1 | 1 | ... | 1 | 1 | 0 | 1 | 0 | 1 | 0 | 0 | 0 | 1 | 1 |
| 45 | 0 | 1 | 1 | 1 | 1 | 1 | ... | 1 | 1 | 1 | 0 | 1 | 0 | 1 | 0 | 0 | 0 | 1 |
| 46 | 1 | 0 | 1 | 1 | 1 | 1 | ... | 1 | 1 | 1 | 1 | 0 | 1 | 0 | 1 | 0 | 0 | 0 |
| 47 | 1 | 1 | 0 | 1 | 1 | 1 | ... | 0 | 1 | 1 | 1 | 1 | 0 | 1 | 0 | 1 | 0 | 0 |
| 48 | 0 | 1 | 1 | 0 | 1 | 1 | ... | 0 | 0 | 1 | 1 | 1 | 1 | 0 | 1 | 0 | 1 | 0 |

FIG. 28B

| LFSR step | input block ($p$) | Forward Logic Block | | Reverse Logic Block | |
|---|---|---|---|---|---|
| | | bit stream | byte stream | bit stream | byte stream |
| 16 | 0 | 1010110010101110<br>0111010111010010<br>1010111100011101<br>0000001101100010<br>0110010001101010<br>1100010011110101<br>0001111100010111<br>1010000010111100 | 35 75 AE 4B F5<br>B8 C0 46 26 56<br>23 AF F8 E8 05<br>3D | 0011110100000101<br>1110100011111000<br>1010111100100011<br>0101011000100110<br>0100011011000000<br>1011100011110101<br>0100101110101110<br>0111010100110101 | BC A0 17 1F F5 C4<br>6A 64 62 03 1D<br>AF D2 75 AE AC |
| 32 | 1 | 0011110110111011<br>1010110010101110<br>0111010111010010<br>1010111100011101<br>0000001101100010<br>0110010001101010<br>1100010011110101<br>0001111100010111 | DC CE 35 75 AE<br>4B F5 B8 C0 46<br>26 56 23 AF F8<br>E8 | 1110100011111000<br>1010111100100011<br>0101011000100110<br>0100011011000000<br>1011100011110101<br>0100101110101110<br>0111010100110101<br>1100111011011100 | 17 1F F5 C4 6A 64<br>62 03 1D AF D2<br>75 AE AC 73 3B |
| 48 | 2 | 0110111111011110<br>0011110110111011<br>1010110010101110<br>0111010111010010<br>1010111100011101<br>0000001101100010<br>0110010001101010<br>1100010011110101 | F6 7B DC CE 35<br>75 AE 4B F5 B8<br>C0 46 26 56 23<br>AF | 1010111100100011<br>0101011000100110<br>0100011011000000<br>1011100011110101<br>0100101110101110<br>0111010100110101<br>1100111011011100<br>0111101111110110 | F5 C4 6A 64 62 03<br>1D AF D2 75 AE<br>AC 73 3B DE 6F |

FIG. 29

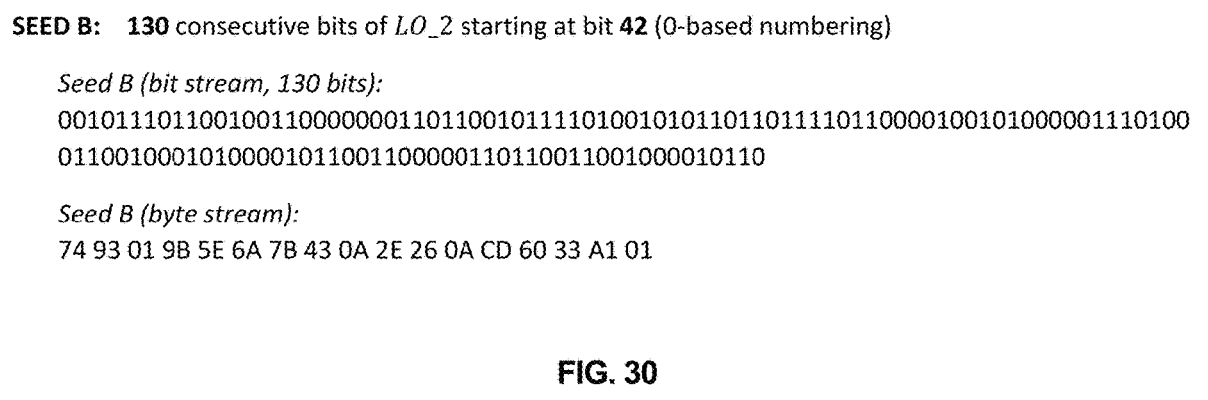

SEED B:    130 consecutive bits of *LO_2* starting at bit 42 (0-based numbering)

*Seed B (bit stream, 130 bits):*
0010111011001001100000001101100101111010010101101101111011000010010101000001110100
0110010001010000101100110000011011001100100001 0110

*Seed B (byte stream):*
74 93 01 9B 5E 6A 7B 43 0A 2E 26 0A CD 60 33 A1 01

FIG. 30

| LFSR step | bit 0 (output) | bit 1 | bit 2 | bit 3 | bit 4 | bit 5 | ... | bit 119 | bit 120 | bit 121 | bit 122 | bit 123 | bit 124 | bit 125 | bit 126 (tap) | bit 127 | bit 128 | bit 129 (tap) |
|---|---|---|---|---|---|---|---|---|---|---|---|---|---|---|---|---|---|---|
| 0 (seed) | 0 | 0 | 1 | 0 | 1 | 1 | ... | 0 | 1 | 0 | 0 | 0 | 0 | 1 | 0 | 1 | 1 | 0 |
| 1 | 0 | 0 | 0 | 1 | 0 | 1 | ... | 0 | 0 | 1 | 0 | 0 | 0 | 0 | 1 | 0 | 1 | 1 |
| 2 | 0 | 0 | 0 | 0 | 1 | 0 | ... | 1 | 0 | 0 | 1 | 0 | 0 | 0 | 0 | 1 | 0 | 1 |
| 3 | 1 | 0 | 0 | 0 | 0 | 1 | ... | 1 | 1 | 0 | 0 | 1 | 0 | 0 | 0 | 0 | 1 | 0 |
| 4 | 0 | 1 | 0 | 0 | 0 | 0 | ... | 0 | 1 | 1 | 0 | 0 | 1 | 0 | 0 | 0 | 0 | 1 |
| 5 | 1 | 0 | 1 | 0 | 0 | 0 | ... | 0 | 0 | 1 | 1 | 0 | 0 | 1 | 0 | 0 | 0 | 0 |
| 6 | 0 | 1 | 0 | 1 | 0 | 0 | ... | 1 | 0 | 0 | 1 | 1 | 0 | 0 | 1 | 0 | 0 | 0 |
| 7 | 1 | 0 | 1 | 0 | 1 | 0 | ... | 1 | 1 | 0 | 0 | 1 | 1 | 0 | 0 | 1 | 0 | 0 |
| 8 | 0 | 1 | 0 | 1 | 0 | 1 | ... | 0 | 1 | 1 | 0 | 0 | 1 | 1 | 0 | 0 | 1 | 0 |
| 9 | 0 | 0 | 1 | 0 | 1 | 0 | ... | 1 | 0 | 1 | 1 | 0 | 0 | 1 | 1 | 0 | 0 | 1 |
| 10 | 0 | 0 | 0 | 1 | 0 | 1 | ... | 1 | 1 | 0 | 1 | 1 | 0 | 0 | 1 | 1 | 0 | 0 |
| 11 | 1 | 0 | 0 | 0 | 1 | 0 | ... | 0 | 1 | 1 | 0 | 1 | 1 | 0 | 0 | 1 | 1 | 0 |
| 12 | 0 | 1 | 0 | 0 | 0 | 1 | ... | 0 | 0 | 1 | 1 | 0 | 1 | 1 | 0 | 0 | 1 | 1 |
| 13 | 1 | 0 | 1 | 0 | 0 | 0 | ... | 0 | 0 | 0 | 1 | 1 | 0 | 1 | 1 | 0 | 0 | 1 |
| 14 | 0 | 1 | 0 | 1 | 0 | 0 | ... | 0 | 0 | 0 | 0 | 1 | 1 | 0 | 1 | 1 | 0 | 0 |
| 15 | 1 | 0 | 1 | 0 | 1 | 0 | ... | 0 | 0 | 0 | 0 | 0 | 1 | 1 | 0 | 1 | 1 | 0 |
| 16 | 0 | 1 | 0 | 1 | 0 | 1 | ... | 1 | 0 | 0 | 0 | 0 | 0 | 1 | 1 | 0 | 1 | 1 |
| 17 | 0 | 0 | 1 | 0 | 1 | 0 | ... | 1 | 1 | 0 | 0 | 0 | 0 | 0 | 1 | 1 | 0 | 1 |
| 18 | 0 | 0 | 0 | 1 | 0 | 1 | ... | 0 | 1 | 1 | 0 | 0 | 0 | 0 | 0 | 1 | 1 | 0 |
| 19 | 0 | 0 | 0 | 0 | 1 | 0 | ... | 0 | 0 | 1 | 1 | 0 | 0 | 0 | 0 | 0 | 1 | 1 |
| 20 | 1 | 0 | 0 | 0 | 0 | 1 | ... | 1 | 0 | 0 | 1 | 1 | 0 | 0 | 0 | 0 | 0 | 1 |
| 21 | 1 | 1 | 0 | 0 | 0 | 0 | ... | 1 | 1 | 0 | 0 | 1 | 1 | 0 | 0 | 0 | 0 | 0 |
| 22 | 0 | 1 | 1 | 0 | 0 | 0 | ... | 0 | 1 | 1 | 0 | 0 | 1 | 1 | 0 | 0 | 0 | 0 |
| 23 | 0 | 0 | 1 | 1 | 0 | 0 | ... | 1 | 0 | 1 | 1 | 0 | 0 | 1 | 1 | 0 | 0 | 0 |
| 24 | 1 | 0 | 0 | 1 | 1 | 0 | ... | 0 | 1 | 0 | 1 | 1 | 0 | 0 | 1 | 1 | 0 | 0 |
| 25 | 1 | 1 | 0 | 0 | 1 | 1 | ... | 0 | 0 | 1 | 0 | 1 | 1 | 0 | 0 | 1 | 1 | 0 |
| 26 | 0 | 1 | 1 | 0 | 0 | 1 | ... | 0 | 0 | 0 | 1 | 0 | 1 | 1 | 0 | 0 | 1 | 1 |
| 27 | 1 | 0 | 1 | 1 | 0 | 0 | ... | 0 | 0 | 0 | 0 | 1 | 0 | 1 | 1 | 0 | 0 | 1 |
| 28 | 0 | 1 | 0 | 1 | 1 | 0 | ... | 1 | 0 | 0 | 0 | 0 | 1 | 0 | 1 | 1 | 0 | 0 |

FIG. 31A

| LFSR step | bit 0 (output) | bit 1 | bit 2 | bit 3 | bit 4 | bit 5 | ... | bit 119 | bit 120 | bit 121 | bit 122 | bit 123 | bit 124 | bit 125 | bit 126 (tap) | bit 127 | bit 128 | bit 129 (tap) |
|---|---|---|---|---|---|---|---|---|---|---|---|---|---|---|---|---|---|---|
| 29 | 1 | 0 | 1 | 0 | 1 | 1 | ... | 0 | 1 | 0 | 0 | 0 | 0 | 1 | 0 | 1 | 1 | 0 |
| 30 | 0 | 1 | 0 | 1 | 0 | 1 | ... | 1 | 0 | 1 | 0 | 0 | 0 | 0 | 1 | 0 | 1 | 1 |
| 31 | 0 | 0 | 1 | 0 | 1 | 0 | ... | 0 | 1 | 0 | 1 | 0 | 0 | 0 | 0 | 1 | 0 | 1 |
| 32 | 1 | 0 | 0 | 1 | 0 | 1 | ... | 0 | 0 | 1 | 0 | 1 | 0 | 0 | 0 | 0 | 1 | 0 |
| 33 | 0 | 1 | 0 | 0 | 1 | 0 | ... | 0 | 0 | 0 | 1 | 0 | 1 | 0 | 0 | 0 | 0 | 1 |
| 34 | 1 | 0 | 1 | 0 | 0 | 1 | ... | 1 | 0 | 0 | 0 | 1 | 0 | 1 | 0 | 0 | 0 | 0 |
| 35 | 0 | 1 | 0 | 1 | 0 | 0 | ... | 0 | 1 | 0 | 0 | 0 | 1 | 0 | 1 | 0 | 0 | 0 |
| 36 | 1 | 0 | 1 | 0 | 1 | 0 | ... | 0 | 0 | 1 | 0 | 0 | 0 | 1 | 0 | 1 | 0 | 0 |
| 37 | 0 | 1 | 0 | 1 | 0 | 1 | ... | 1 | 0 | 0 | 1 | 0 | 0 | 0 | 1 | 0 | 1 | 0 |
| 38 | 1 | 0 | 1 | 0 | 1 | 0 | ... | 1 | 1 | 0 | 0 | 1 | 0 | 0 | 0 | 1 | 0 | 1 |
| 39 | 1 | 1 | 0 | 1 | 0 | 1 | ... | 0 | 1 | 1 | 0 | 0 | 1 | 0 | 0 | 0 | 1 | 0 |
| 40 | 0 | 1 | 1 | 0 | 1 | 0 | ... | 0 | 0 | 1 | 1 | 0 | 0 | 1 | 0 | 0 | 0 | 1 |
| 41 | 1 | 0 | 1 | 1 | 0 | 1 | ... | 0 | 0 | 0 | 1 | 1 | 0 | 0 | 1 | 0 | 0 | 0 |
| 42 | 1 | 1 | 0 | 1 | 1 | 0 | ... | 1 | 0 | 0 | 0 | 1 | 1 | 0 | 0 | 1 | 0 | 0 |
| 43 | 0 | 1 | 1 | 0 | 1 | 1 | ... | 0 | 1 | 0 | 0 | 0 | 1 | 1 | 0 | 0 | 1 | 0 |
| 44 | 0 | 0 | 1 | 1 | 0 | 1 | ... | 1 | 0 | 1 | 0 | 0 | 0 | 1 | 1 | 0 | 0 | 1 |
| 45 | 0 | 0 | 0 | 1 | 1 | 0 | ... | 1 | 1 | 0 | 1 | 0 | 0 | 0 | 1 | 1 | 0 | 0 |
| 46 | 1 | 0 | 0 | 0 | 1 | 1 | ... | 1 | 1 | 1 | 0 | 1 | 0 | 0 | 0 | 1 | 1 | 0 |
| 47 | 0 | 1 | 0 | 0 | 0 | 1 | ... | 0 | 1 | 1 | 1 | 0 | 1 | 0 | 0 | 0 | 1 | 1 |
| 48 | 1 | 0 | 1 | 0 | 0 | 0 | ... | 0 | 0 | 1 | 1 | 1 | 0 | 1 | 0 | 0 | 0 | 1 |

FIG. 31B

| LFSR step | Input block (p) | Forward Logic Block | | Reverse Logic Block | |
|---|---|---|---|---|---|
| | | bit stream | byte stream | bit stream | byte stream |
| 16 | 0 | 0110000011001101<br>0000101000100110<br>0010111000001010<br>0100001101111011<br>0110101001011110<br>1001101100000001<br>1001001101110100<br>0010101000101010 | 06 B3 50 64 74<br>50 C2 DE 56 7A<br>D9 80 C9 2E 54<br>54 | 0101010001010100<br>0010111011001001<br>1000000011011001<br>0111101001010110<br>1101111011000010<br>0101000001110100<br>0110010001010000<br>1011001100000110 | 2A 2A 74 93 01<br>9B 5E 6A 7B 43<br>0A 2E 26 0A CD<br>60 |
| 32 | 1 | 0000101000100110<br>0010111000001010<br>0100001101111011<br>0110101001011110<br>1001101100000001<br>1001001101110100<br>0010101000101010<br>0001100110101001 | 50 64 74 50 C2<br>DE 56 7A D9 80<br>C9 2E 54 54 98<br>95 | 1001010110011000<br>0101010001010100<br>0010111011001001<br>1000000011011001<br>0111101001010110<br>1101111011000010<br>0101000001110100<br>0110010001010000 | A9 19 2A 2A 74<br>93 01 9B 5E 6A 7B<br>43 0A 2E 26 0A |
| 48 | 2 | 0010111000001010<br>0100001101111011<br>0110101001011110<br>1001101100000001<br>1001001101110100<br>0010101000101010<br>0001100110101001<br>0101011011000101 | 74 50 C2 DE 56<br>7A D9 80 C9 2E<br>54 54 98 95 6A<br>A3 | 1010001101101010<br>1001010110011000<br>0101010001010100<br>0010111011001001<br>1000000011011001<br>0111101001010110<br>1101111011000010<br>0101000001110100 | C5 56 A9 19 2A<br>2A 74 93 01 9B 5E<br>6A 7B 43 0A 2E |

FIG. 32

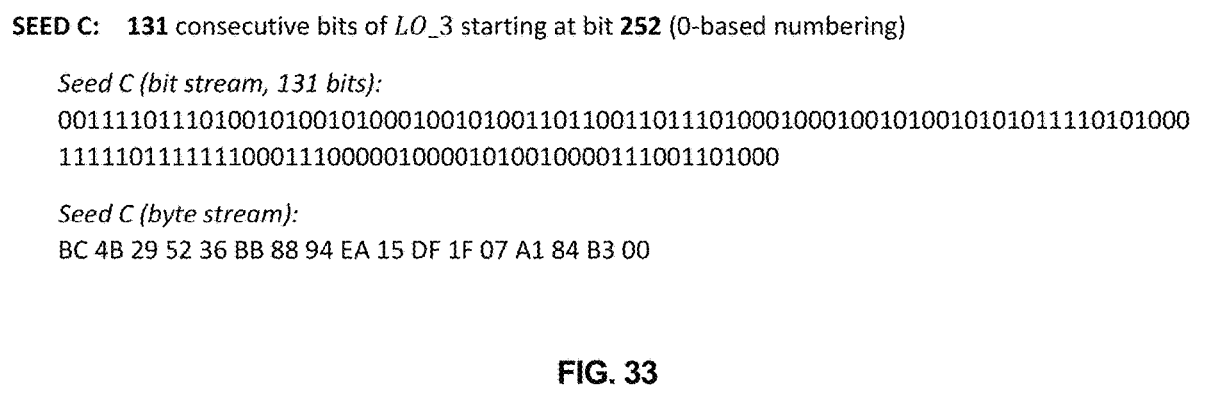

SEED C: 131 consecutive bits of *LO*_3 starting at bit 252 (0-based numbering)

*Seed C (bit stream, 131 bits):*
00111101110100101001010001001010011011001101110100010001001010010101011110101000
11111011111110001110000010000101001000011100110 1000

*Seed C (byte stream):*
BC 4B 29 52 36 BB 88 94 EA 15 DF 1F 07 A1 84 B3 00

FIG. 33

| LFSR step | bit 0 (output) | bit 1 | bit 2 | bit 3 | ... | bit 80 | bit 81 | bit 82 (tap) | bit 83 (tap) | bit 84 | bit 85 | bit 86 | ... | bit 126 | bit 127 | bit 128 | bit 129 (tap) | bit 130 (tap) |
|---|---|---|---|---|---|---|---|---|---|---|---|---|---|---|---|---|---|---|
| 0 (seed) | 0 | 0 | 1 | 1 | ... | 1 | 1 | 1 | 1 | 1 | 0 | 1 | ... | 0 | 1 | 0 | 0 | 0 |
| 1 | 0 | 0 | 0 | 1 | ... | 0 | 1 | 1 | 1 | 1 | 1 | 0 | ... | 1 | 0 | 1 | 0 | 0 |
| 2 | 0 | 0 | 0 | 0 | ... | 0 | 0 | 1 | 1 | 1 | 1 | 1 | ... | 1 | 1 | 0 | 1 | 0 |
| 3 | 1 | 0 | 0 | 0 | ... | 0 | 0 | 0 | 1 | 1 | 1 | 1 | ... | 0 | 1 | 1 | 0 | 1 |
| 4 | 0 | 1 | 0 | 0 | ... | 1 | 0 | 0 | 0 | 1 | 1 | 1 | ... | 0 | 0 | 1 | 1 | 0 |
| 5 | 1 | 0 | 1 | 0 | ... | 0 | 1 | 0 | 0 | 0 | 1 | 1 | ... | 1 | 0 | 0 | 1 | 1 |
| 6 | 0 | 1 | 0 | 1 | ... | 1 | 0 | 1 | 0 | 0 | 0 | 1 | ... | 1 | 1 | 0 | 0 | 1 |
| 7 | 0 | 0 | 1 | 0 | ... | 0 | 1 | 0 | 1 | 0 | 0 | 0 | ... | 1 | 1 | 1 | 0 | 0 |
| 8 | 1 | 0 | 0 | 1 | ... | 1 | 0 | 1 | 0 | 1 | 0 | 0 | ... | 0 | 1 | 1 | 1 | 0 |
| 9 | 0 | 1 | 0 | 0 | ... | 1 | 1 | 0 | 1 | 0 | 1 | 0 | ... | 0 | 0 | 1 | 1 | 1 |
| 10 | 1 | 0 | 1 | 0 | ... | 1 | 1 | 1 | 0 | 1 | 0 | 1 | ... | 0 | 0 | 0 | 1 | 1 |
| 11 | 1 | 1 | 0 | 1 | ... | 1 | 1 | 1 | 1 | 0 | 1 | 0 | ... | 0 | 0 | 0 | 0 | 1 |
| 12 | 1 | 1 | 1 | 0 | ... | 0 | 1 | 1 | 1 | 1 | 0 | 1 | ... | 1 | 0 | 0 | 0 | 0 |
| 13 | 0 | 1 | 1 | 1 | ... | 1 | 0 | 1 | 1 | 1 | 1 | 0 | ... | 0 | 1 | 0 | 0 | 0 |
| 14 | 0 | 0 | 1 | 1 | ... | 0 | 1 | 0 | 1 | 1 | 1 | 1 | ... | 0 | 0 | 1 | 0 | 0 |
| 15 | 1 | 0 | 0 | 1 | ... | 1 | 0 | 1 | 0 | 1 | 1 | 1 | ... | 1 | 0 | 0 | 1 | 0 |
| 16 | 0 | 1 | 0 | 0 | ... | 0 | 1 | 0 | 1 | 0 | 1 | 1 | ... | 0 | 1 | 0 | 0 | 1 |
| 17 | 0 | 0 | 1 | 0 | ... | 1 | 0 | 1 | 0 | 1 | 0 | 1 | ... | 1 | 0 | 1 | 0 | 0 |
| 18 | 1 | 0 | 0 | 1 | ... | 0 | 1 | 0 | 1 | 0 | 1 | 0 | ... | 0 | 1 | 0 | 1 | 0 |
| 19 | 0 | 1 | 0 | 0 | ... | 0 | 0 | 1 | 0 | 1 | 0 | 1 | ... | 0 | 0 | 1 | 0 | 1 |
| 20 | 0 | 0 | 1 | 0 | ... | 1 | 0 | 0 | 1 | 0 | 1 | 0 | ... | 0 | 0 | 0 | 1 | 0 |
| 21 | 0 | 0 | 0 | 1 | ... | 0 | 1 | 0 | 0 | 1 | 0 | 1 | ... | 0 | 0 | 0 | 0 | 1 |
| 22 | 1 | 0 | 0 | 0 | ... | 1 | 0 | 1 | 0 | 0 | 1 | 0 | ... | 1 | 0 | 0 | 0 | 0 |
| 23 | 1 | 1 | 0 | 0 | ... | 0 | 1 | 0 | 0 | 0 | 0 | 1 | ... | 0 | 1 | 0 | 0 | 0 |
| 24 | 1 | 1 | 1 | 0 | ... | 0 | 0 | 1 | 0 | 1 | 0 | 0 | ... | 0 | 0 | 1 | 0 | 0 |
| 25 | 1 | 1 | 1 | 1 | ... | 1 | 0 | 0 | 1 | 0 | 1 | 0 | ... | 0 | 0 | 0 | 1 | 0 |
| 26 | 0 | 1 | 1 | 1 | ... | 0 | 1 | 0 | 0 | 1 | 0 | 1 | ... | 0 | 0 | 0 | 0 | 1 |
| 27 | 1 | 0 | 1 | 1 | ... | 0 | 0 | 1 | 0 | 0 | 1 | 0 | ... | 0 | 0 | 0 | 0 | 0 |
| 28 | 1 | 1 | 0 | 1 | ... | 0 | 0 | 0 | 1 | 0 | 0 | 1 | ... | 1 | 0 | 0 | 0 | 0 |

FIG. 34A

| LFSR step | bit 0 (output) | bit 1 | bit 2 | bit 3 | ... | bit 80 | bit 81 | bit 82 (tap) | bit 83 (tap) | bit 84 | bit 85 | bit 86 | ... | bit 126 | bit 127 | bit 128 | bit 129 (tap) | bit 130 (tap) |
|---|---|---|---|---|---|---|---|---|---|---|---|---|---|---|---|---|---|---|
| 0 (seed) | 0 | 0 | 1 | 1 | ... | 1 | 1 | 1 | 1 | 1 | 0 | 1 | ... | 0 | 1 | 0 | 0 | 0 |
| 29 | 1 | 1 | 1 | 0 | ... | 1 | 0 | 0 | 0 | 1 | 0 | 0 | ... | 1 | 1 | 0 | 0 | 0 |
| 30 | 0 | 1 | 1 | 1 | ... | 0 | 1 | 0 | 0 | 0 | 1 | 0 | ... | 1 | 1 | 1 | 0 | 0 |
| 31 | 0 | 0 | 1 | 1 | ... | 0 | 0 | 1 | 0 | 0 | 0 | 1 | ... | 0 | 1 | 1 | 1 | 0 |
| 32 | 0 | 0 | 0 | 1 | ... | 0 | 0 | 0 | 1 | 0 | 0 | 0 | ... | 0 | 0 | 1 | 1 | 1 |
| 33 | 1 | 0 | 0 | 0 | ... | 1 | 0 | 0 | 0 | 1 | 0 | 0 | ... | 0 | 0 | 0 | 1 | 1 |
| 34 | 0 | 1 | 0 | 0 | ... | 0 | 1 | 0 | 0 | 0 | 1 | 0 | ... | 1 | 0 | 0 | 0 | 1 |
| 35 | 1 | 0 | 1 | 0 | ... | 1 | 0 | 1 | 0 | 0 | 0 | 1 | ... | 1 | 1 | 0 | 0 | 0 |
| 36 | 1 | 1 | 0 | 1 | ... | 1 | 1 | 0 | 1 | 0 | 0 | 0 | ... | 1 | 1 | 1 | 0 | 0 |
| 37 | 1 | 1 | 1 | 0 | ... | 1 | 1 | 1 | 0 | 1 | 0 | 0 | ... | 1 | 1 | 1 | 1 | 0 |
| 38 | 0 | 1 | 1 | 1 | ... | 0 | 1 | 1 | 1 | 0 | 1 | 0 | ... | 1 | 1 | 1 | 1 | 1 |
| 39 | 0 | 0 | 1 | 1 | ... | 1 | 0 | 1 | 1 | 1 | 0 | 1 | ... | 1 | 1 | 1 | 1 | 1 |
| 40 | 0 | 0 | 0 | 1 | ... | 1 | 1 | 0 | 1 | 1 | 1 | 0 | ... | 1 | 1 | 1 | 1 | 1 |
| 41 | 1 | 0 | 0 | 0 | ... | 0 | 1 | 1 | 0 | 1 | 1 | 1 | ... | 0 | 1 | 1 | 1 | 1 |
| 42 | 1 | 1 | 0 | 0 | ... | 0 | 0 | 1 | 1 | 0 | 1 | 1 | ... | 1 | 0 | 1 | 1 | 1 |
| 43 | 0 | 1 | 1 | 0 | ... | 1 | 0 | 0 | 1 | 1 | 0 | 1 | ... | 1 | 1 | 0 | 1 | 1 |
| 44 | 1 | 0 | 1 | 1 | ... | 1 | 1 | 0 | 0 | 1 | 1 | 0 | ... | 1 | 1 | 1 | 0 | 1 |
| 45 | 1 | 1 | 0 | 1 | ... | 0 | 1 | 1 | 0 | 0 | 1 | 1 | ... | 1 | 1 | 1 | 1 | 0 |
| 46 | 0 | 1 | 1 | 0 | ... | 1 | 0 | 1 | 1 | 0 | 0 | 1 | ... | 1 | 1 | 1 | 1 | 1 |
| 47 | 0 | 0 | 1 | 1 | ... | 1 | 1 | 0 | 1 | 1 | 0 | 0 | ... | 0 | 1 | 1 | 1 | 1 |
| 48 | 1 | 0 | 0 | 1 | ... | 0 | 1 | 1 | 0 | 1 | 1 | 0 | ... | 0 | 0 | 1 | 1 | 1 |

FIG. 34B

| LFSR step | input block (p) | Forward Logic Block | | Reverse Logic Block | |
|---|---|---|---|---|---|
| | | bit stream | byte stream | bit stream | byte stream |
| 16 | 0 | 1010000100000111<br>0001111111011111<br>0001010111101010<br>1001010010001000<br>1011101100110110<br>0101001000101001<br>0100101110111100<br>0010100101110010 | 85 E0 F8 FB A8<br>57 29 11 DD 6C<br>4A 94 D2 3D 94<br>4E | 0100111010010100<br>0011110111010010<br>1001010001001010<br>0110110011011101<br>0001000100101001<br>0101011110101000<br>1111101111111000<br>1110000010000101 | 72 29 BC 4B 29 52<br>36 BB 88 94 EA 15<br>DF 1F 07 A1 |
| 32 | 1 | 0001111111011111<br>0001010111101010<br>1001010010001000<br>1011101100110110<br>0101001000101001<br>0100101110111100<br>0010100101110010<br>0100011110111000 | F8 FB A8 57 29<br>11 DD 6C 4A 94<br>D2 3D 94 4E E2<br>1D | 0001110111100010<br>0100111010010100<br>0011110111010010<br>1001010001001010<br>0110110011011101<br>0001000100101001<br>0101011110101000<br>1111101111111000 | B8 47 72 29 BC<br>4B 29 52 36 BB 88<br>94 EA 15 DF 1F |
| 48 | 2 | 0001010111101010<br>1001010010001000<br>1011101100110110<br>0101001000101001<br>0100101110111100<br>0010100101110010<br>0100011110111000<br>1011100011011001 | A8 57 29 11 DD<br>6C 4A 94 D2 3D<br>94 4E E2 1D 1D<br>9B | 1001101100011101<br>0001110111100010<br>0100111010010100<br>0011110111010010<br>1001010001001010<br>0110110011011101<br>0001000100101001<br>0101011110101000 | D9 B8 B8 47 72<br>29 BC 4B 29 52 36<br>BB 88 94 EA 15 |

FIG. 35

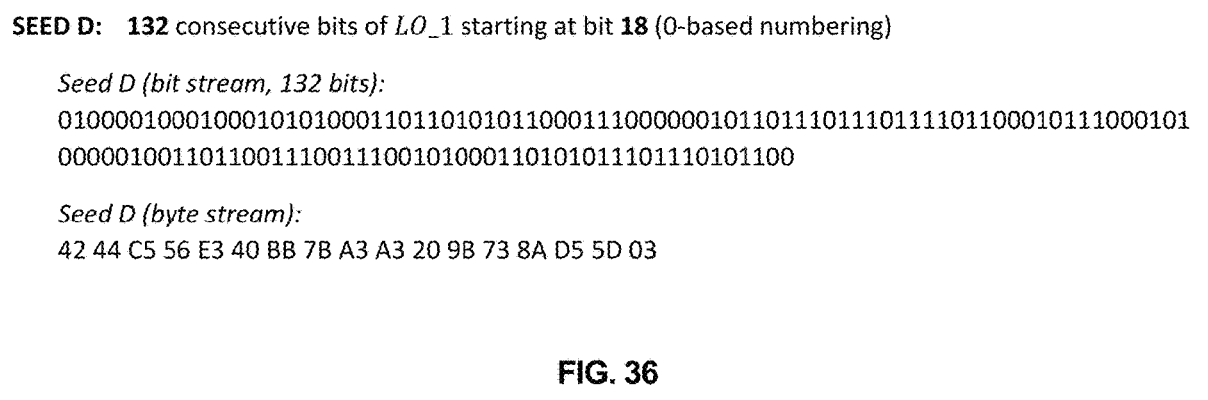

SEED D:   132 consecutive bits of *LO_1* starting at bit 18 (0-based numbering)

*Seed D (bit stream, 132 bits):*
010000100010001010100011011010101100011100000010110111011101111011000101110001010000010011011001110011100101000110101011101110101100

*Seed D (byte stream):*
42 44 C5 56 E3 40 BB 7B A3 A3 20 9B 73 8A D5 5D 03

FIG. 36

| LFSR step | bit 0 (output) | bit 1 | bit 2 | bit 3 | ... | bit 100 | bit 101 | bit 102 (tap) | bit 103 | bit 104 | bit 105 | ... | bit 126 | bit 127 | bit 128 | bit 129 | bit 130 | bit 131 (tap) |
|---|---|---|---|---|---|---|---|---|---|---|---|---|---|---|---|---|---|---|
| 0 (seed) | 0 | 1 | 0 | 0 | ... | 1 | 1 | 1 | 0 | 0 | 1 | ... | 1 | 0 | 1 | 1 | 0 | 0 |
| 1 | 1 | 0 | 1 | 0 | ... | 0 | 1 | 1 | 1 | 0 | 0 | ... | 0 | 1 | 0 | 1 | 1 | 0 |
| 2 | 1 | 1 | 0 | 1 | ... | 0 | 0 | 1 | 1 | 1 | 0 | ... | 1 | 0 | 1 | 0 | 1 | 1 |
| 3 | 0 | 1 | 1 | 0 | ... | 1 | 0 | 0 | 1 | 1 | 1 | ... | 1 | 1 | 0 | 1 | 0 | 1 |
| 4 | 1 | 0 | 1 | 1 | ... | 1 | 1 | 0 | 0 | 1 | 1 | ... | 1 | 1 | 1 | 0 | 1 | 0 |
| 5 | 0 | 1 | 0 | 1 | ... | 1 | 1 | 1 | 0 | 0 | 1 | ... | 0 | 1 | 1 | 1 | 0 | 1 |
| 6 | 0 | 0 | 1 | 0 | ... | 0 | 1 | 1 | 1 | 0 | 0 | ... | 1 | 0 | 1 | 1 | 1 | 0 |
| 7 | 1 | 0 | 0 | 1 | ... | 0 | 0 | 1 | 1 | 1 | 0 | ... | 1 | 1 | 0 | 1 | 1 | 1 |
| 8 | 0 | 1 | 0 | 0 | ... | 1 | 0 | 0 | 1 | 1 | 1 | ... | 1 | 1 | 1 | 0 | 1 | 1 |
| 9 | 1 | 0 | 1 | 0 | ... | 1 | 1 | 0 | 0 | 1 | 1 | ... | 0 | 1 | 1 | 1 | 0 | 1 |
| 10 | 1 | 1 | 0 | 1 | ... | 0 | 1 | 1 | 0 | 0 | 1 | ... | 1 | 0 | 1 | 1 | 1 | 0 |
| 11 | 1 | 1 | 1 | 0 | ... | 1 | 0 | 1 | 1 | 0 | 0 | ... | 0 | 1 | 0 | 1 | 1 | 1 |
| 12 | 0 | 1 | 1 | 1 | ... | 1 | 1 | 0 | 1 | 1 | 0 | ... | 1 | 0 | 1 | 0 | 1 | 1 |
| 13 | 1 | 0 | 1 | 1 | ... | 0 | 1 | 1 | 0 | 1 | 1 | ... | 0 | 1 | 0 | 1 | 0 | 1 |
| 14 | 0 | 1 | 0 | 1 | ... | 0 | 0 | 1 | 1 | 0 | 1 | ... | 1 | 0 | 1 | 0 | 1 | 0 |
| 15 | 1 | 0 | 1 | 0 | ... | 1 | 0 | 0 | 1 | 1 | 0 | ... | 1 | 1 | 0 | 1 | 0 | 1 |
| 16 | 1 | 1 | 0 | 1 | ... | 0 | 1 | 0 | 0 | 1 | 1 | ... | 0 | 1 | 1 | 0 | 1 | 0 |
| 17 | 0 | 1 | 1 | 0 | ... | 0 | 0 | 1 | 0 | 0 | 1 | ... | 0 | 0 | 1 | 1 | 0 | 1 |
| 18 | 0 | 0 | 1 | 1 | ... | 0 | 0 | 0 | 1 | 0 | 0 | ... | 0 | 0 | 0 | 1 | 1 | 0 |
| 19 | 0 | 0 | 0 | 1 | ... | 0 | 0 | 0 | 0 | 1 | 0 | ... | 1 | 0 | 0 | 0 | 1 | 1 |
| 20 | 1 | 0 | 0 | 0 | ... | 0 | 0 | 0 | 0 | 0 | 1 | ... | 0 | 1 | 0 | 0 | 0 | 1 |
| 21 | 1 | 1 | 0 | 0 | ... | 1 | 0 | 0 | 0 | 0 | 0 | ... | 1 | 0 | 1 | 0 | 0 | 0 |
| 22 | 0 | 1 | 1 | 0 | ... | 0 | 1 | 0 | 0 | 0 | 0 | ... | 0 | 1 | 0 | 1 | 0 | 0 |
| 23 | 0 | 0 | 1 | 1 | ... | 1 | 0 | 1 | 0 | 0 | 0 | ... | 0 | 0 | 1 | 0 | 1 | 0 |
| 24 | 1 | 0 | 0 | 1 | ... | 0 | 1 | 0 | 1 | 0 | 0 | ... | 1 | 0 | 0 | 1 | 0 | 1 |
| 25 | 1 | 1 | 0 | 0 | ... | 0 | 0 | 1 | 0 | 1 | 0 | ... | 1 | 1 | 0 | 0 | 1 | 0 |
| 26 | 1 | 1 | 1 | 0 | ... | 0 | 0 | 0 | 1 | 0 | 1 | ... | 1 | 1 | 1 | 0 | 0 | 1 |
| 27 | 1 | 1 | 1 | 1 | ... | 1 | 0 | 0 | 0 | 1 | 0 | ... | 0 | 1 | 1 | 1 | 0 | 0 |
| 28 | 0 | 1 | 1 | 1 | ... | 1 | 1 | 0 | 0 | 0 | 1 | ... | 0 | 0 | 1 | 1 | 1 | 0 |

FIG. 37A

| LFSR step | bit 0 (output) | bit 1 | bit 2 | bit 3 | ... | bit 100 | bit 101 | bit 102 (tap) | bit 103 | bit 104 | bit 105 | ... | bit 126 | bit 127 | bit 128 | bit 129 | bit 130 | bit 131 (tap) |
|---|---|---|---|---|---|---|---|---|---|---|---|---|---|---|---|---|---|---|
| 29 | 0 | 0 | 1 | 1 | ... | 1 | 1 | 1 | 0 | 0 | 0 | ... | 1 | 0 | 0 | 1 | 1 | 1 |
| 30 | 0 | 0 | 0 | 1 | ... | 0 | 1 | 1 | 1 | 0 | 0 | ... | 1 | 1 | 0 | 0 | 1 | 1 |
| 31 | 0 | 0 | 0 | 0 | ... | 1 | 0 | 1 | 1 | 1 | 0 | ... | 1 | 1 | 1 | 0 | 0 | 1 |
| 32 | 0 | 0 | 0 | 0 | ... | 0 | 1 | 0 | 1 | 1 | 1 | ... | 0 | 1 | 1 | 1 | 0 | 0 |
| 33 | 0 | 0 | 0 | 0 | ... | 0 | 0 | 1 | 0 | 1 | 1 | ... | 0 | 0 | 1 | 1 | 1 | 0 |
| 34 | 1 | 0 | 0 | 0 | ... | 0 | 0 | 0 | 1 | 0 | 1 | ... | 1 | 0 | 0 | 1 | 1 | 1 |
| 35 | 1 | 1 | 0 | 0 | ... | 1 | 0 | 0 | 0 | 1 | 0 | ... | 1 | 1 | 0 | 0 | 1 | 1 |
| 36 | 1 | 1 | 1 | 0 | ... | 1 | 1 | 0 | 0 | 0 | 1 | ... | 0 | 1 | 1 | 0 | 0 | 1 |
| 37 | 1 | 1 | 1 | 1 | ... | 0 | 1 | 1 | 0 | 0 | 0 | ... | 1 | 0 | 1 | 1 | 0 | 0 |
| 38 | 1 | 1 | 1 | 1 | ... | 1 | 0 | 1 | 1 | 0 | 0 | ... | 1 | 1 | 0 | 1 | 1 | 0 |
| 39 | 1 | 1 | 1 | 1 | ... | 1 | 1 | 0 | 1 | 1 | 0 | ... | 0 | 1 | 1 | 0 | 1 | 1 |
| 40 | 1 | 1 | 1 | 1 | ... | 1 | 1 | 1 | 0 | 1 | 1 | ... | 0 | 0 | 1 | 1 | 0 | 1 |
| 41 | 0 | 1 | 1 | 1 | ... | 1 | 1 | 1 | 1 | 0 | 1 | ... | 1 | 0 | 0 | 1 | 1 | 0 |
| 42 | 1 | 0 | 1 | 1 | ... | 0 | 1 | 1 | 1 | 1 | 0 | ... | 0 | 1 | 0 | 0 | 1 | 1 |
| 43 | 0 | 1 | 0 | 1 | ... | 1 | 0 | 1 | 1 | 1 | 1 | ... | 0 | 0 | 1 | 0 | 0 | 1 |
| 44 | 0 | 0 | 1 | 0 | ... | 1 | 1 | 0 | 1 | 1 | 1 | ... | 0 | 0 | 0 | 1 | 0 | 0 |
| 45 | 0 | 0 | 0 | 1 | ... | 1 | 1 | 1 | 0 | 1 | 1 | ... | 0 | 0 | 0 | 0 | 1 | 0 |
| 46 | 1 | 0 | 0 | 0 | ... | 0 | 1 | 1 | 1 | 0 | 1 | ... | 0 | 0 | 0 | 0 | 0 | 1 |
| 47 | 0 | 1 | 0 | 0 | ... | 1 | 0 | 1 | 1 | 1 | 0 | ... | 1 | 0 | 0 | 0 | 0 | 0 |
| 48 | 1 | 0 | 1 | 0 | ... | 1 | 1 | 0 | 1 | 1 | 1 | ... | 0 | 1 | 0 | 0 | 0 | 0 |

FIG. 37B

| LFSR step | input block (p) | Forward Logic Block | | Reverse Logic Block | |
|---|---|---|---|---|---|
| | | bit stream | byte stream | bit stream | byte stream |
| 16 | 0 | 1000101001110011<br>1001101100100000<br>1010001110100011<br>0111101110111011<br>0100000011100011<br>0101011011000101<br>0100010001000010<br>1101001011101011 | 51 CE D9 04 C5<br>C5 DE DD 02 C7<br>6A A3 22 42 4B<br>D7 | 1101011101001011<br>0100001000100010<br>1010001101101010<br>1100011100000010<br>1101110111011110<br>1100010111000101<br>0000010011011001<br>1100111001010001 | EB D2 42 44 C5<br>56 E3 40 BB 7B<br>A3 A3 20 9B 73<br>8A |
| 32 | 1 | 1001101100100000<br>1010001110100011<br>0111101110111011<br>0100000011100011<br>0101011011000101<br>0100010001000010<br>1101001011101011<br>0001100111100000 | D9 04 C5 C5 DE<br>DD 02 C7 6A A3<br>22 42 4B D7 98<br>07 | 0000011110011000<br>1101011101001011<br>0100001000100010<br>1010001101101010<br>1100011100000010<br>1101110111011110<br>1100010111000101<br>0000010011011001 | E0 19 EB D2 42 44<br>C5 56 E3 40 BB 7B<br>A3 A3 20 9B |
| 48 | 2 | 1010001110100011<br>0111101110111011<br>0100000011100011<br>0101011011000101<br>0100010001000010<br>1101001011101011<br>0001100111100000<br>0111111101000101 | C5 C5 DE DD 02<br>C7 6A A3 22 42<br>4B D7 98 07 FE<br>A2 | 1010001011111110<br>0000011110011000<br>1101011101001011<br>0100001000100010<br>1010001101101010<br>1100011100000010<br>1101110111011110<br>1100010111000101 | 45 7F E0 19 EB D2<br>42 44 C5 56 E3 40<br>BB 7B A3 A3 |

FIG. 38

| Input Block (p) | XOR Block | XOR Block Contents (bit stream, 128 bits) | XOR Block Contents (byte stream, 16 Bytes) |
|---|---|---|---|
| 0 | A | 1010110010101011001110101110100101010111100011101000000110110001001100100011010101100010011110101000111110001011110100000101111100 | 35 75 AE 4B F5 B8 C0 46 26 56 23 AF F8 E8 05 3D |
|  | B | 0101010001010100001011101100100110000000110110010111101001010110110111101100001001010000011101000110010001010000101100110000 0110 | 2A 2A 74 93 01 9B 5E 6A 7B 43 0A 2E 26 0A CD 60 |
|  | C | 1010000100000111000111111101111100010101111010101001010010001000101110110011011001010010001010010100101110111000010100101110010 | 85 E0 F8 FB A8 57 29 11 DD 6C 4A 94 D2 3D 94 4E |
|  | D | 1101011101001011010000100010001010100011011010101100011100000010110111011101111011000101110001010000010011011001110011100101 0001 | EB D2 42 44 C5 56 E3 40 BB 7B A3 A3 20 9B 73 8A |
| 1 | A | 0011101101110011101011001010111001110101110100101010111100011101000000110110001001100100011010101100010011110101000111110001 0111 | DC CE 35 75 AE 4B F5 B8 C0 46 26 56 23 AF F8 E8 |
|  | B | 1001010110011000010101000101010000101110110010011000000011011001011110100101011011011110110000100101000001101000110010001010000 | A9 19 2A 2A 74 93 01 9B 5E 6A 7B 43 0A 2E 26 0A |
|  | C | 0001111111011111000101011110101010010100010001000101110110011011001010010001010010100101110111100001010010111001001000111 10111000 | F8 FB A8 57 29 11 DD 6C 4A 94 D2 3D 94 4E E2 1D |
|  | D | 0000011110011000110101110100101101000010001000101010001101101010110001110000001011011101110111101100010111000101000001 0011011001 | E0 19 EB D2 42 44 C5 56 E3 40 BB 7B A3 A3 20 9B |

FIG. 39A

| Input Block (p) | XOR Block | XOR Block Contents (bit stream, 128 bits) | XOR Block Contents (byte stream, 16 Bytes) |
|---|---|---|---|
| 2 | A | 01101111110111100011101101110011 10101100101011100111010111010010 10101111000111010000001101100010 01100100011010101100010011110101 | F6 7B DC CE 35 75 AE 4B F5 B8 C0 46 26 56 23 AF |
| | B | 10100011011010101001010110011000 01010100010101000010111011001001 10000000110110010111101001010110 11011110110000100101000001110100 | C5 56 A9 19 2A 2A 74 93 01 9B 5E 6A 7B 43 0A 2E |
| | C | 00010101111010101001010010001000 10111011001101100101001000101001 01001011101111000010100101110010 01000111101110001011100011011001 | A8 57 29 11 DD 6C 4A 94 D2 3D 94 4E E2 1D 1D 9B |
| | D | 10100010111111000000011110011000 11010111010010110100001000100010 10100011011010101100011100000010 11011101110111101100010111000101 | 45 7F E0 19 EB D2 42 44 C5 56 E3 40 BB 7B A3 A3 |

FIG. 39B

DATA ENCRYPTION AND DECRYPTION USING SCREENS AND LFSR-GENERATED LOGIC BLOCKS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to data security and, more specifically, to methods and systems for encrypting data for secure storage or transport while allowing the encrypted data to remain accessible to the appropriate users and systems.

2. Description of Related Art

The sheer volume and accessibility of data has risen rapidly in recent years. Organizations and individual users increasingly look to electronic data as a primary source of information-rather than tangible documents such as paper-because of the persistence, availability, searchability, and accessibility of electronic data. Also, robust networking and communications technologies have made data accessible to user devices in a variety of contexts, including when a user device establishes a remote connection to a primary network that hosts the accessed data. Further, business and legal requirements have demanded the retention and general availability of historic data.

While vast quantities of data are constantly created and persisted, organizations and individual users must have the ability to access the data. The provision of data access does cause a significant actual and perceived risk from data breaches caused by unauthorized users. While access control methods exist to mitigate improper access, the wide variety of methods of data access make it nearly impossible to prevent at least some unauthorized users from accessing data that they should not be able to access. For example, data is routinely saved on network storage, on local devices, on remote storage devices outside a network, and on removable storage devices such as universal serial bus (USB) drives. Because data is often resident in multiple locations with varying degrees of security, there is a persistent risk of improper data access. There are generally no available techniques of ensuring that data stored on disparate media will be secured using a repeated framework. Further, organizations and individual users face business and legal requirements to ensure that their data is secured in the face of these risks.

Conventional methods have attempted to address these problems through the issuance of secret keys that are used to encrypt and decrypt data blocks. For example, the Advanced Encryption Standard (AES) established by the U.S. National Institute of Standards and Technology provides an encryption scheme that uses a fixed block size of 128 bits and a key size of 128, 192, or 256 bits. The key size specifies the number of transformation rounds required to encrypt each data block to provide an acceptable level of data security.

Specifically, AES uses 10 transformation rounds for 128-bit keys, 12 transformation rounds for 192-bit keys, and 14 transformation rounds for 256-bit keys. Each transformation round consists of several processing steps, including byte substitution, shifting rows, mixing columns, and round key addition. A set of reverse transformation rounds are applied to decrypt each encrypted data block using the same key.

While conventional methods have provided adequate data security, they lack the ability to provide robust encryption in an efficient manner. For example, the multiple transformation rounds used in AES increase the computational complexity required for the encryption and decryption of data. Also, the encryption and decryption schemes of AES do not provide flexibility to support scalable solutions. Thus, there remains a need in the art for an improved encryption and decryption method that overcomes some or all of the drawbacks associated with existing methods and/or that offers other advantages compared to existing methods.

BRIEF SUMMARY OF THE INVENTION

The present invention is directed to methods and systems for encrypting and decrypting data using screens and inverse screens, respectively, in combination with logic blocks generated with linear-feedback shift registers (LFSRs). Various examples of encryption and decryption schemes are provided. Each encryption scheme includes a series of transformations that convert a data block into an encrypted data block by (a) applying at least one screen in accordance with a bit remapping operation and (b) applying one or more LFSR-generated logic blocks in accordance with a bit modification operation. Each decryption scheme includes a series of transformations that convert a previously-encrypted data block into the original data block by (a) applying at least one inverse screen in accordance with an inverse bit remapping operation and (b) applying the one or more LFSR-generated logic blocks in accordance with the bit modification operation. Preferably, the encryption and decryption schemes each utilize a single round of transformation steps to provide a high level of data security while allowing access to the data by authorized users and systems.

In some embodiments, the one or more LFSR-generated logic blocks used in the encryption and decryption schemes are generated from one or more LFSR objects—wherein the number of LFSR objects equals the number of logic blocks generated for each data block. Each LFSR object comprises a sequence of object bits that is used to generate a different logic block for each data block. The logic blocks are generated by (a) creating an LFSR seed comprising at least a portion of the object bits of the LFSR object, wherein the LFSR seed provides an initial state of an LFSR, (b) implementing the LFSR to generate a plurality of LFSR outputs, and (c) using the LFSR outputs to generate the logic blocks.

The present invention improves the functionality of computer devices by providing increased data security while minimizing the computational complexity of the encryption and decryption schemes. Also, the invention provides an improvement in computer technology by storing or transporting data within data blocks that have been encrypted using a unique encryption scheme while enabling access to the data via a corresponding decryption scheme.

Various embodiments of the present invention are described in detail below, or will be apparent to one skilled in the art based on the disclosure provided herein, or may be learned from the practice of the invention. It should be understood that the above brief summary of the invention is not intended to identify key features or essential components of the embodiments of the present invention, nor is it intended to be used as an aid in determining the scope of the claimed subject matter as set forth below.

BRIEF DESCRIPTION OF THE DRAWINGS

Various exemplary embodiments of the present invention are described in detail below with reference to the attached drawing figures, wherein:

FIG. 6 depicts exemplary movement instructions that are generated using the process of FIG. 5;

FIG. 14 depicts setup objects including a binary setup object 0, an integer setup object 1, and a binary setup object 2;

FIGS. 15A-15B depict LFSR objects including an LFSR object 0, an LFSR object 1, an LFSR object 2, and an LFSR object 3;

FIG. 16 depicts an initialization vector including a binary IV setup object, an IV offset vector, and LFSR object parameters;

FIG. 17 depicts a mask generated from the binary IV setup object of FIG. 16 and the binary setup object 2 of FIG. 14;

FIG. 18 depicts a directional setup object generated from the binary IV setup object of FIG. 16 and the binary setup object 0 of FIG. 14;

FIGS. 19A-19B depicts the bitwise pairing of the directional setup object of FIG. 18 and the integer setup object 1 of FIG. 14;

FIGS. 20A and 20B depict movement instructions for sub-screens 1-8 that are generated using the process of FIG. 5;

FIG. 21 depicts the masks to be used with sub-screens 1-8 that are generated from the mask of FIG. 17;

FIGS. 22A-22D depict the process of generating the remapping relationships for sub-screen 1 using the process of FIG. 7;

FIG. 23 depicts sub-screens 1-8 that are generated using the process of FIG. 7;

FIG. 24 depicts a screen that is generated from assembling sub-screens 1-8 of FIG. 23;

FIG. 25 depicts the screen of FIG. 24 provided with both index positions and cell references;

FIG. 26 depicts the inverse screen corresponding to the screen of FIG. 25 provided with both index positions and cell references;

FIG. 27 depicts a seed of LFSR A;

FIGS. 28A-28B depict the steps of LFSR A (with some bits omitted) from which the first three XOR blocks are created;

FIG. 29 depicts the first three XOR blocks generated by LFSR A (forward and reverse) for input data block 0, input data block 1, and input data block 2;

FIG. 30 depicts a seed of LFSR B;

FIGS. 31A-31B depict the steps of LFSR B (with some bits omitted) from which the first three XOR blocks are created;

FIG. 32 depicts the first three XOR blocks generated by LFSR B (forward and reverse) for input data block 0, input data block 1, and input data block 2;

FIG. 33 depicts a seed of LFSR C;

FIGS. 34A-34B depict the steps of LFSR C (with some bits omitted) from which the first three XOR blocks are created;

FIG. 35 depicts the first three XOR blocks generated by LFSR C (forward and reverse) for input data block 0, input data block 1, and input data block 2;

FIG. 36 depicts a seed of LFSR D;

FIGS. 37A-37B depict the steps of LFSR D (with some bits omitted) from which the first three XOR blocks are created;

FIG. 38 depicts the first three XOR blocks generated by LFSR D (forward and reverse) for input data block 0, input data block 1, and input data block 2;

FIGS. 39A-39B depict the XOR blocks for input data block 0, input data block 1, and input data block 2;

DETAILED DESCRIPTION OF EXEMPLARY EMBODIMENTS

Figure 1:
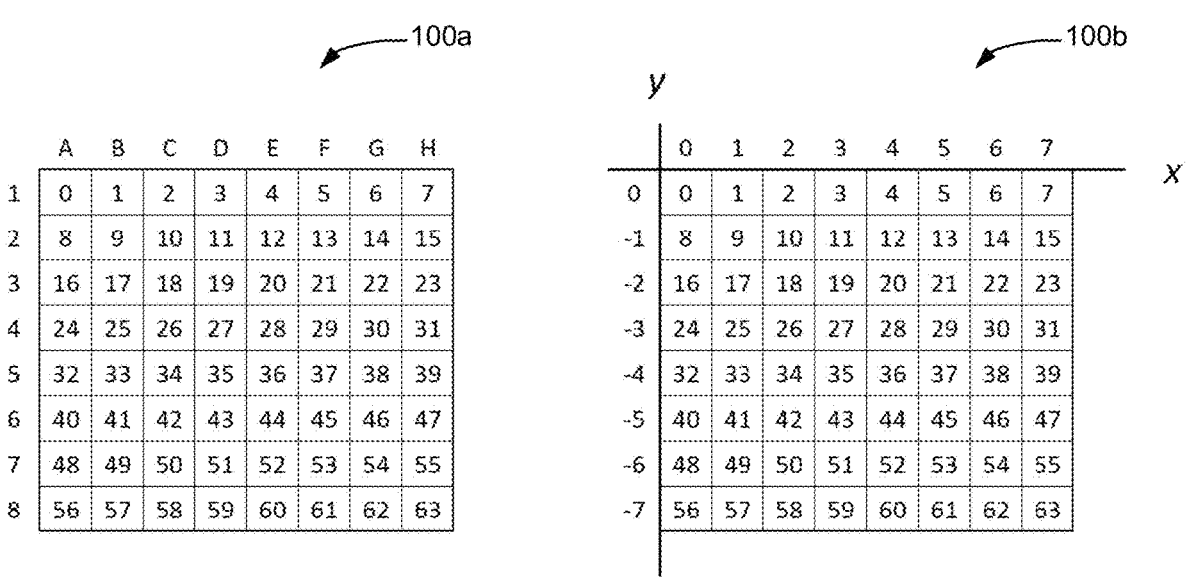
FIG. 1 depicts an index block with both cell references and index coordinates.

The present invention is directed to methods and systems for encrypting and decrypting data using screens and inverse screens, respectively, in combination with logic blocks generated with linear-feedback shift registers (LFSRs). While the invention will be described in detail below with reference to various exemplary embodiments, it should be understood that the invention is not limited to the specific configurations or methodologies of these embodiments. In addition, although the exemplary embodiments are described as embodying several different inventive features, one skilled in the art will appreciate that any one of these features could be implemented without the others in accordance with the present invention.

In the present disclosure, references to "one embodiment," "an embodiment," "an exemplary embodiment," or "embodiments" mean that the feature or features being described are included in at least one embodiment of the invention. Separate references to "one embodiment," "an embodiment," "an exemplary embodiment," or "embodiments" in this disclosure do not necessarily refer to the same embodiment and are also not mutually exclusive unless so stated and/or except as will be readily apparent to one skilled in the art from the description. For example, a feature, structure, function, etc. described in one embodiment may also be included in other embodiments, but is not necessarily included. Thus, the present invention can include a variety of combinations and/or integrations of the embodiments described herein.

The disclosure provided below uses various terms to describe the encryption and decryption schemes of the present invention. The meaning of these terms should be understood from the context of the disclosure as further defined in Table 1 below:

TABLE 1

| Term | Definition |
| --- | --- |
| Binary Object | An object consisting of a tuple of random bits. |
| Bit | A binary digit having a value of 0 or 1. |
| Bit Modification Operation | A logical operation in which first and second input bits determine an output bit. The logical operation is its own inverse to enable use in both a cipher and inverse cipher. Examples of such a logical operation include an XOR logical operation and an XNOR logical operation. |
| Bit Remapping Operation | Transformation used in a cipher that remaps each bit from its current index position to a destination index position. |
| Block | A block-sized tuple of bits positioned within an index block. |
| Block Size | Length or size of a block (in bits), denoted as "B." |
| Cipher | A series of transformations that converts plaintext to ciphertext in accordance with an encryption scheme that applies at least one screen and at least one logic block to each data block. |
| Ciphertext | Data output from a cipher or input to an inverse cipher. |
| Data Block | A block containing a segment of plaintext. |
| Index Block | A block-sized tuple of index positions. |
| Index Position | An integer representing the position of a specific bit within an index block, denoted as "i." |
| Initialization Vector | Initialization data used to generate a screen, inverse screen, and/or logic blocks, denoted as "IV." |
| Integer Object | An object consisting of a tuple of random non-negative decimal integers. |
| Inverse Bit Remapping Operation | Transformation used in an inverse cipher that is the inverse of a bit remapping operation. |
| Inverse Cipher | A series of transformations that converts ciphertext to plaintext in accordance with a decryption scheme that applies at least one inverse screen and at least one logic block to each encrypted data block. |

6

TABLE 1-continued

| Term | Definition |
| --- | --- |
| Inverse Screen | A block-sized tuple of rearranged index positions for use in performing an inverse bit remapping operation. |
| LFSR Object | A binary object used to generate logic blocks, denoted as "LO." |
| Linear-Feedback Shift Register | A shift register in which an output bit is a linear function of its previous state, denoted as "LFSR." |
| Logic Block | A block containing a plurality of bits for use in performing a bit modification operation. Examples of such a block include an XOR block and an XNOR block. |
| Mask | A block containing a plurality of mask bits for use in generating a screen and inverse screen. |
| Movement Instructions | A set of instructions describing where to move each index position within an index block for use in generating a screen and inverse screen. |
| Object | A secret, cryptographic tuple of data that may be used by a cipher or inverse cipher. |
| Object Length or Object Size | For a binary object, the length or size of the object in bits. For an integer object, the number of integer elements that comprise the object. |
| Offset Vector | An xy-coordinate that shifts each movement instruction by a fixed amount for use in generating a screen and inverse screen. |
| Plaintext | Data input to a cipher or output from an inverse cipher. |
| Screen | A block-sized tuple of rearranged index positions for use in performing a bit remapping operation. |
| Setup Object | A binary object or integer object used to generate a screen or inverse screen, denoted as "SO." |
| Sub-Block | A sub-block-sized subset of a block. |
| Sub-Block Size | Length or size of a sub-block (in bits), denoted as "R.". The sub-block size R is a factor of the block size B, such that R = B/x for some positive integer x. |
| Sub-Screen | A sub-block-sized subset of a screen. Multiple sub-screens are combined to create a screen. |
| Tuple | A collection of elements that is ordered (i.e., a sequence) and may have duplicate elements. |
| XNOR Block | A logic block for use in performing an XNOR logical operation. |
| XNOR Logical Operation | Exclusive-NOR operation. |
| XOR Block | A logic block for use in performing an XOR logical operation. |
| XOR Logical Operation | Exclusive-OR operation. |

As described below, the present invention is implemented on a computing device configured to identify data to be encrypted (i.e., the plaintext). For example, data may be identified for encryption if the data is being stored locally or remotely in a context that requires encryption or transported in a context that requires encryption. The context that requires encryption may be based, for example, on a policy associated with one or more of the computing device, a user, an organization, a network, a software application, or any other attributes.

The computing device is configured to divide the identified data into multiple data segments based upon a selected block size. It can be appreciated that the number of data segments is dependent on the size of the identified data and the selected block size. For example, if the computing device identifies a file of 1 megabyte for encryption and the selected block size is 128 bits, the computing device will divide the file into 62,500 data segments. Exemplary block sizes are 32 bits, 64 bits, 128 bits, 256 bits, 512 bits, 1,024 bits, 2,048 bits, 4,096 bits, 8, 192 bits, 16,384 bits, 32,768 bits, 65,536 bits or greater. Of course, other block sizes may be used within the scope of the present invention.

The computing device is also configured to position the bits of each data segment within an index block to create a data block. The index block is a virtual structure that identifies a plurality of index positions arranged in a predetermined manner. The virtual structure may comprise a one-dimensional array (i.e., a linear array of data), a two-dimensional array (i.e., data arranged in rows and columns), a three-dimensional array (i.e., an array of two-dimensional arrays), or any other type of data structure known in the art. Each index position may contain a single bit or a plurality of bits (e.g., eight bits) of the data segment.

The computing device is also configured to implement a cipher comprising a series of transformations that converts plaintext to ciphertext. The cipher utilizes an encryption scheme that applies at least one screen and at least one LFSR-generated logic block to each data block. The screen is applied in connection with a bit remapping operation that remaps the bits in each data block, and the LFSR-generated logic block is applied in connection with a bit modification operation that modifies certain bits in each data block. Preferably, the cipher applies the transformations in a single transformation round.

The computing device is further configured to implement an inverse cipher comprising a series of transformations that converts ciphertext to plaintext. The inverse cipher utilizes a decryption scheme that applies at least one inverse screen and at least one LFSR-generated logic block to each previously-encrypted data block. The inverse screen is applied in connection with an inverse bit remapping operation that remaps the bits in each encrypted data block, and the LFSR-generated logic block is applied in connection with a bit modification operation that modifies certain bits in each encrypted data block. Preferably, the inverse cipher applies the transformations in a single transformation round.

Examples of different encryption and decryption schemes that may be implemented in accordance with the present invention are provided in Table 2 below:

TABLE 2

| Encryption Scheme | Decryption Scheme |
|---|---|
| Step 1: Apply Logic Block | Step 1: Apply Inverse Screen |
| Step 2: Apply Screen | Step 2: Apply Logic Block |
| Step 1: Apply Screen | Step 1: Apply Logic Block |
| Step 2: Apply Logic Block | Step 2: Apply Inverse Screen |
| Step 1: Apply Logic Block Group | Step 1: Apply Inverse Screen |
| Step 2: Apply Screen | Step 2: Apply Logic Block Group |
| Step 1: Apply Screen | Step 1: Apply Logic Block Group |
| Step 2: Apply Logic Block Group | Step 2: Apply Inverse Screen |
| Step 1: Apply Logic Block A | Step 1: Apply Logic Block B |
| Step 2: Apply Screen | Step 2: Apply Inverse Screen |
| Step 3: Apply Logic Block B | Step 3: Apply Logic Block A |
| Step 1: Apply Logic Block Group A | Step 1: Apply Logic Block Group B |
| Step 2: Apply Screen | Step 2: Apply Inverse Screen |
| Step 3: Apply Logic Block Group B | Step 3: Apply Logic Block Group A |

With reference to Table 2, it can be seen that the same LFSR-generated logic block(s) are used in both the encryption and decryption schemes—i.e., the bit modification operation performed by each logic block is its own inverse.

It can also be seen that the LFSR-generated logic block(s) may be applied before and/or after the screen/inverse screen, as shown, and may comprise a single logic block or a logic block group (i.e., two or more logic blocks). The encryption and decryption schemes shown in Table 2 apply a single screen and a single inverse screen, respectively; however, multiple screens and inverse screens may be applied in other schemes. Of course, other encryption and decryption schemes that apply at least one screen/inverse screen and at least one LFSR-generated logic block—and optionally other types of transformations (including, but not limited to, one or more stumbling blocks as described in U.S. Pat. No. 10,902,142)—will be apparent to one skilled in the art.

The same screen/inverse screen and logic block(s) may be applied to all of the data blocks during an encryption/decryption session, or, the screen/inverse screen and/or logic block(s) may be unique to each data block that is processed during the encryption/decryption session.

In a preferred embodiment, the encryption scheme encrypts each of the data blocks by applying one or more logic blocks, then applying a screen, and then applying one or more logic blocks. Conversely, the decryption scheme decrypts each of the previously-encrypted data blocks by applying one or more logic blocks, then applying an inverse screen, and then applying one or more logic blocks. The logic blocks applied before the screen during the encryption process are the same logic blocks applied after the inverse screen during the decryption process and, similarly, the logic blocks applied after the screen during the encryption process are the same logic blocks applied before the inverse screen during the decryption process. In this embodiment, the same screen is used to encrypt all of the data blocks during an encryption session and, similarly, the same inverse screen is used to decrypt all of the encrypted data blocks during a decryption session. However, the logic blocks are unique to each data block during the encryption/decryption session.

The length of an encryption/decryption session may comprise any period of time determined by a particular implementation. For example, an encryption/decryption session may begin when a user opens a software application and end when the user closes the software application. As another example, an encryption/decryption session may comprise a defined period of time. As yet another example, an encryption/decryption session may be determined by the amount of data processed by a computing device e.g., a session may end when the amount of processed data reaches a predetermined number of bytes. Of course, other ways to determine the length of an encryption/decryption session will be apparent to one skilled in the art.

As described in greater detail below, the screen and inverse screen are generated based on movement instructions created from a binary object and an integer object. In a preferred embodiment, the binary object and integer object are derived from a combination of public and private data such as an initialization vector and setup objects. The screen and inverse screen may also be generated based on a mask created from one or more binary objects. In a preferred embodiment, the mask is created from a combination of public and private setup objects. The screen and inverse screen may also be generated based on an offset vector.

As described in greater detail below, each logic block is generated based on one or more binary objects. In a preferred embodiment, each logic block is created from an LFSR object using a linear-feedback shift register, wherein each LFSR object is used to create a unique logic block for each data block to be processed. Thus, the number of LFSR objects equals the number of logic blocks generated for each data block during the encryption/decryption session (although additional LFSR objects may be provided that are not used to generate logic blocks, as described below).

One type of logic block is an XOR block. Specifically, an XOR block may be used to perform an XOR logical operation in which the output is true only when the inputs are different, as shown in Table 3 below:

TABLE 3

| Input 1 | Input 2 | Output |
|---------|---------|--------|
| 0 | 0 | 0 |
| 1 | 1 | 0 |
| 0 | 1 | 1 |
| 1 | 0 | 1 |

Another type of logic block is an XNOR block. Specifically, an XNOR block may be used to perform an XNOR logical operation in which the output is true only when the inputs are the same, as shown in Table 4 below:

TABLE 4

| Input 1 | Input 2 | Output |
|---------|---------|--------|
| 0 | 0 | 1 |
| 1 | 1 | 1 |
| 0 | 1 | 0 |
| 1 | 0 | 0 |

Thus, it can be appreciated that an XNOR block is equivalent to an XOR block in the context of the present invention—i.e., an XNOR logical operation is simply an XOR logical operation in which the output is inverted. Notably, an XOR block and an XNOR block are their own inverse and can be used in both the cipher and inverse cipher as described herein.

Provided in Section I below is a detailed description of exemplary encryption and decryption schemes that may be used in accordance with the present invention. Also provided in Section II below is a detailed description of exemplary computing devices and methods that may be used to encrypt and decrypt data blocks for secure storage or transport of data in accordance with the present invention.

I. Exemplary Encryption and Decryption Schemes

A. Index Block

In an exemplary embodiment, the index block comprises a plurality of index positions representing the position of a specific bit within an index block arranged as a two-dimensional array—i.e., the index positions consist of consecutive integers from 0 to B−1, starting in the top-left corner and increasing from left to right and then row-wise in carriage-return fashion, with B−1 in the bottom-right corner. Thus, this embodiment utilizes a 0-based numbering scheme (although a 1-based numbering scheme could alternatively be used).

FIG. 1 shows an example of an index block 100a formatted as a square and having 8 rows (rows 1-8) and 8 columns (columns A-H) to provide 64 index positions, as shown, wherein each index position may be referenced by its column and row position within index block 100a. FIG. 1 shows an example of an alternative index block 100b that is situated in Quadrant IV of the rectangular coordinate plane, wherein each index position may be referenced by its xy-coordinate within index block 100b. One skilled in the art will appreciate that index blocks 100a and 100b may be used to create a data block containing 64 bits (if a single bit is placed in each index position) or a data block containing 512 bits (if eight bits are placed in each index position). Of course, other block sizes may be used in accordance with the present invention.

B. Object Sets

In this embodiment, the encryption and decryption schemes use two object sets—a setup object set and an LFSR object set. The setup object set includes a binary setup object 0 (SO_0), an integer setup object 1 (SO_1), and optionally a binary setup object 2 (SO_2). The LFSR object set includes a plurality of LFSR objects (LO_0, LO_1, etc.). Each object consists of a sequence of cryptographically random bits or integers.

The binary setup object 0 (SO_0) is used to generate movement instructions in connection with the sub-screen generation process. In this embodiment, the binary setup object 0 (SO_0) comprises a sequence of bits having a length of 2B.

The integer setup object 1 (SO_1) is also used to generate movement instructions in connection with the sub-screen generation process. In this embodiment, the integer setup object 1 (SO_1) comprises a sequence of positive integers having a length of 2B, wherein the integers preferably cover the entire range of possible integer values with equal probability. For a sub-block having a size R with m rows and n columns, the integer setup object 1 (SO_1) may be expressed as follows:

$$\text{For odd } i: 0 \leq SO\_1_i < n$$

$$\text{For even } i: 0 \leq SO\_1_i < m$$

The binary setup object 2 (SO_2) is optionally used to generate a mask in connection with the sub-screen generation process. In this embodiment, the binary setup object 2 (SO_2) comprises a sequence of bits having a length of B.

It should be understood that the setup objects may be larger than the lengths specified above, especially when it is desirable to maintain flexibility to enable the utilization of multiple different block sizes. In that case, only the first B or 2B elements—bits or integers—in the sequence will be considered to be SO_n for use in connection with the sub-screen generation process.

The LFSR objects (LO_0, LO_1, etc.) are used to create logic blocks in connection with the logic block generation process. In this embodiment, each LFSR object has the same size and comprises a sequence of bits having a length that is greater than the maximum LFSR seed length (λ) identified in the LFSR object parameters contained in the initialization vector or configuration settings, as described below. Each LFSR object is used to create a plurality of logic blocks-one for each of the data blocks. Thus, the number of LFSR objects equals the number of logic blocks created for each of the data blocks in accordance with the encryption/decryption schemes. Of course, in other embodiments, the LFSR object set could include a larger number of LFSR objects, some of which will not be used to create logic blocks. For example, if there are eight LFSR objects but the encryption/decryption scheme only requires the creation of four logic blocks for each of the data blocks, then only four of the eight LFSR objects will be used.

In some embodiments, the object sets are assigned by an organization, software manufacturer, or other third party. For example, the Information Technology (IT) department of an organization could assign the object sets to each employee when issuing a computing device for use at the organization. As another example, a software manufacturer could provide the object sets associated with the operating system (OS) installed on a computing device, wherein the computing device may not be used without those object sets. Thus, the objects in the object sets are private objects that may be used across different encryption/decryption sessions. It should be understood that the object sets could be stored on the computing device or on a storage device separate from the computing device.

C. Initialization Vector (IV)

In this embodiment, the encryption and decryption schemes use an initialization vector that includes three components: (1) a binary IV setup object (BIVSO), (2) an IV offset vector, and (3) LFSR object parameters. These components are provided by a trusted authority (i.e., public data) for use during a single encryption/decryption session. In some embodiments, the initialization vector is manipulated such that an attacker would not be able to parse the components (e.g., the complexity of the initialization vector or the amount of interaction with the initialization vector could be greater to increase unknown variables).

The binary IV setup object is used in connection with the sub-screen generation process. In this embodiment, the binary IV setup object comprises a sequence of bits having a length of 2B.

The IV offset vector is also used in connection with the sub-screen generation process. In this embodiment, the IV offset vector comprises two integers (p, q). For a sub-block having a size R with m rows and n columns, the two integers (p, q) of the IV offset vector may be expressed as follows:

$$p \in \mathbb{Z} : 0 \le p < n$$

$$q \in \mathbb{Z} : -m < q \le 0$$

The LFSR object parameters are used in connection with the logic block generation process. In this embodiment, the LFSR object parameters specify seven types of information for each logic block:

1. LFSR Object: The specific LFSR object (LO_n) from which the bits shall be retrieved to populate the seed used to generate the logic block. As described below, the seed is the initial value of the LFSR.
2. Position: The position of the logic block within the cipher. Logic blocks placed before the screen are said to be at the "front" of the cipher, while logic blocks placed after the screen are said to be at the "back" of the cipher.
3. LFSR Direction: A logic block generated from an LFSR will be referred to as either a "forward" logic block or a "reverse" logic block, as described below. In embodiments where multiple logic blocks are used on each side of the screen, the logic blocks may be generated by operation of their corresponding LFSRs in the same direction or in opposing directions. For example, if there are two logic blocks ("A" and "B") at the front of the cipher and two logic blocks ("C" and "D") at the back of the cipher, logic blocks A and C may be generated by operation of their corresponding LFSRs in the forward direction and logic blocks B and D may be generated by operation of their corresponding LFSRs in the reverse direction (or vice versa). Alternatively, logic blocks A, B, C and D may all be generated by operation of their corresponding LFSRs in the same direction.
4. LFSR Seed Length: The LFSR seed length ($\lambda$) is the length of the seed used to generate the logic block. The LFSR seed length ($\lambda$) is a distinct integer greater than the block size B (e.g., B+1, B+2, B+3, B+4, etc.), which may be expressed as follows:

$$\lambda > B$$

5. LFSR Rate: The LFSR rate ($\rho$) is the number of "steps" that the LFSR progresses for each data block processed. The LFSR rate ($\rho$) is a positive integer that is preferably between the sub-block size R and the block size B, which may be expressed as follows:

$$R \le \rho \le B$$

In this embodiment, the LFSR rate ($\rho$) is equal to the sub-block size R, and the same LFSR rate ($\rho$) is used for all LFSRs. Of course, in other embodiments, the LFSR rate ($\rho$) may have different values—e.g., when the invention is implemented in software, it may be advantageous to use an LFSR rate ($\rho$) of 1. Also, the LFSR rate ($\rho$) may vary between different LFSRs and/or the LFSR rate ($\rho$) may vary within the same LFSR. Various implementations will be apparent to one skilled in the art.

6. Start Bit Position: The index position of the start bit (i) that determines the first bit of a $\lambda$-length sequence of bits of the LFSR object that will be used to populate the seed, which may be expressed as follows (assuming 0-based numbering):

$$0 \le i \le |LO\_n| - 1$$

7. Tap Bit Positions: The index positions of the tap bits that affect the calculation of the next output of the LFSR. The tap combination selected for each LFSR may be based on a primitive polynomial relative to the LFSR seed length ($\lambda$) such that the maximum number of unique permutations may be generated. The number of permutations related to the taps should preferably exceed the desired maximum number of data blocks that need to be securely processed in an encryption/decryption session. The optimal tap combinations are preferably pre-selected for each allowable LFSR seed length ($\lambda$).

It should be understood that one or more of the above parameters—e.g., the position of the logic block within the cipher, the LFSR direction, and/or the LFSR rate ($\rho$)—may be set in the overall configuration settings of the encryption/decryption scheme and excluded from the initialization vector configuration.

An example set of LFSR object parameters for a block size B of 128 bits and a logic block quantity (N) of 4 is shown in Table 5 below:

TABLE 5

| Logic Block | LFSR Object | Position | LFSR Direction | LFSR Seed Length $\lambda$ | LFSR Rate $\rho$ | Start Bit Position i | Tap Bit Positions |
|---|---|---|---|---|---|---|---|
| A | LO_0 | Front | Forward | 129 | 16 | 199 | 128, 123 |
| B | LO_2 | Front | Reverse | 130 | 16 | 42 | 129, 126 |
| C | LO_3 | Back | Forward | 131 | 16 | 252 | 130, 129, 83, 82 |
| D | LO_1 | Back | Reverse | 132 | 16 | 18 | 131, 102 |

Of course, it should be understood that the block size B and logic block quantity (N) will vary between different implementations. For example, as discussed above, it is possible to use a single logic block at the front of the cipher and a single logic block at the back of the cipher within the scope of the present invention.

D. Generation of Screen and Inverse Screen

The setup object set and initialization vector described above are used to generate a screen for a bit remapping operation and an inverse screen for an inverse bit remapping operation. Each screen provides a set of remapping instructions that identifies a correspondence between a plurality of original index positions and a plurality of destination index positions within an index block.

In this embodiment, a sub-screen generation process is used to generate an integer quantity (x) of unique sub-screens, each of size R, which are then combined to assemble a full screen of size B, as follows:

$$R=B/x{:}x \in \mathbb{Z}{:} \; R{\geq}16 \text{ bits}$$

One skilled in the art will appreciate that the generation of sub-screens requires less hardware and increases performance compared to the generation of a full screen, but does not have a significant impact on the level of data security. Of course, in other embodiments, the process used to generate the sub-screens may be used to generate the full screen, in which case the sub-screen assembly process would not be required.

1. Generation of Sub-Screens

In this embodiment, the sub-screens are generated in accordance with the following steps: (1) obtain the objects and information needed to generate the sub-screens, as described below in connection with FIG. 2; (2) generate a directional setup object (DSO), as described below in connection with FIG. 3; (3) generate a mask, as described below in connection with FIG. 4; (4) generate movement instructions, as described below in connection with FIGS. 5 and 6; and (5) generate each sub-screen based on the movement instructions, the mask, and the offset vector, as described below in connection with FIGS. 7-9. Each of these steps will now be described in greater detail.

Figure 2:
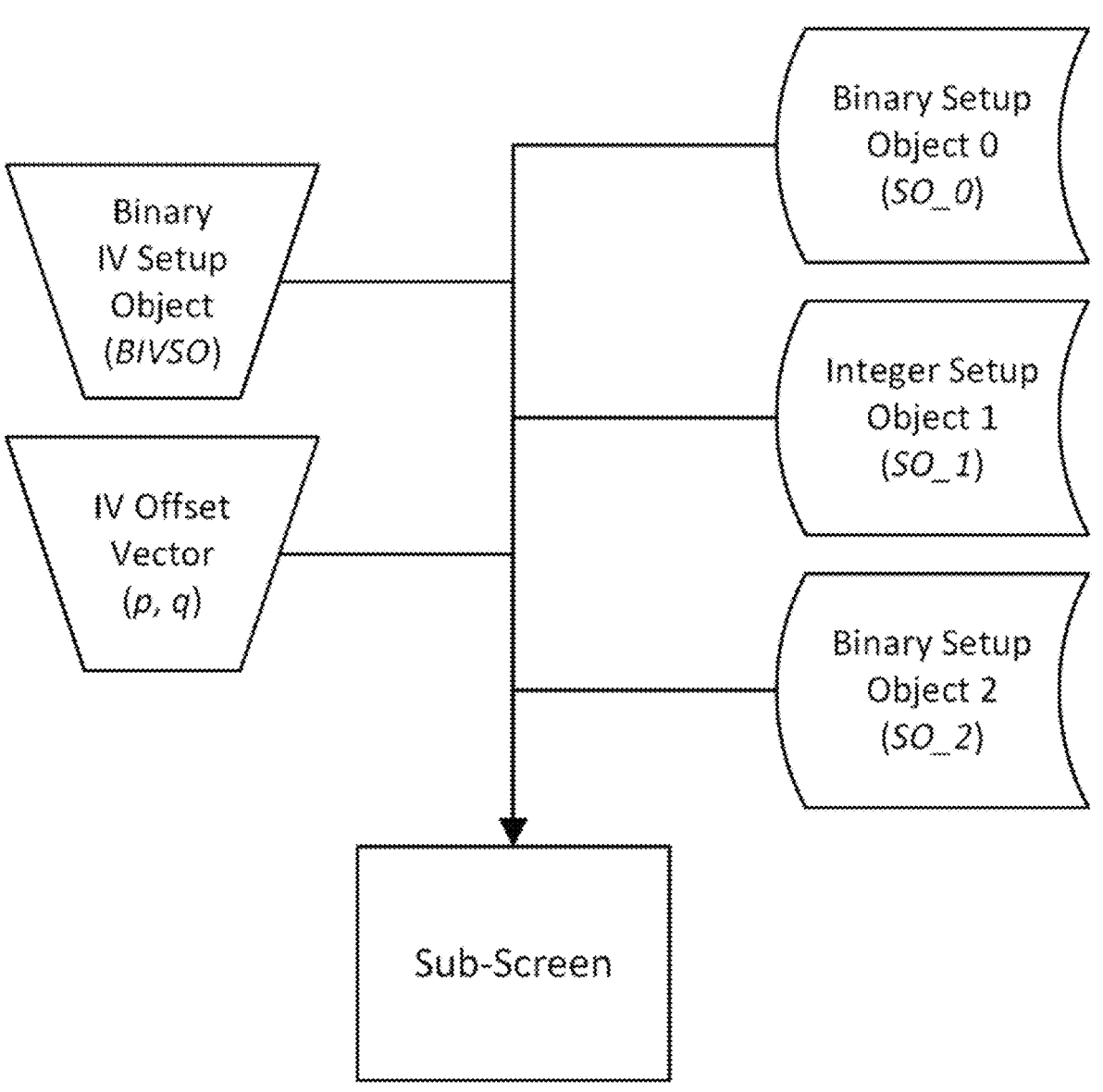
FIG. 2 depicts the components used in a sub-screen generation process, including the components of an initialization vector (a Binary IV setup object and an IV offset vector) and three setup objects (a binary setup object 0, an integer setup object 1, and a binary setup object 2)

First, the objects and information needed to generate the sub-screens are obtained, as shown in FIG. 2. In this embodiment, the objects and information include the binary setup object 0 (SO_0), the integer setup object 1 (SO_1), the binary setup object 2 (SO_2), the binary IV setup object (BIVSO), and the IV offset vector (p, q).

Figure 3:
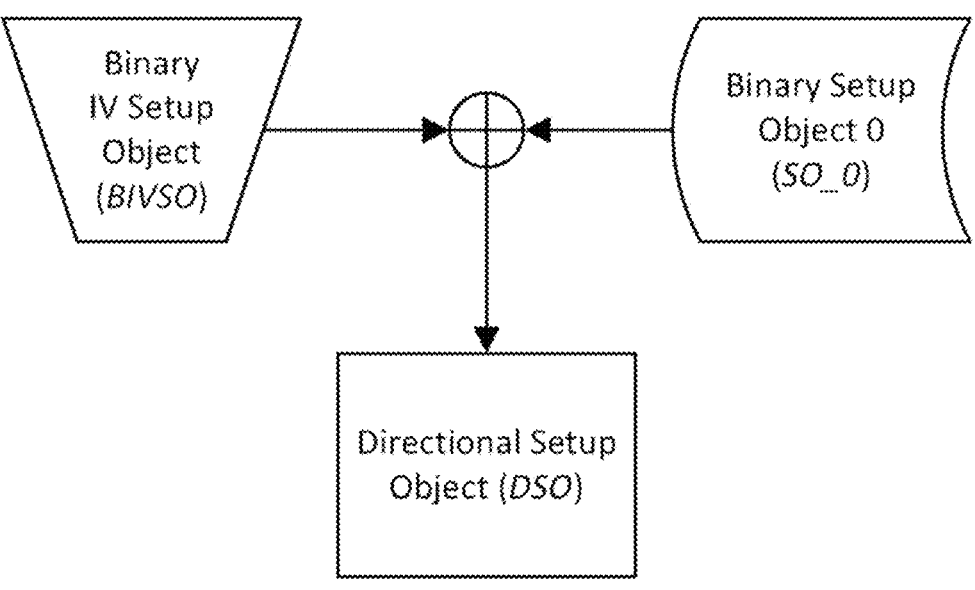
FIG. 3 depicts a process for generating a binary object based on the Binary IV setup object and the binary setup object 0 of FIG. 2.

Second, as shown in FIG. 3, a directional setup object (DSO) is created by implementing an XOR operation in which (1) the binary IV setup object (BIVSO) and the binary setup object 0 (SO_0) are the inputs to the XOR operation and (2) the directional setup object (DSO) is the output of the XOR operation. It can be appreciated that the XOR operation is applied on an index position-by-index position basis—e.g., the bit contained is the first index position of the binary IV setup object (BIVSO) is XOR-ed with the bit in the first index position of the binary setup object 0 (SO_0) to generate the bit in the first index position of the directional setup object (DSO), etc. Of course, in other embodiments, an XNOR operation may be used instead of the XOR operation.

Figure 4:
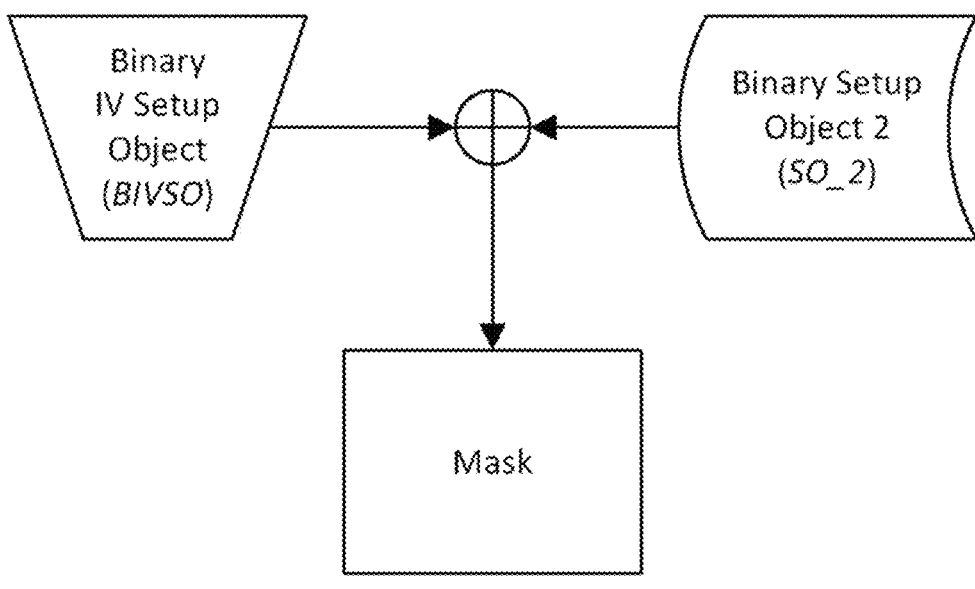
FIG. 4 depicts a process for generating a mask based on the Binary IV setup object and the binary setup object 2 of FIG. 2.

Third, as shown in FIG. 4, the mask is created by implementing an XOR operation in which (1) the binary IV setup object (BIVSO) and the binary setup object 2 (SO_2) are the inputs to the XOR operation and (2) the mask is the output of the XOR operation. It can be appreciated that the XOR operation is applied on an index position-by-index position basis e.g., the bit contained is the first index position of the binary IV setup object (BIVSO) is XOR-ed with the bit in the first index position of the binary setup object 2 (SO_2) to generate the bit in the first index position of the mask, etc. It can be appreciated that only B bits of the binary IV setup object (BIVSO) are used to generate the mask. In other embodiments, the binary setup object 2 (SO_2) is not used and B bits of the binary setup object 0 (SO_0) are used in its place to generate the mask. Of course, in other embodiments, an XNOR operation may be used instead of the XOR operation.

Figure 5:
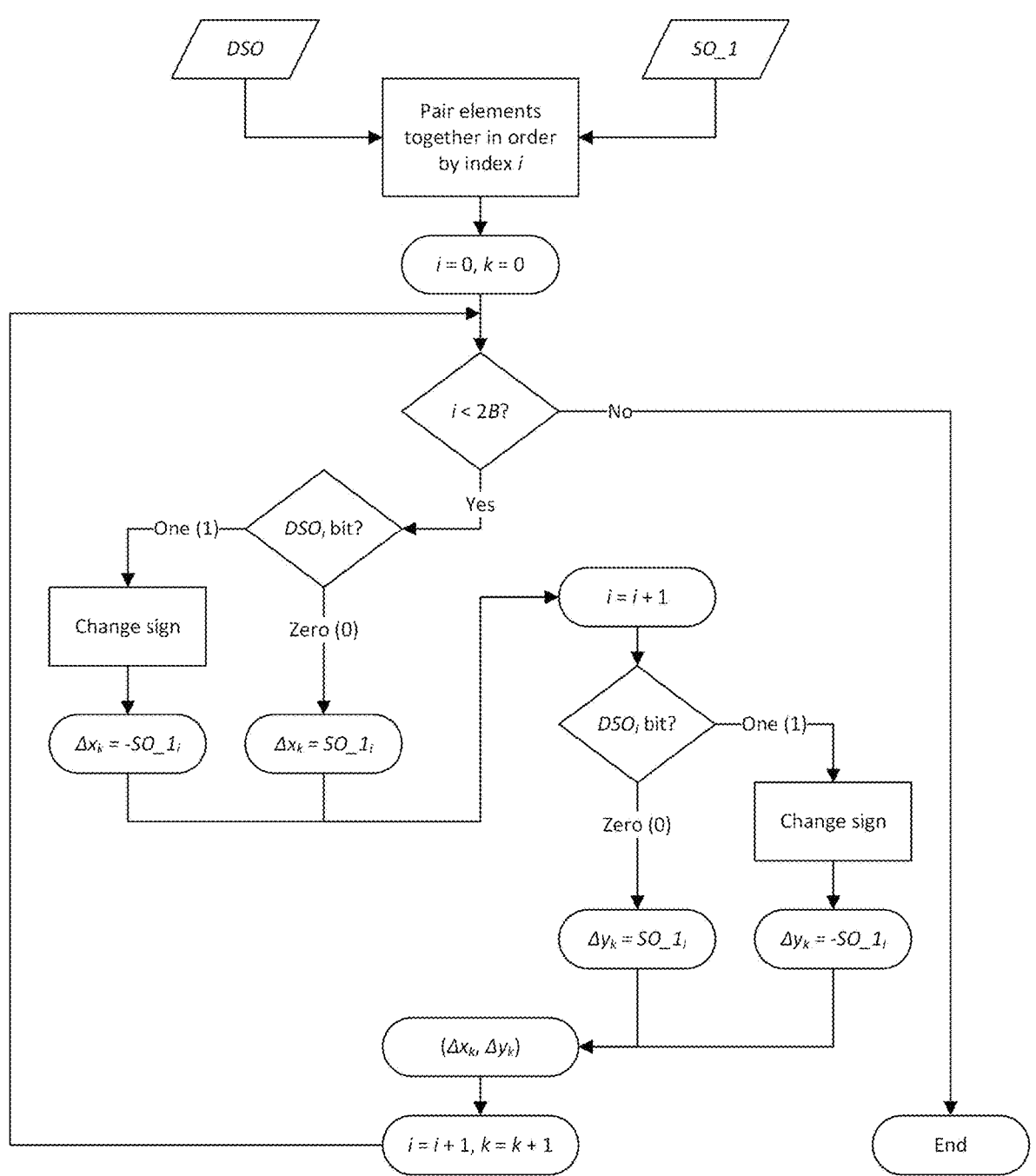
FIG. 5 depicts a process for generating a movement instructions table based on the binary object of FIG. 3 and the integer setup object 1 of FIG. 2.

Fourth, the movement instructions are generated in accordance with the flow chart shown in FIG. 5. As can be seen, the bits of the directional setup object (DSO) and the integers of the integer setup object 1 (SO_1) are paired together by index position. Examples of four such pairings are shown in Table 6 below:

TABLE 6

| Index Position (i) | 0 | 1 | 2 | 3 |
|---|---|---|---|---|
| DSO | 0 | 1 | 0 | 1 |
| S0_1 | 7 | 6 | 1 | 2 |

As shown in the flow chart, two successive pairings are interpreted as a movement instruction—i.e., an xy-coordinate representing a shift in each direction for a particular index position, denoted as ($\Delta$x, $\Delta$y). The bit of the directional setup object (DSO) determines the sign of the corresponding integer of the integer setup object 1 (SO_1)—i.e., a bit of "0" is positive and a bit of "1" is negative.

Two exemplary movement instructions corresponding to the four pairings of Table 6 are shown in FIG. 6 as reference numbers 600a and 600b. As can be seen, the bit of $DSO_0$ (i.e., a "0" bit) and the integer of $SO\_1_0$ (i.e., the integer "7") are converted to a $\Delta$x of 7, and the bit of $DSO_1$ (i.e., a "1" bit) and the integer of $SO\_1_1$ (i.e., the integer "6") are converted to a $\Delta$y of −6. Thus, movement instruction 0 is (7, −6), indicating that the input index position should move right 7 positions and down 6 positions within the index block. Similarly, the bit of $DSO_2$ (i.e., a "0" bit) and the integer of $SO\_1_2$ (i.e., the integer "1") are converted to a $\Delta$x of 1, and the bit of $DSO_3$ (i.e., a "1" bit) and the integer of $SO\_1_3$ (i.e., the integer "6") are converted to a $\Delta$y of −2. Thus, movement instruction 1 is (1, −2), indicating that the input index position should move right 1 position and down 2 positions within the index block. This process continues until all the bits of the directional setup object (DSO) and all the integers of integer setup object 1 (SO_1) have been converted to movement instructions as described above. It should be understood that the movement instructions provide the initial remapping instructions for each of the index positions of the index block in terms of horizontal and vertical movement.

Figure 7:
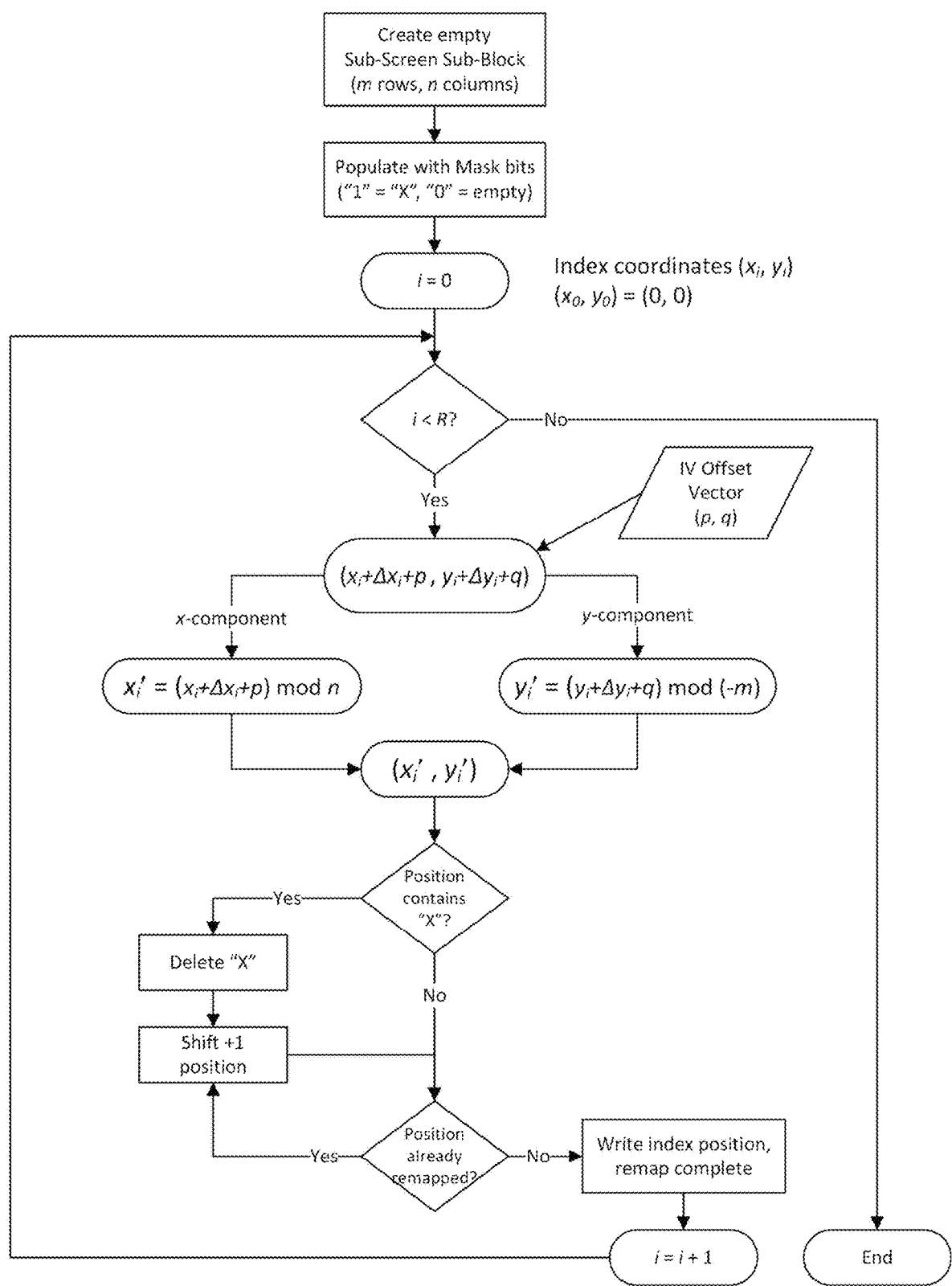
FIG. 7 depicts a process for generating sub-screen remapping relationships.

Fifth, the movements instructions, the mask, and the offset vector are used to generate the remapping relationships for each sub-screen in accordance with the flow chart shown in FIG. 7. Each sub-screen is given a number from 1 to B/R based on its order within the final full screen. Sub-screen 1 includes index positions 0 through (R−1) of the full screen, sub-screen 2 includes index positions R through (2R−1) of the full screen, sub-screen 3 includes index positions 2R through (3R−1) of the full screen, etc.

As shown in the flow chart, the process of creating the remapping relationships for each sub-screen begins by creating an empty sub-block of sub-block size R, with m rows and n columns, and pre-populating the index positions of the sub-block with the corresponding mask bits. A mask bit of "1" causes an "X" to be placed in the index position and a mask bit of "0" causes the index position to remain empty. Working in sequential order through each of the index positions, the process adds the coordinates of the input index position $(x_i, y_i)$, the movement instruction $(\Delta x_i, \Delta y_i)$, and the IV offset vector $(p, q)$ to find the coordinates of the destination index position $(x_i', y_i')$, as shown in the following equations:

$$x_i' = (x_i + \Delta x_i + p) \bmod n$$

$$y_i' = (y_i + \Delta y_i + q) \bmod (-m)$$

All x- and y-components must fall within the sub-block, and values falling outside the sub-block are adjusted using modular arithmetic.

The process then checks the contents of the destination index position $(x_i', y_i')$ and proceeds in accordance with the following rules:

1. If the destination index position is empty (i.e., does not contain an "X" or a remapped input index position), then the input index position is written into that index position. The remapping relationship between the input index position and destination index position is complete, and the process starts over with the next input index position.

2. If the destination index position contains an "X," the "X" is deleted from that index position. The input index position is then shifted to the next larger index position, one position at a time, until it arrives at a destination index position that does not already contain a remapped input index position (i.e., a destination position that is either empty or contains an "X"). The input index position is then written into that index position. The remapping relationship between the input index position and destination index position is complete, and the process starts over with the next input index position.

3. If the destination index position contains a remapped input index position, the input index position is shifted to the next larger index position, one position at a time, until it arrives at a destination index position that does not already contain a remapped input index position (i.e., a destination position that is either empty or contains an "X"). The input index position is then written into that index position. The remapping relationship between the input index position and destination index position is complete, and the process starts over with the next input index position.

In the above rules, any shifting of an input index position to the next larger index position requires movement to the right and wrapping to the next row down in carriage-return fashion within the sub-block. It can be appreciated that the above process is repeated until every index position in the sub-screen contains a remapped input index position.

Figures 8, 9:
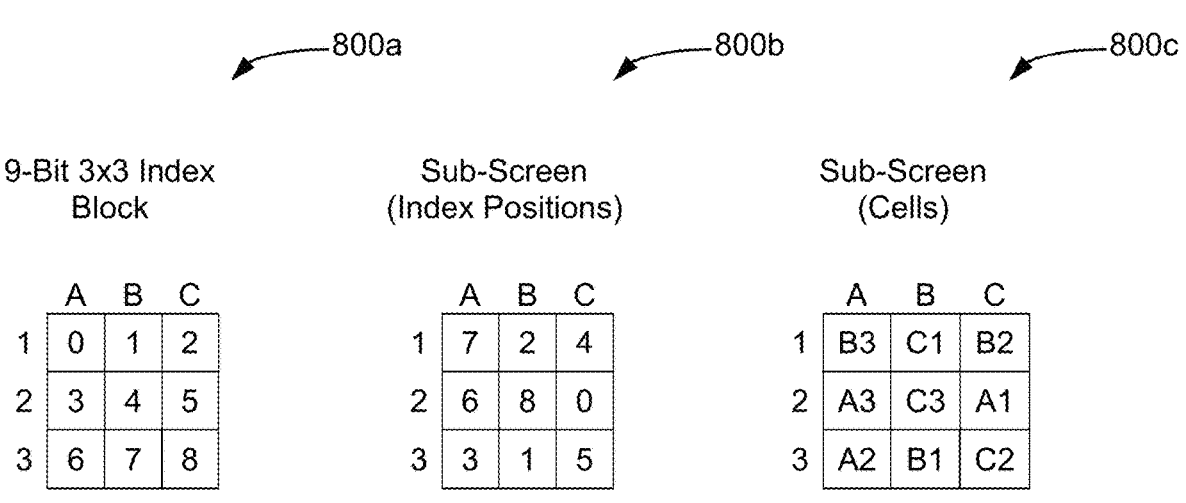
FIG. 8 depicts an index block and sub-screens with remapping relationships generated using the process of FIG. 7.
FIG. 9 depicts the sub-screen remapping relationships of FIG. 8 provided in a table format.

FIG. 8 depicts an index block 800a having 3 rows (rows 1-3) and 3 columns (columns A-C) along with sub-screens 800b and 800c that were generated using the process of FIG. 7. Sub-screen 800b shows the remapping relationships in an index position format (in which each input index position is shown in the cell of its destination index position) and sub-screen 800c shown the remapping relationships in a cell format (in which the column and row position of each input index position is shown in the cell of its destination index position). FIG. 9 depicts these same remapping relationships in a table format.

2. Screen Assembly

Once the sub-screens of sub-block size R have been generated, they are combined to create a full screen of block size B. For the case where R=B, the full screen is the same as the single sub-screen. The screen index positions, $i_B$, relate to the sub-screen index positions, $i_R$, using the following relationship (where the sub-screens are numbered from 1 to B/R, as described above):

$$i_B = i_R + (\text{SubScreen Number} - 1) \times R$$

It should be understood that the inverse screen is generated from the screen by reversing its remapping relationships.

E. Generation of Logic Blocks

The LFSR object set and LFSR object parameters described above are used to generate a unique set of logic blocks for each of the data blocks to be processed during an encryption/decryption session. The number of logic blocks generated for each data block equals the number of LFSR objects in the LFSR object set (although additional LFSR objects may be provided that are not used to generate logic blocks, as described above). Each logic block is created using specific bits from a specific output step of its related LFSR—e.g., logic block A gets its bits from LFSR A, logic block B gets its bits from LFSR B, logic block C gets its bits from LFSR C, and logic block D gets its bits from LFSR D.

In this embodiment, each LFSR (e.g., any one of LFSRs A, B, C or D) is used to generate a unique logic block for each of the data blocks as follows:

1. An LFSR seed is populated from consecutive bits of the LFSR object, wherein the number of bits is equal to the specified LFSR seed length $(\lambda)$. The consecutive bits start at the specified start bit position (i) of the LFSR object. If there are insufficient bits remaining between the start bit position (i) and the end of the LFSR object, the process will wraparound to the beginning of the LFSR object.

2. The LFSR seed provides the initial state of the LFSR—step zero. For each subsequent LFSR step, the specified tap bits of the previous step are combined using an XOR operation (or alternatively an XNOR operation) to generate one new output bit that is placed into index position 0. The bits are then shifted one index position to generate the bits placed into the remaining index positions.

3. After a number of steps equal to the LFSR rate $(\rho)$, the LFSR output is truncated to B bits (bits 0 through B−1 of the LFSR output) to create a logic block.

In order to illustrate the steps outlined above, example LFSRs are shown in FIGS. 10A-10D in which the block size (B) is 16, the LFSR seed length $(\lambda)$ is 18, the tap bit positions are 10 and 17, and the LFSR rate $(\lambda)$ is 4.

Figure 10A:
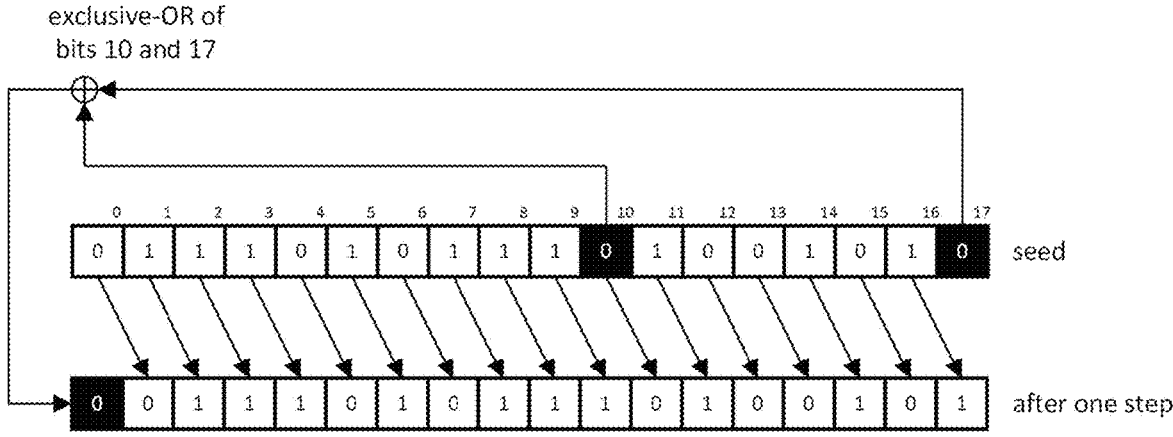
FIGS. 10A-10D depict exemplary LFSRs.

FIG. 10A illustrates an exemplary seed and first output. In this example, the seed bits are provided in index position order, with the Least-Significant Bit (i=0) on the left end of the seed and the Most-Significant Bit (i=$\lambda$−1) on the right end of the seed. The bits in index positions 10 and 17 of the seed (i.e., the tap bits) are combined using an XOR operation to generate one new output bit that is placed in index position 0 of the first output. The bits in index positions 0 to 16 of the seed are shifted one index position, as shown, to create the bits in index positions 1 to 17 of the first output.

Figure 10B:
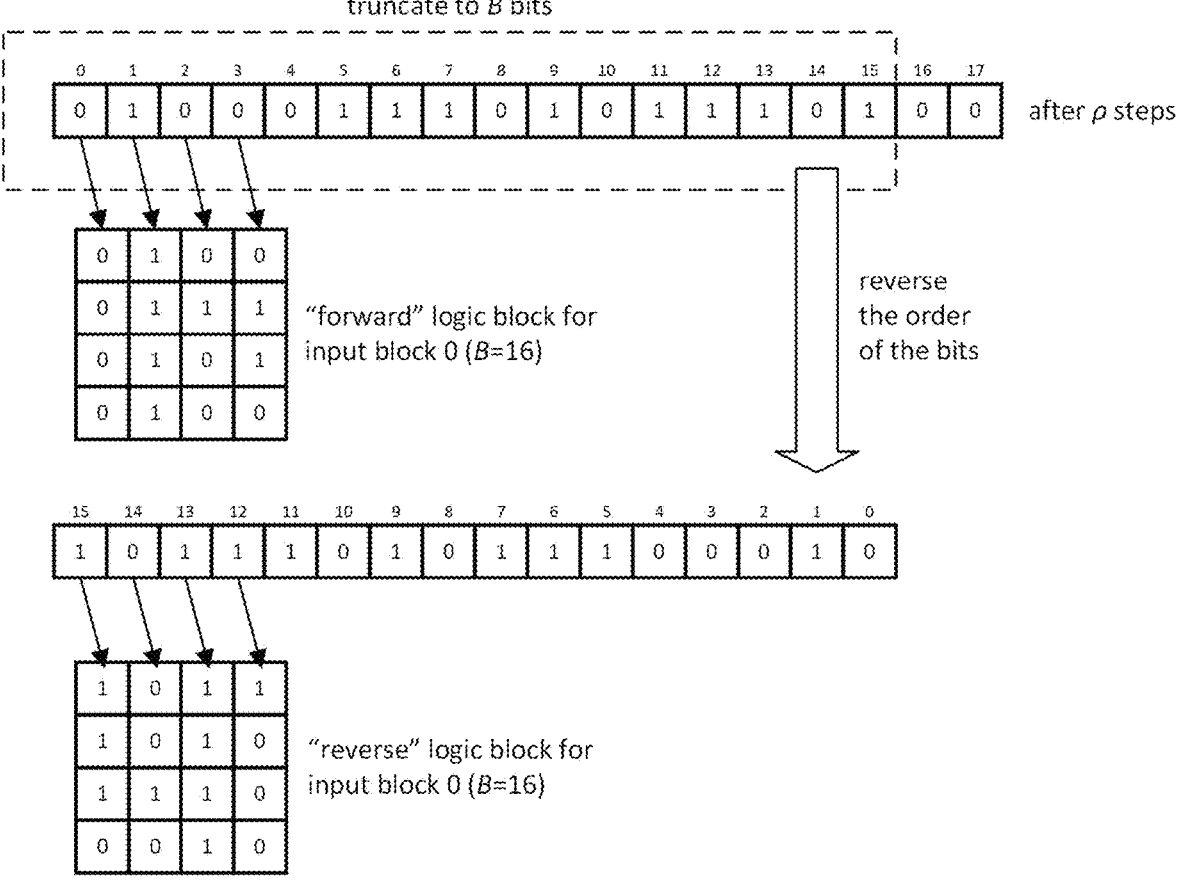

FIG. 10B illustrates the output after four $(\rho)$ steps. To generate a "forward" logic block, the 18-bit output is truncated to 16 bits, and those 16 bits form the bits of the logic block used to process the first data block (i.e., input block 0), as shown. To generate a "reverse" logic block, the 18-bit output is truncated to 16 bits, and those 16 bits are mirrored or reversed to form the bits of the logic block used to process the first data block (i.e., input block 0), as shown.

It should be understood that the process shown in FIGS. 10A and 10B will continue until a logic block is created for each of the data blocks be processed during an encryption/decryption session.

Figure 10C:
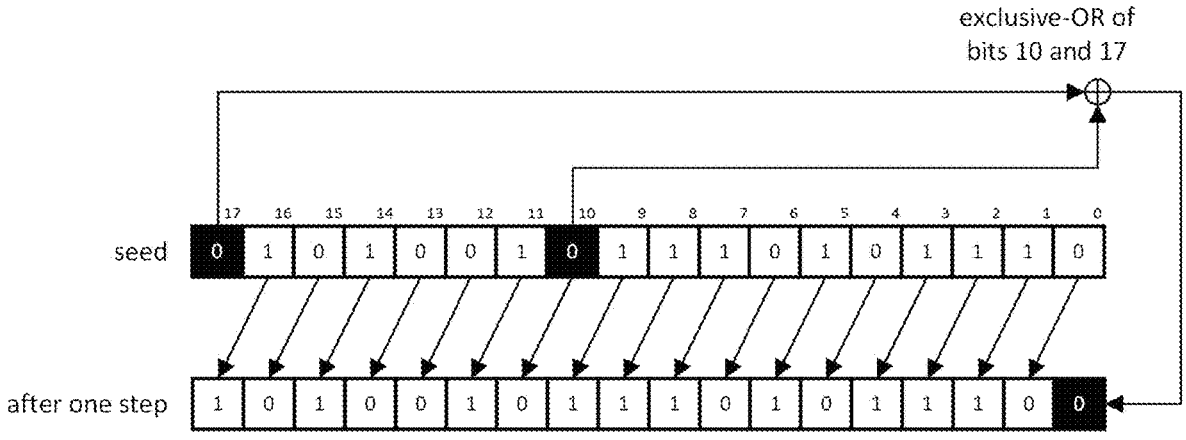

FIG. 10C illustrates another exemplary seed and first output. In this example, the seed bits are provided in reverse index position order, with the Most-Significant Bit (i=λ−1) on the left end of the seed and the Least-Significant Bit (i=0) on the right end of the seed. The bits in index positions 10 and 17 of the seed (i.e., the tap bits) are combined using an XOR operation to generate one new output bit that is placed in index position 0 of the first output. The bits in index positions 0 to 16 of the seed are shifted one index position, as shown, to create the bits in index positions 1 to 17 of the first output.

Figure 10D:
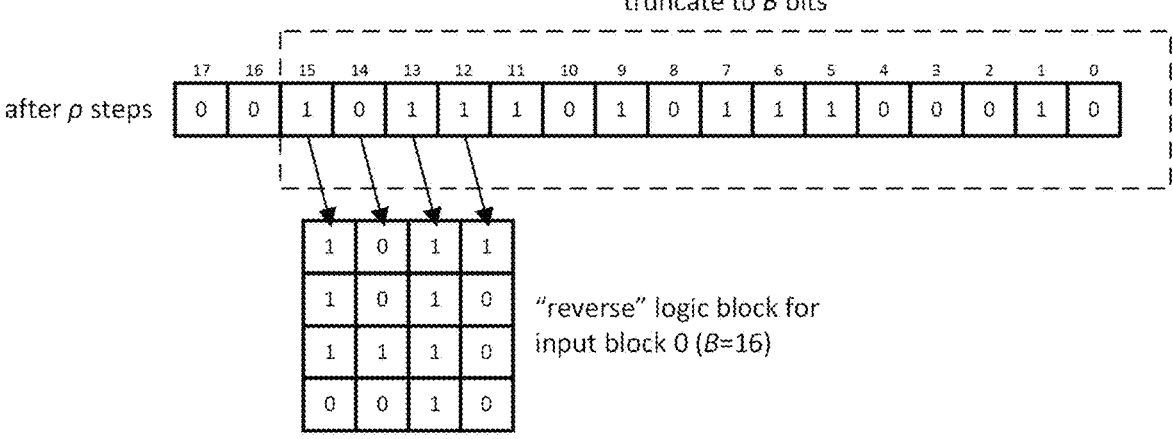

FIG. 10D illustrates the output after four (ρ) steps. To generate a "reverse" logic block, the 18-bit output is truncated to 16 bits, and those 16 bits form the bits of the logic block used to process the first data block (i.e., input block 0), as shown. It should be noted that this logic block is the same as the "reverse" logic block shown in FIG. 10B. Thus, it can be appreciated that a "reverse" logic block may be generated by either method—i.e., reversing the order of the output bits or reversing the order of the seed bits.

F. Encryption and Decryption of Data Blocks

For each data segment identified for encryption, the bits of the data segment are projected into the index positions of the index block to generate a data block. As discussed above, a single bit or multiple bits may be placed in each index position. A cipher is then used to encrypt the data blocks in accordance with an encryption scheme that applies the screen and logic blocks as described above—wherein the number and order of application of the screen and logic blocks will vary depending on the implementation.

Figure 11:
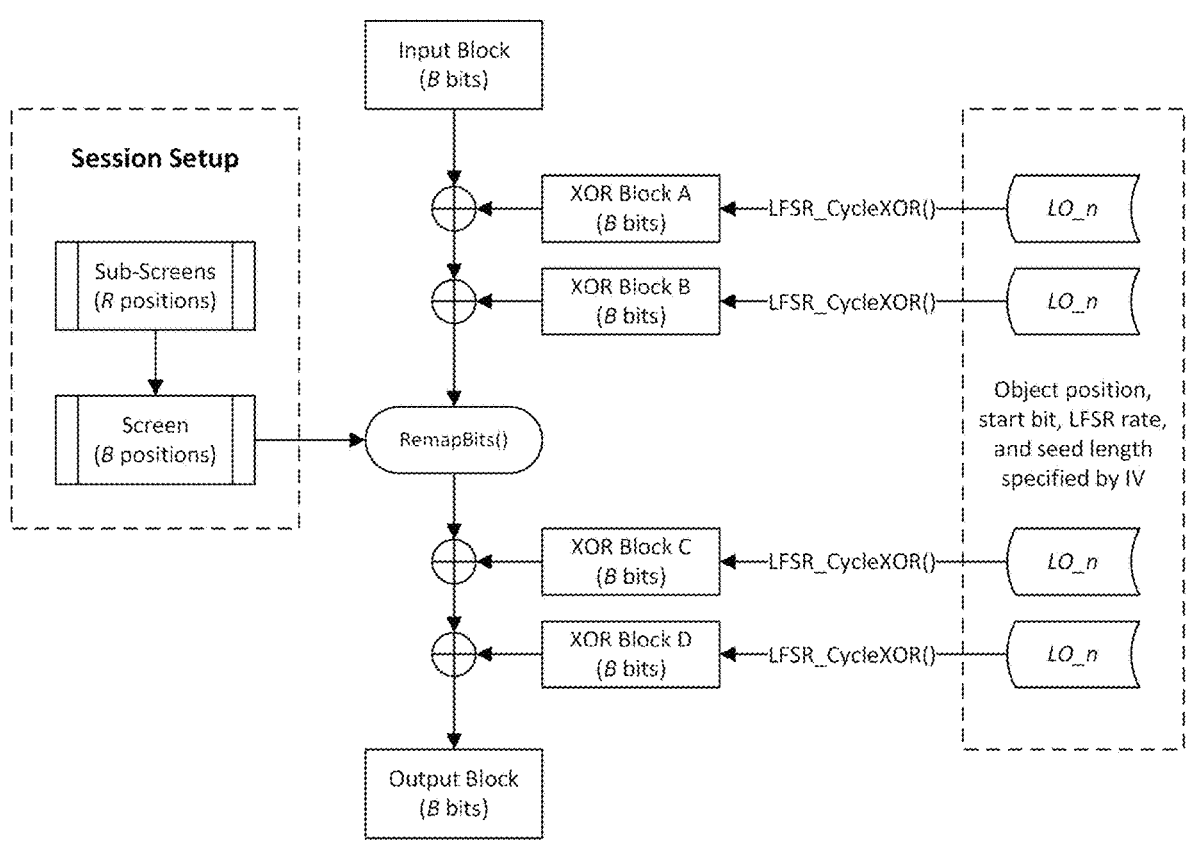
FIG. 11 depicts an exemplary encryption scheme of a cipher.

FIG. 11 depicts an exemplary encryption scheme of a cipher that utilizes the following operations: (1) an LFSR_CycleXOR( ) operation that uses an LFSR to generate the XOR block for each successive input data block; (2) an AddXOR( ) operation (shown by the XOR symbol ⊕) that adds an XOR block to the input data block or an intermediate state data block using a bitwise XOR logical operation; and (3) a RemapBits( ) operation that applies the screen to an intermediate state data block using a bit remapping operation that may be performed bitwise or bytewise.

In this example, the encryption scheme uses one screen and four XOR blocks—i.e., two XOR blocks (XOR Block A and XOR Block B) are positioned before the RemapBits( ) operation at the front of the cipher and two XOR blocks (XOR Block C and XOR Block D) are positioned after the RemapBits( ) operation at the back of the cipher. As described above, the LFSR object parameters in the initialization vector include an object position for each LFSR object, which determines the position of the XOR block within the cipher. Alternately, this position information may be set in the overall configuration of the encryption scheme and excluded from the initialization vector.

The encryption scheme occurs in one transformation round that includes the following steps: (1) the AddXOR( ) operation adds the front XOR blocks (XOR Block A and XOR Block B) to the input data block to generate a first intermediate state data block; (2) the RemapBits( ) operation applies the screen to the first intermediate state data block to generate a second intermediate state data block; and (3) the AddXOR( ) operation adds the back XOR blocks (XOR Block C and XOR Block D) to the second intermediate state block to generate the output data block. The front XOR blocks (XOR Block A and XOR Block B) may be added to the input data block in any order due to the commutative property of the XOR logical operation. Similarly, the back XOR blocks (XOR Block C and XOR Block D) may be added to the second intermediate state data block in any order due to the commutative property of the XOR logical operation.

In other embodiments, instead of applying the front XOR blocks (XOR Block A and XOR Block B) successively in series, XOR Block A and XOR Block B may be added to create a single equivalent XOR Block AB, which is then added to the input data block to generate a first intermediate state data block. Similarly, instead of applying the back XOR blocks (XOR Block C and XOR Block D) successively in series, XOR Block C and XOR Block D may be added to create a single equivalent XOR Block CD, which is then added to the second intermediate state block to generate the output data block.

In this embodiment, the maximum number of input data blocks (Φ) that can be securely sent through the encryption scheme in one encryption session is dependent on the LFSR seed length (λ) and the tap bit positions used to create each of the XOR blocks. In particular, the maximum number of input data blocks (Φ) will be achieved if (1) each LFSR seed length (λ) is distinct and (2) the tap bit positions for each LFSR are chosen to yield the maximum number of unique permutations before repeating itself—i.e., a maximal length LFSR that cycles through all possible $2^\lambda−1$ states within the shift register except the state where all bits are zero (unless it contains all zeros, in which case it will never change). Also, the LFSR rate (ρ) may be chosen based on the desired secrecy level for a particular implementation. For example, in this embodiment, the LFSR rate (ρ) is equal to the sub-block size R.

It should be understood that the maximum number of input data blocks (Φ) represents the maximum number of unique permutations of the bits of the LFSR objects that are used to create the XOR blocks. Of course, a larger number of input data blocks may be sent through the encryption scheme in one encryption session in implementations that do not require such a high level of data security. A smaller number of input data blocks may also be used.

Figure 12:
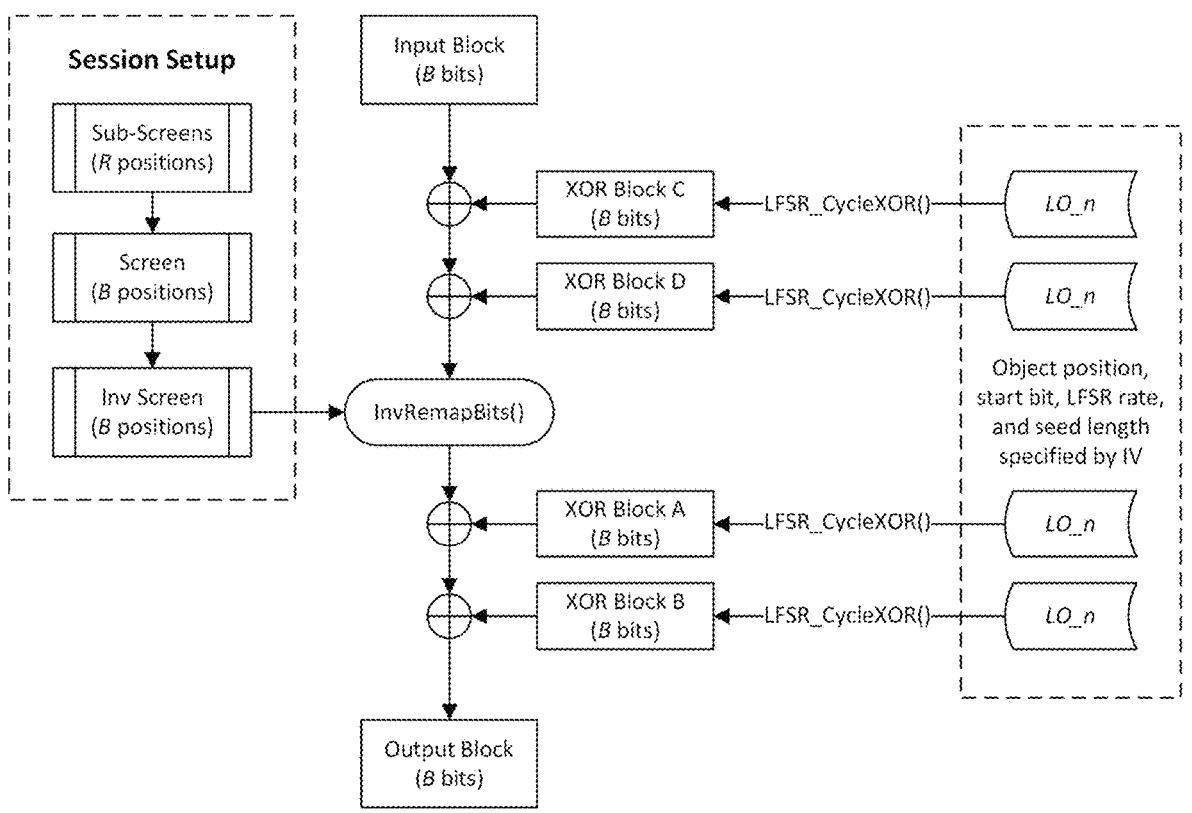
FIG. 12 depicts an exemplary decryption scheme of an inverse cipher.

FIG. 12 depicts an exemplary decryption scheme of an inverse cipher that utilizes the following operations: (1) an LFSR_CycleXOR( ) operation that uses an LFSR to generate the XOR block for each successive input data block; (2) an AddXOR( ) operation (shown by the XOR symbol ⊕) that adds an XOR block to the input data block or an intermediate state data block using a bitwise XOR logical operation; and (3) an InvRemapBits( ) operation that applies the inverse screen to an intermediate state data block using a bit remapping operation that may be performed bitwise or bytewise.

In this example, the decryption scheme uses one inverse screen and the four XOR blocks used in the encryption scheme—i.e., two XOR blocks (XOR Block C and XOR Block D) are positioned before the InvRemapBits( ) operation at the front of the inverse cipher and two XOR blocks (XOR Block A and XOR Block B) are positioned after the InvRemapBits( ) operation at the back of the inverse cipher. Notably, the positions of the front and back XOR blocks are reversed compared to the positions of those same XOR blocks in the encryption scheme.

The decryption scheme occurs in one transformation round that includes the following steps: (1) the AddXOR( ) operation adds the front XOR blocks (XOR Block C and XOR Block D) to the input data block to generate a first intermediate state data block; (2) the InvRemapBits( ) operation applies the inverse screen to the first intermediate state data block to generate a second intermediate state data block; and (3) the AddXOR( ) operation adds the back XOR blocks (XOR Block A and XOR Block B) to the second intermediate state block to generate the output data block. The front XOR blocks (XOR Block C and XOR Block D) may be added to the input data block in any order due to the commutative property of the XOR logical operation. Similarly, the back XOR blocks (XOR Block A and XOR Block B) may be added to the second intermediate state data block in any order due to the commutative property of the XOR logical operation.

In other embodiments, instead of applying the front XOR blocks (XOR Block C and XOR Block D) successively in series, XOR Block C and XOR Block D may be added to create a single equivalent XOR Block CD, which is then added to the input data block to generate a first intermediate state data block. Similarly, instead of applying the back XOR blocks (XOR Block A and XOR Block B) successively in series, XOR Block A and XOR Block B may be added to create a single equivalent XOR Block AB, which is then added to the second intermediate state block to generate the output data block.

G. Example

Figure 13:
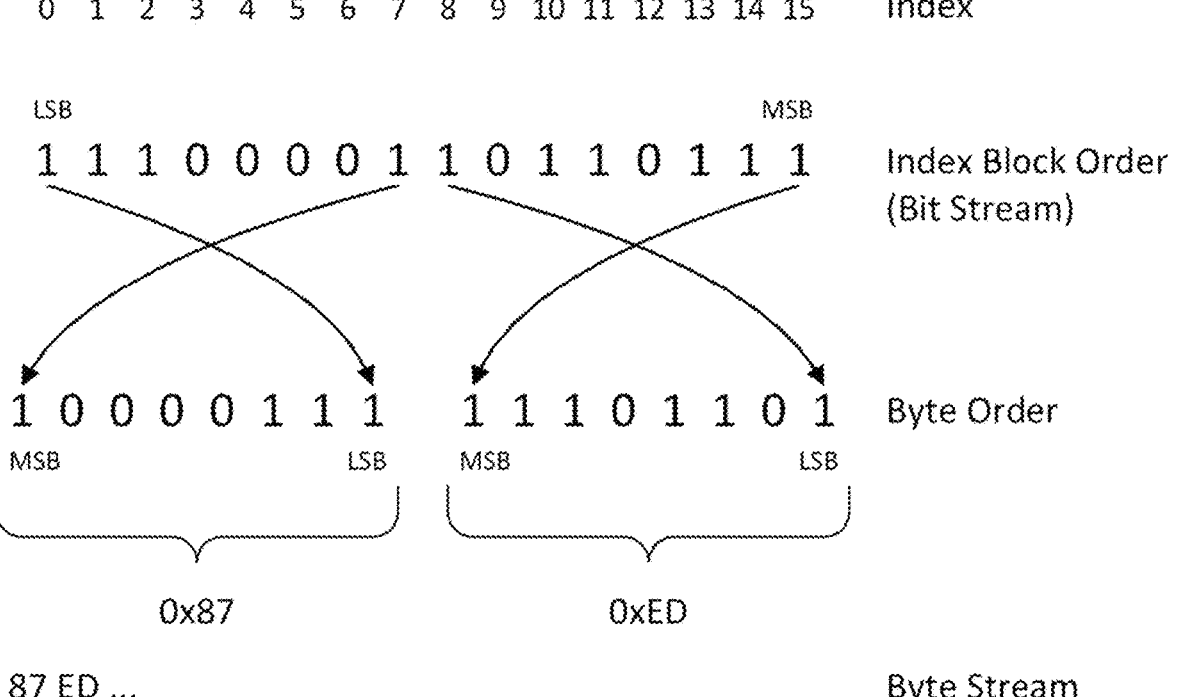
FIG. 13 depicts a bit stream and byte stream notation.
Figure 22A:
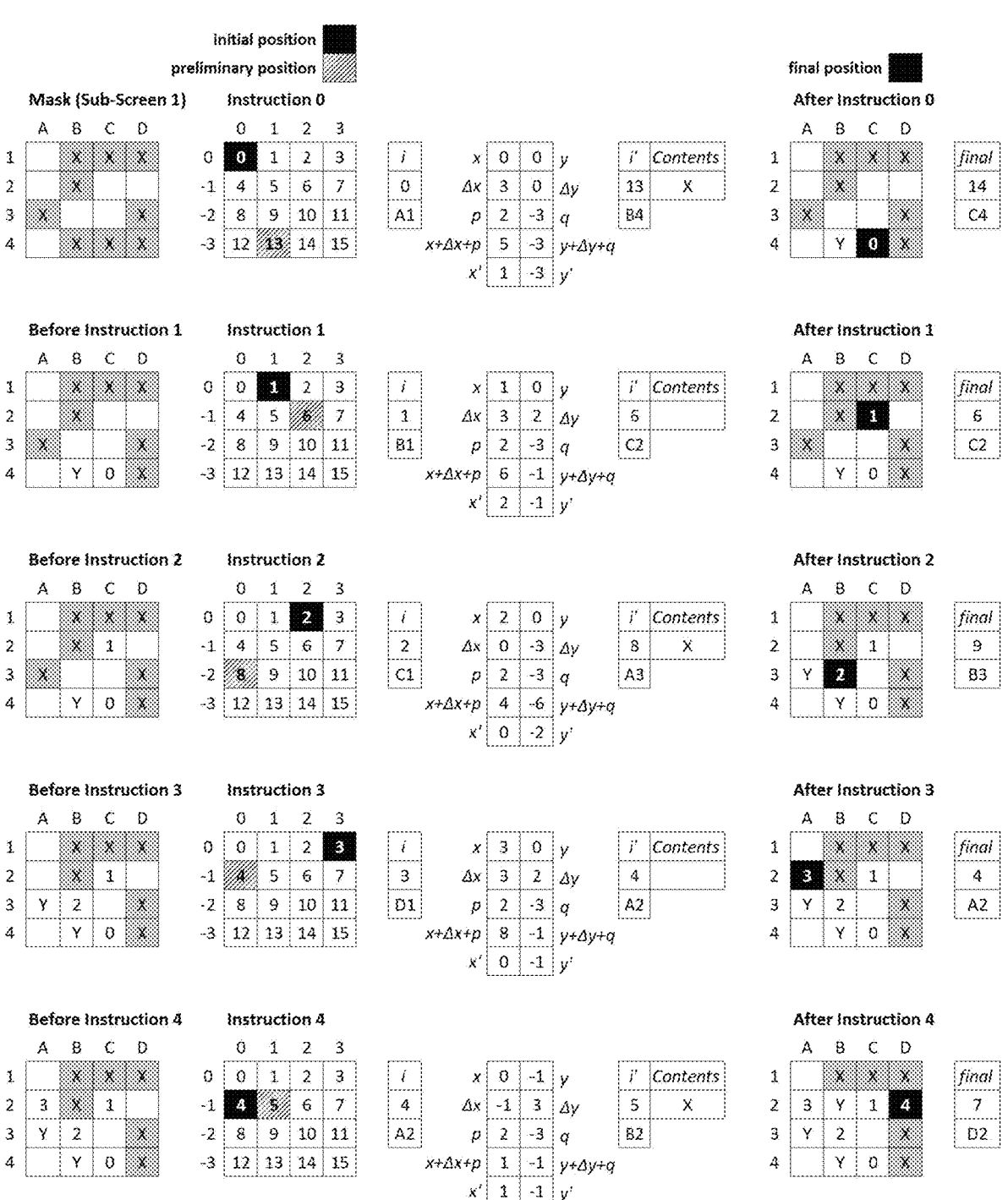
Figure 22B:
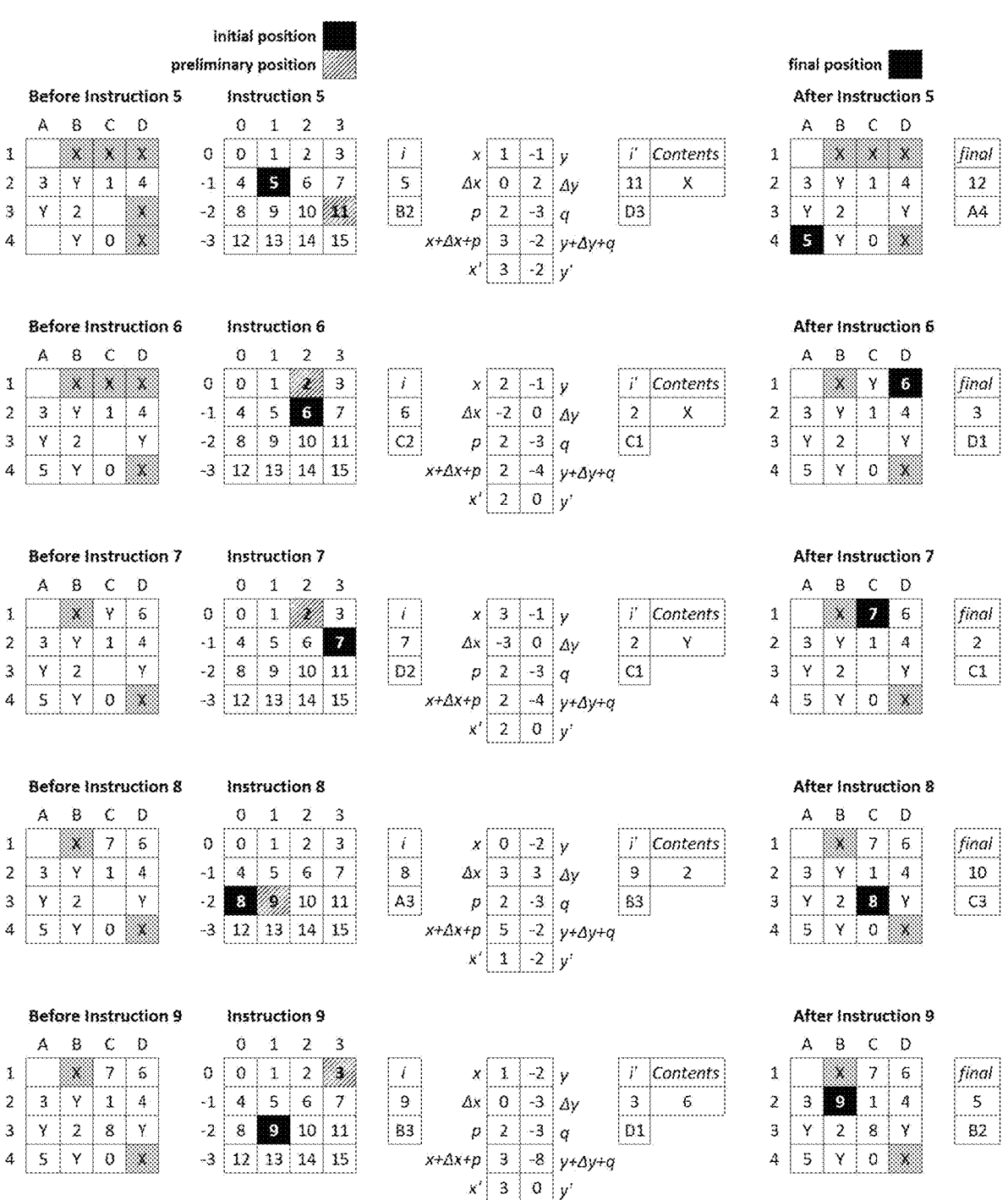
Figure 22C:
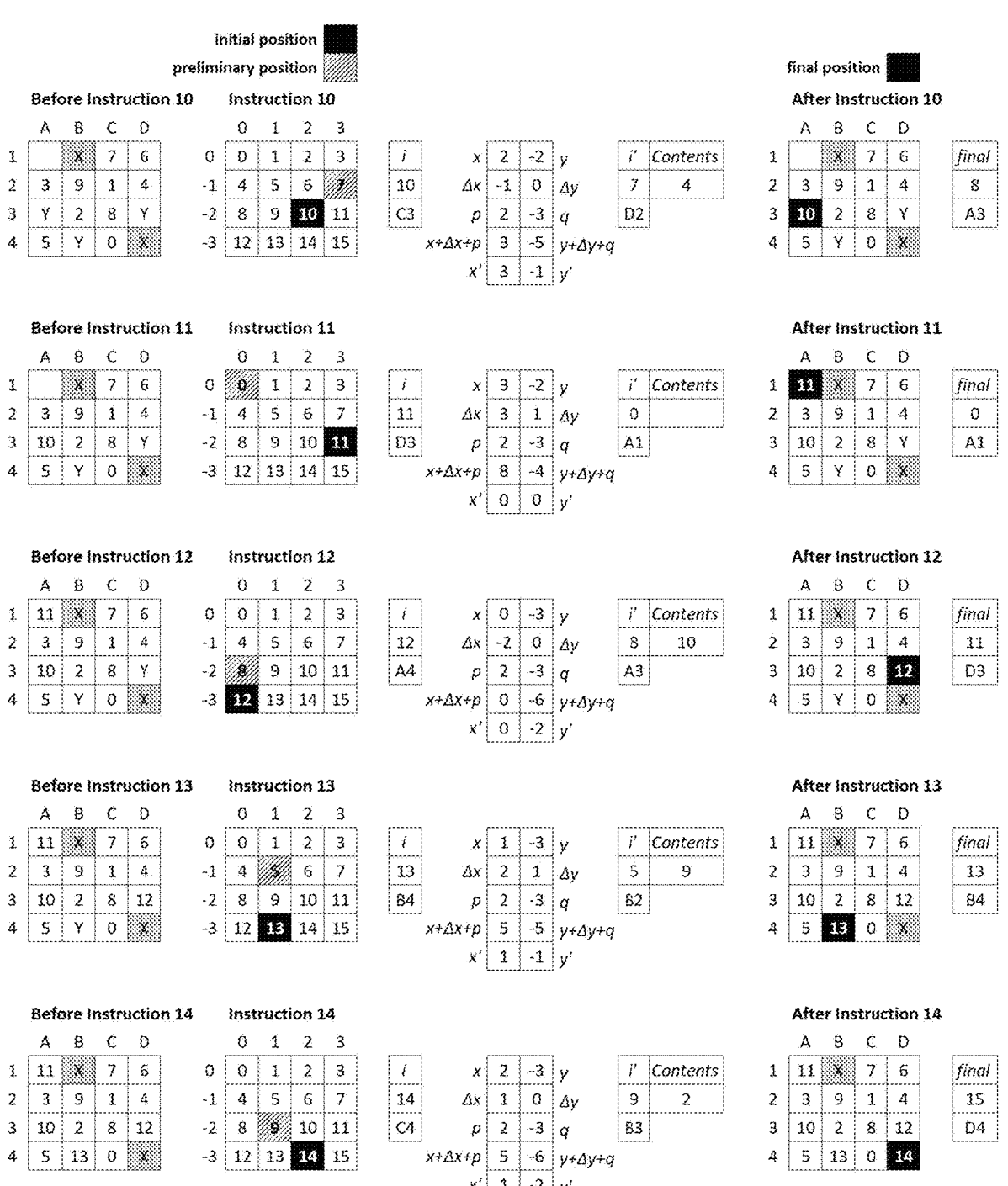
Figure 40A:
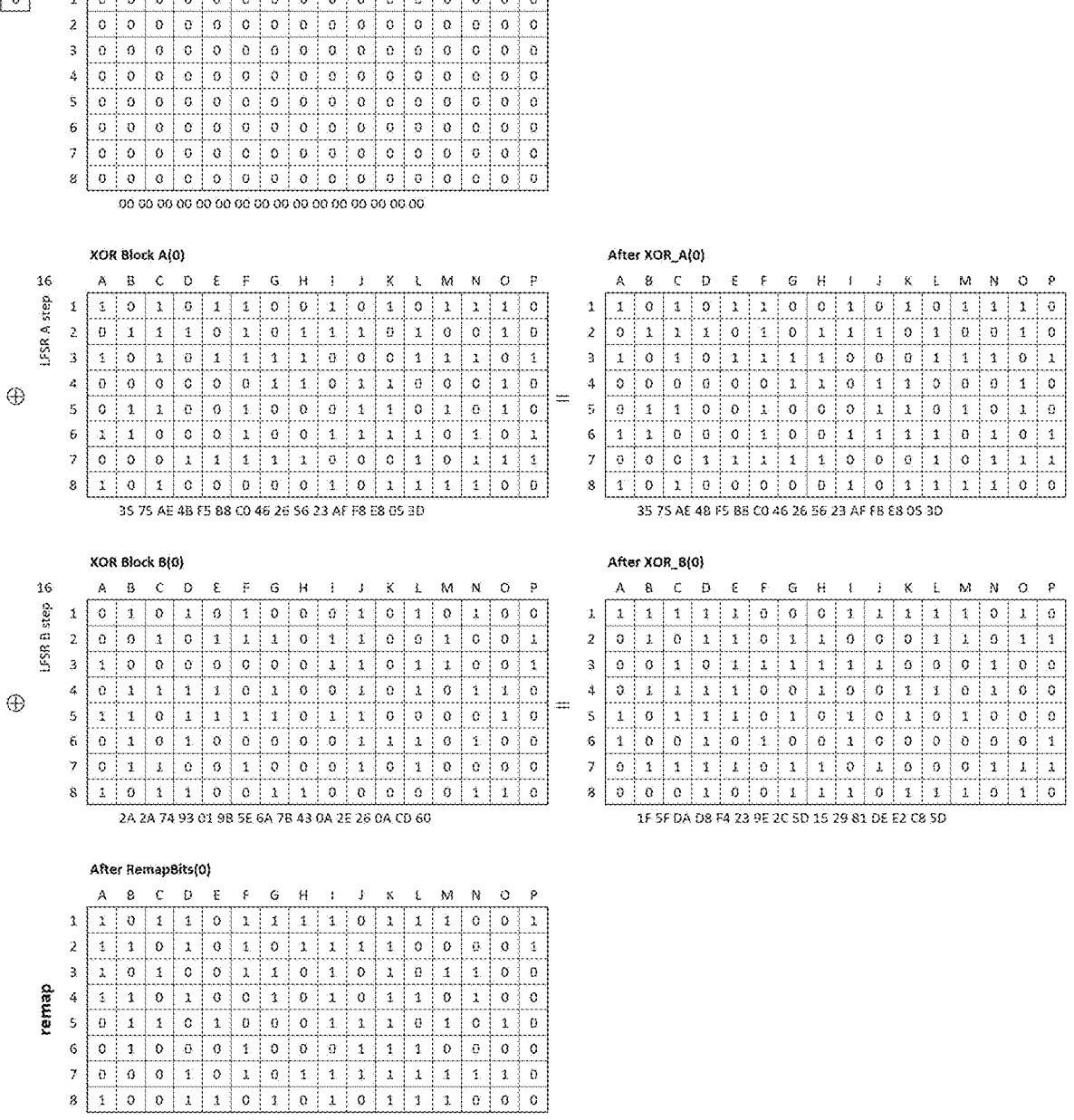
FIGS. 40A-40F depict the process of encrypting input data block 0, input data block 1, and input data block 2 using the screen of FIG. 25 and the XOR blocks of FIGS. 39A-39B in accordance with the encryption scheme of FIG. 11.
Figure 40B:
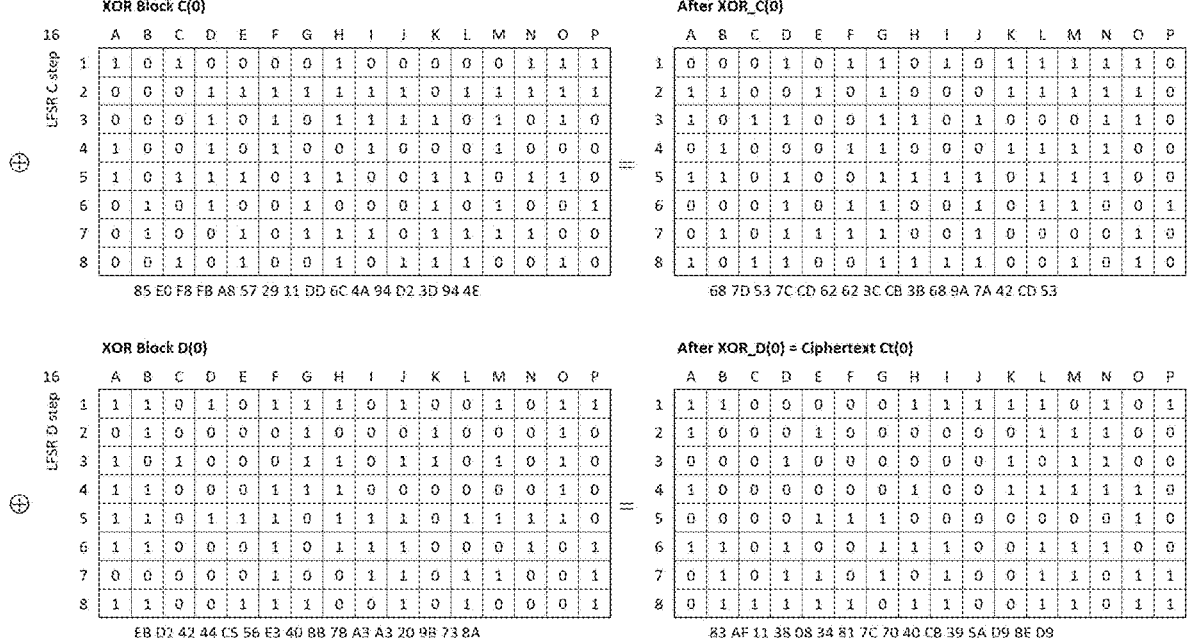
Figure 40C:
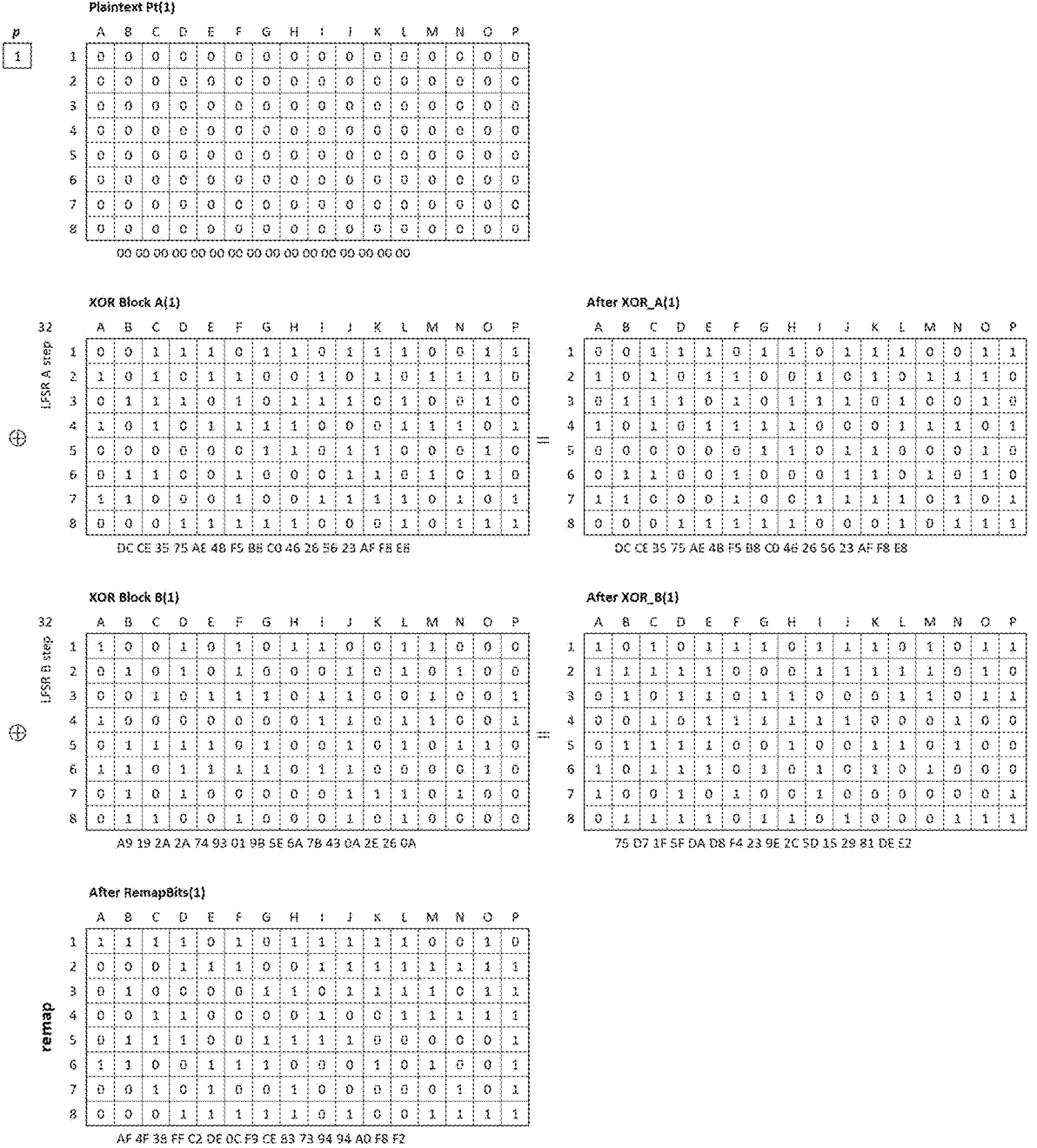
Figure 40D:
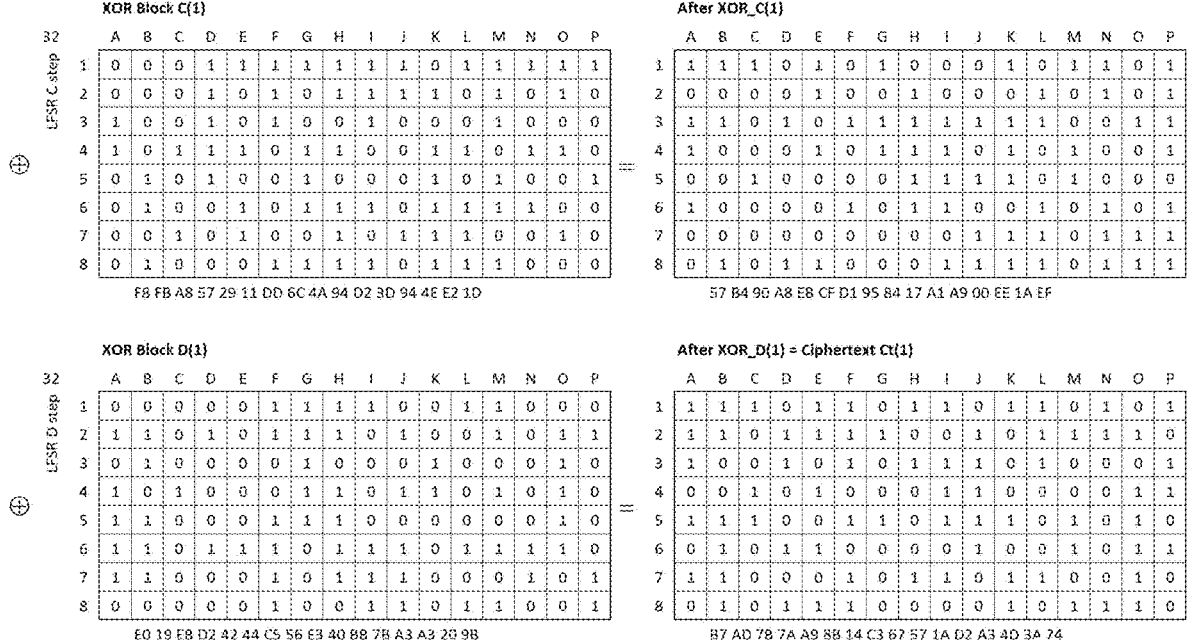
Figure 40E:
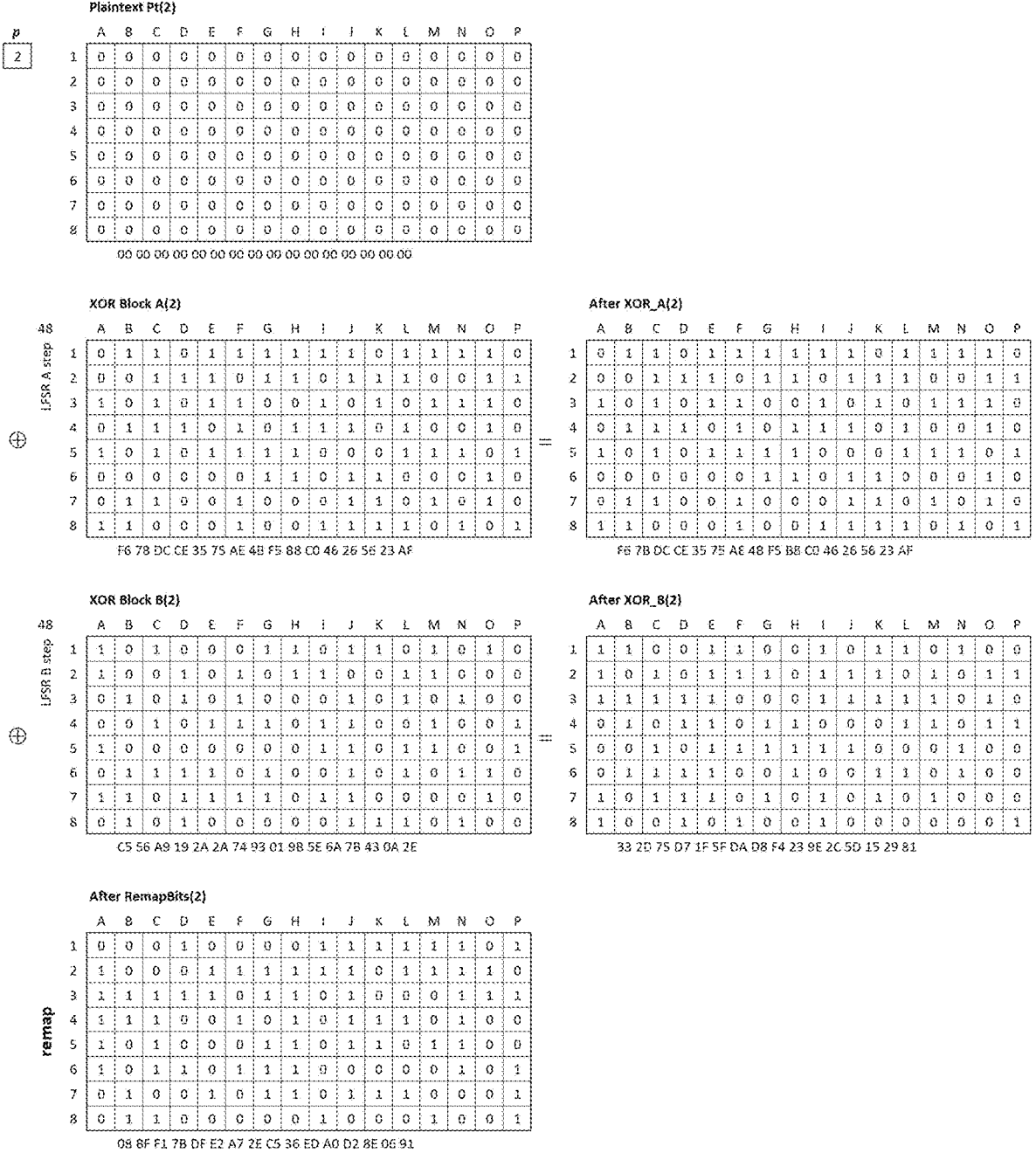
Figure 40F:
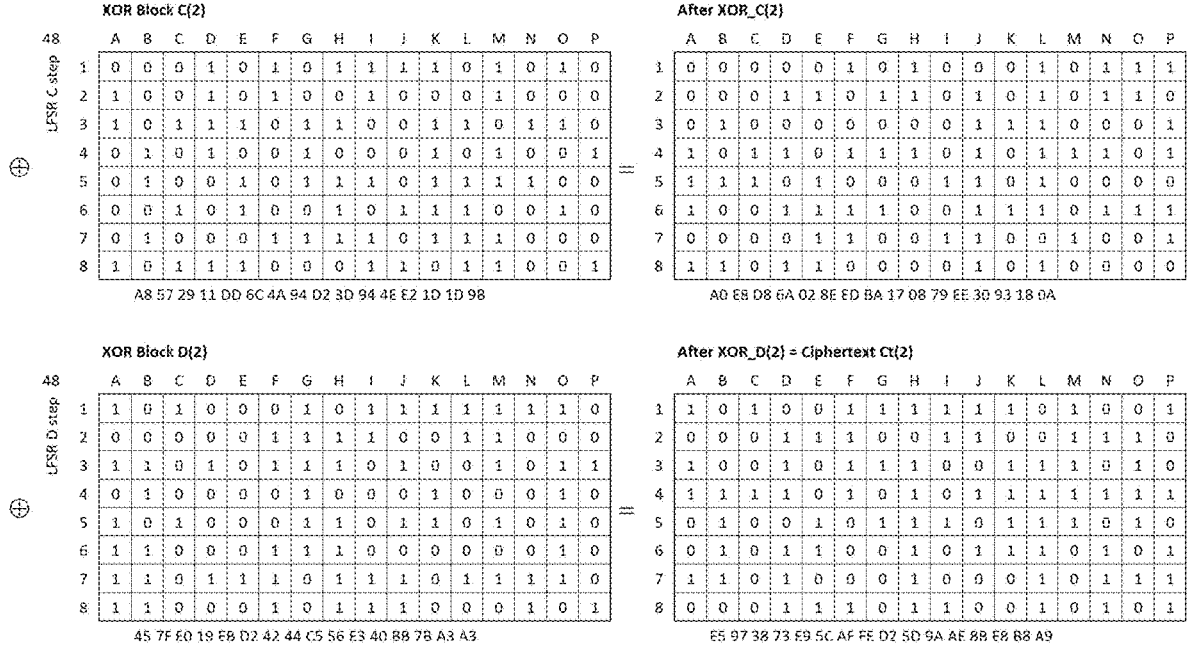
Figure 41A:
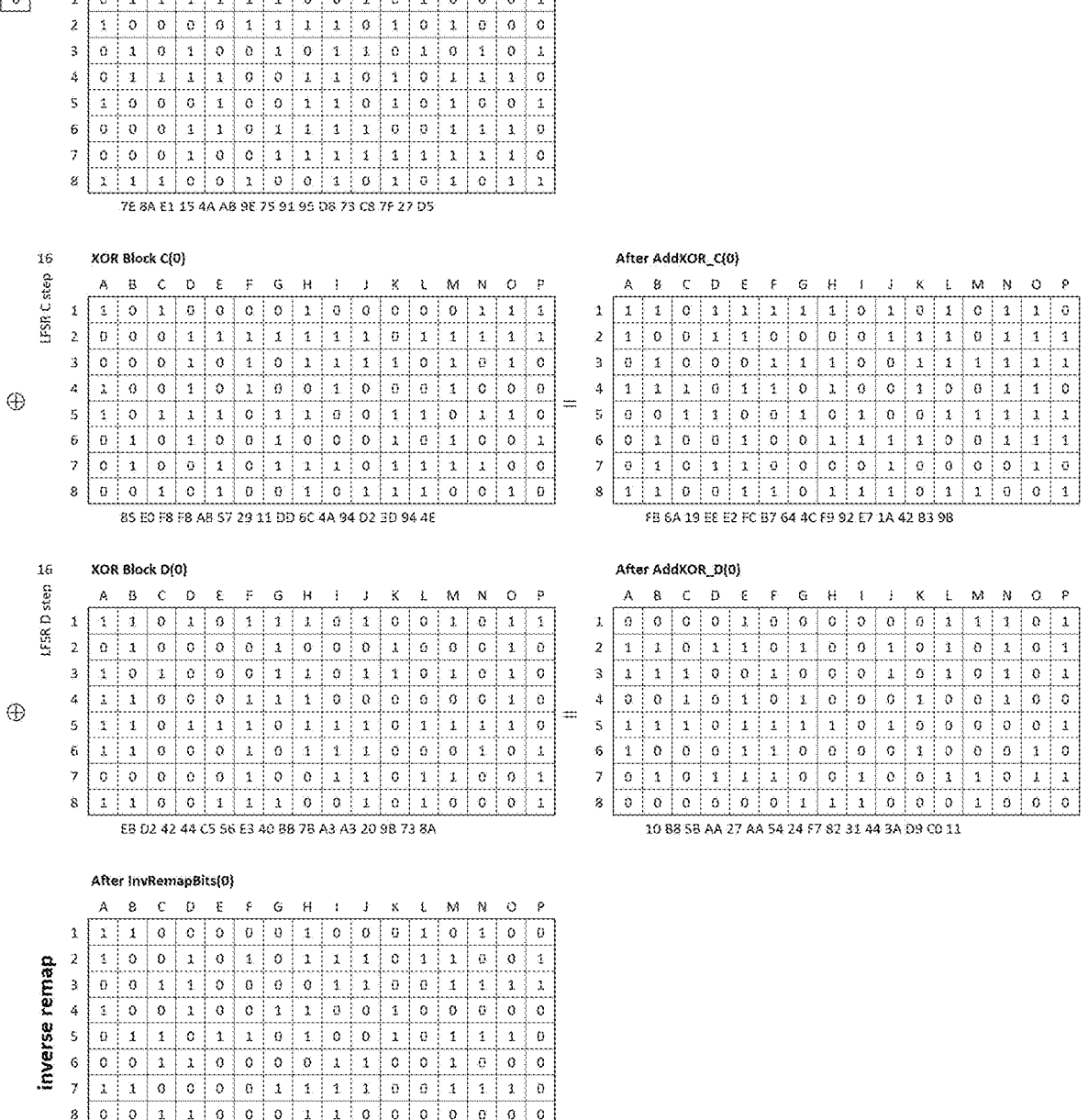
FIGS. 41A-41F depict the process of decrypting input data block 0, input data block 1, and input data block 2 using the inverse screen of FIG. 26 and the XOR blocks of FIGS. 39A-39B in accordance with the decryption scheme of FIG. 12.
Figure 41B:
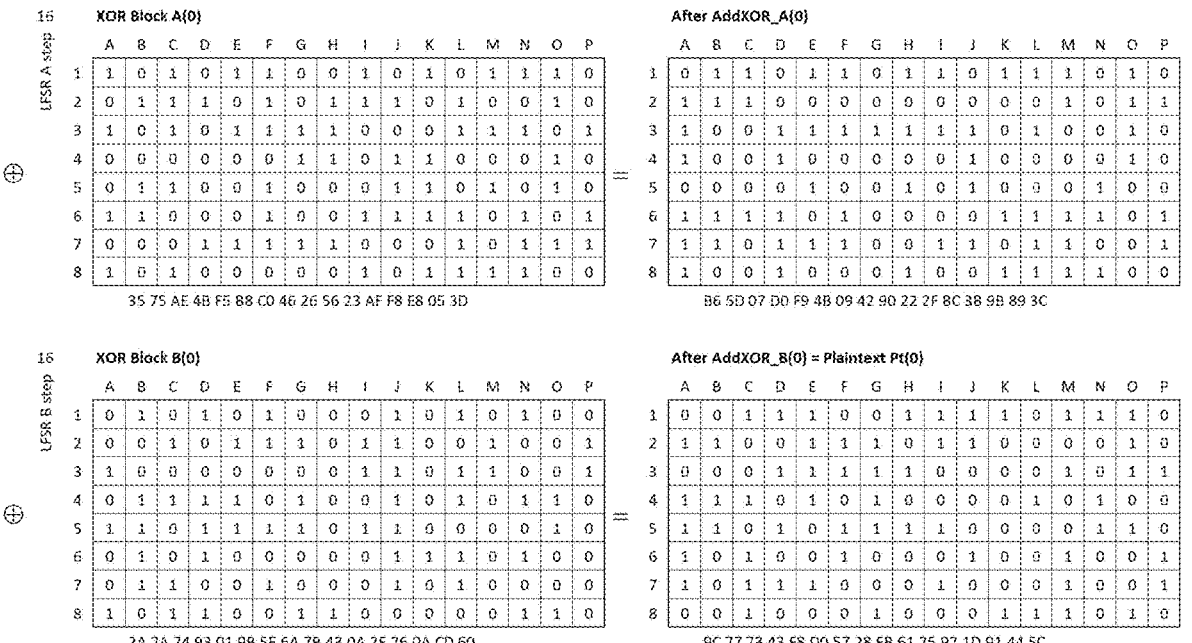
Figure 41C:
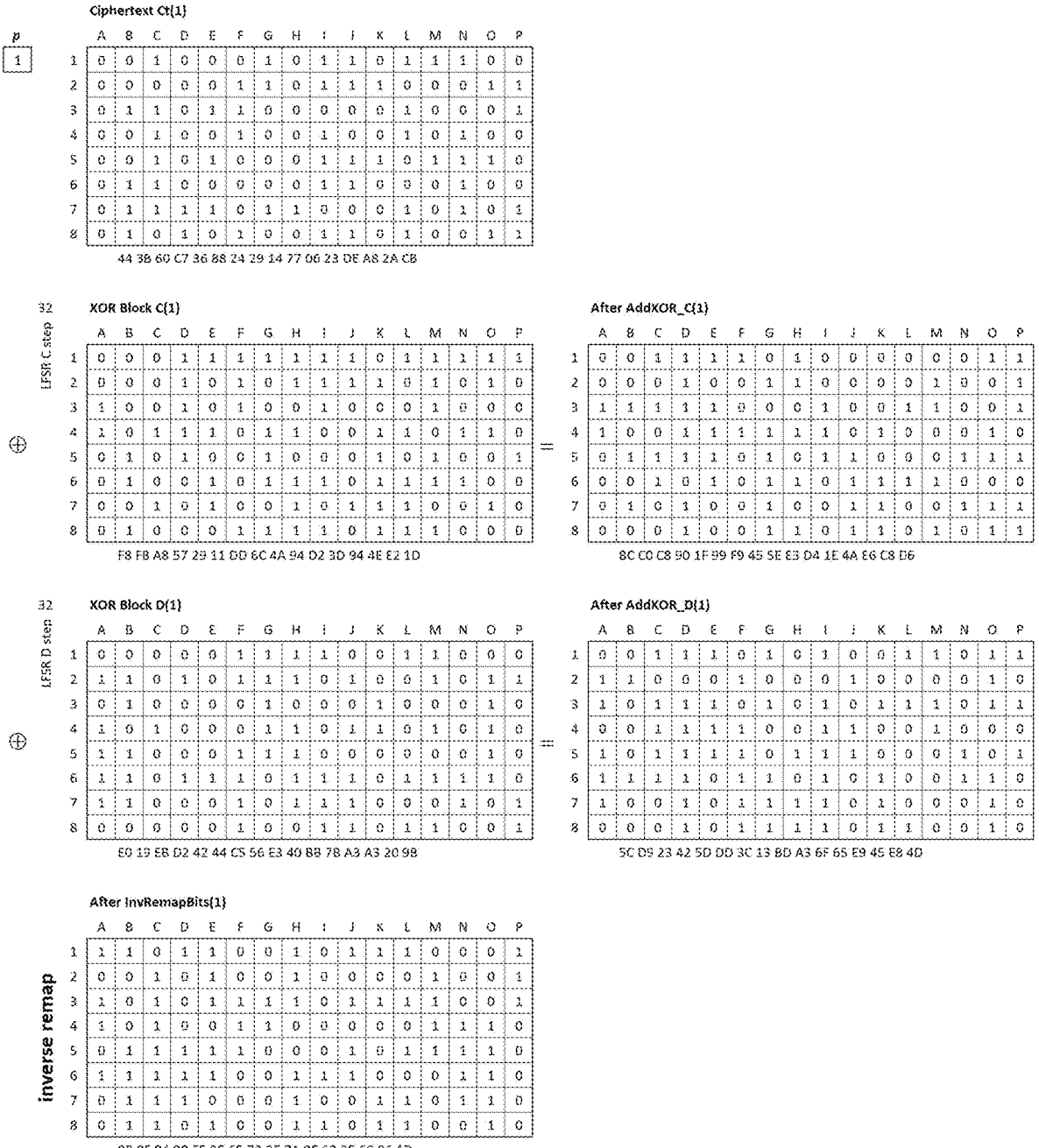
Figure 41D:
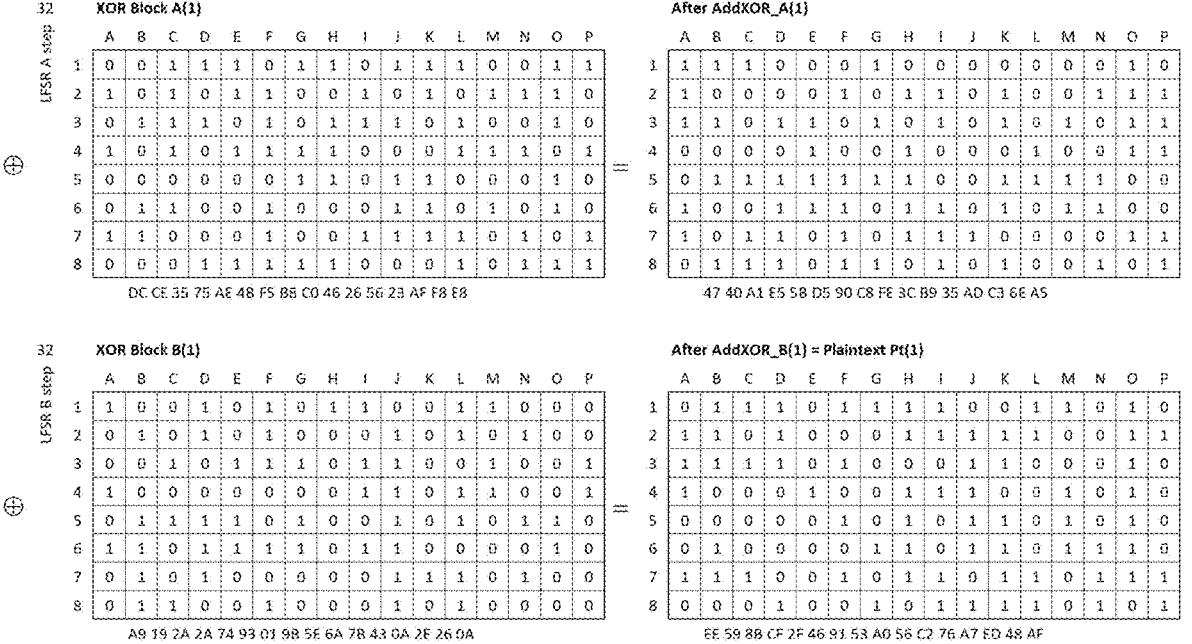
Figure 41E:
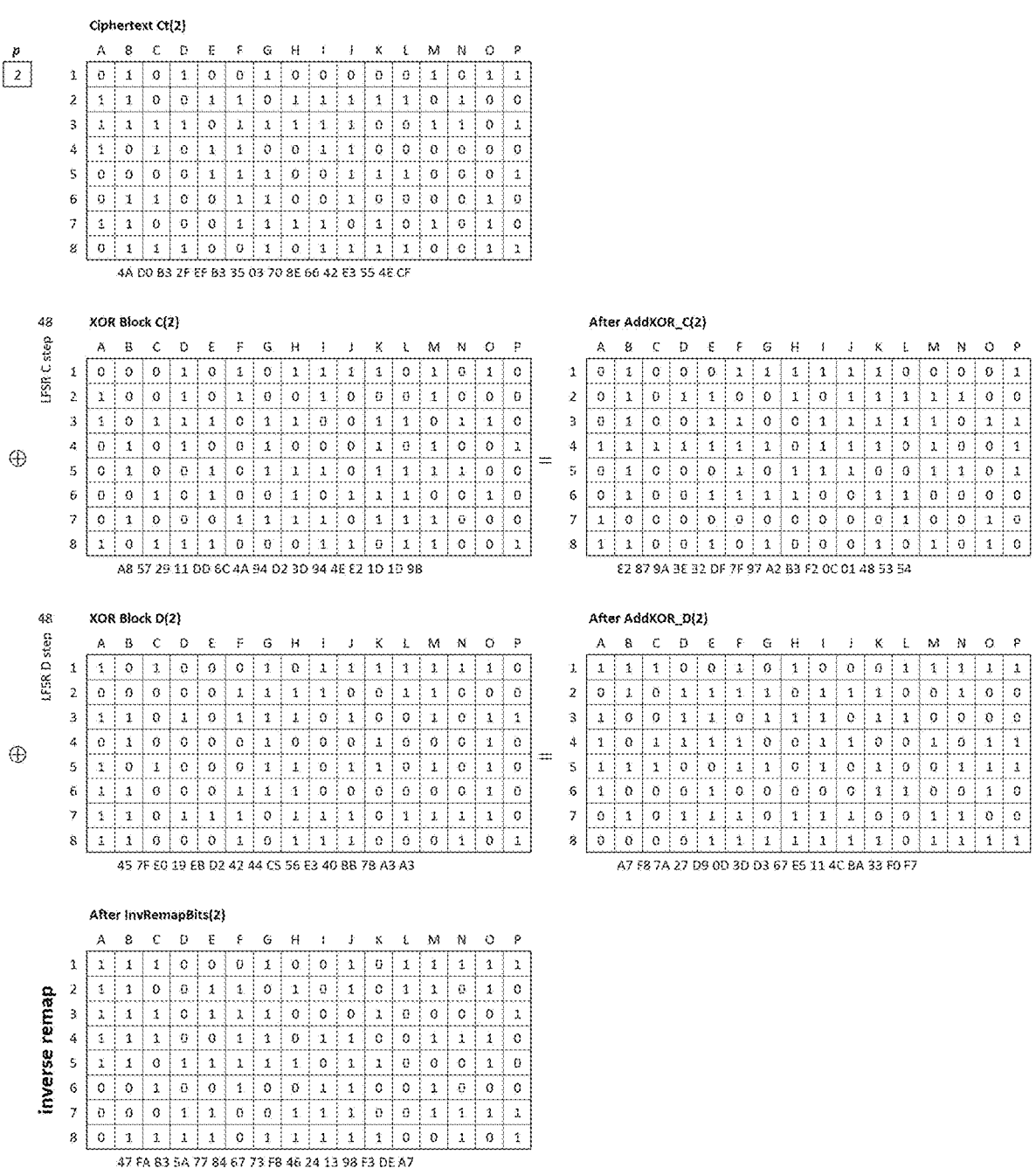
Figure 41F:
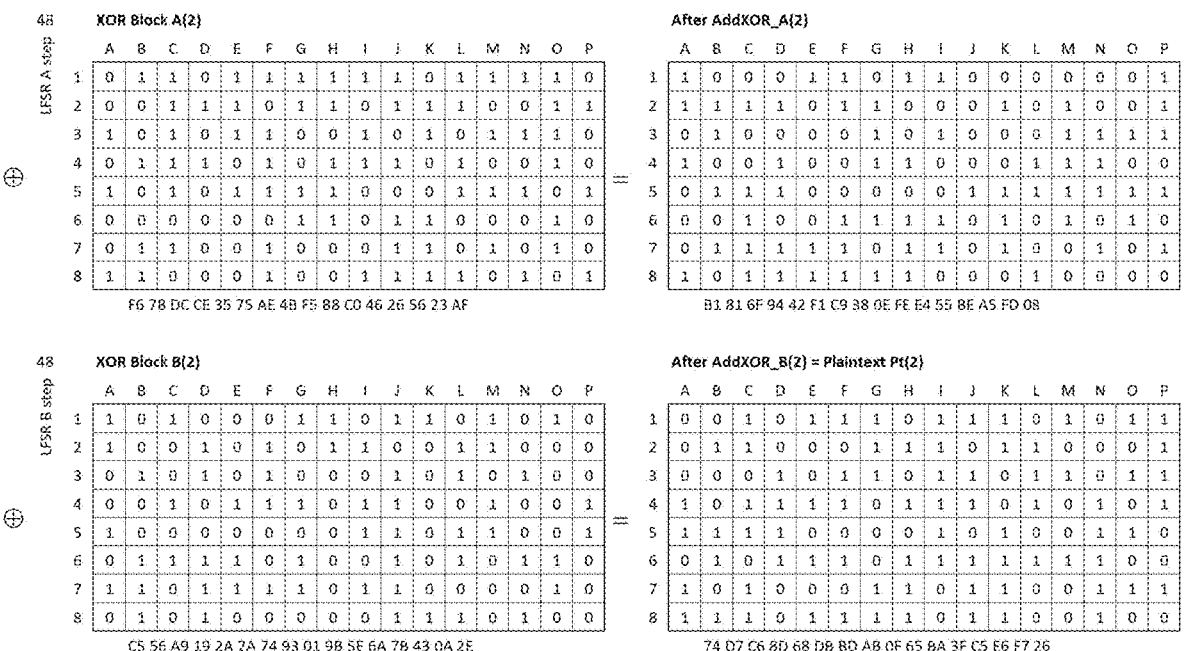

An example of this embodiment will be described with reference to FIGS. 13 to 41A-41F, some of which depict data as both a bit stream and a byte stream. As shown in FIG. 13, a bit stream is shown in index block order, with the Least-Significant Bit (i=0) on the left end of the stream and the Most-Significant Bit on the right end of the stream. To create a byte stream, the bits of the bit stream are grouped so that each group contains 8 bits, the bits are reversed within each 8-bit group, and each 8-bit group is converted to hexadecimal.

Configuration Settings:

The configuration settings to be used in this example includes the block size, sub-block size, number of sub-blocks, and number of XOR blocks shown in Table 7 below:

TABLE 7

| Block Size (B) | Sub-Block Size (R) | # Sub-Blocks (B/R) | # XOR Blocks (N) |
|---|---|---|---|
| 128 bits (8 × 16) | 16 bits (4 × 4) | 8 | 4 |

The configuration settings also include the LFSR object parameters shown in Table 8 below:

TABLE 8

| XOR Block | Position | LFSR Direction |
|---|---|---|
| A | Front | Forward |
| B | Front | Reverse |
| C | Back | Forward |
| D | Back | Reverse |

Setup Object Set, LFSR Object Set, and Initialization Vector:

FIG. 14 depicts the setup object set to be used in this example—i.e., a binary setup object 0 (SO_0), an integer setup object 1 (SO_1), and a binary setup object 2 (SO_2). FIGS. 15A-15B depict the LFSR object set to be used in this example—i.e., an LFSR object 0 (LO_0), an LFSR object 1 (LO_1), an LFSR object 2 (LO_2), and an LFSR object 3 (LO_3). FIG. 16 depicts an initialization vector to be used in this example—i.e., a binary IV setup object (BIVSO), an IV offset vector (p, q), and LFSR object parameters.

Generation of Mask and DSO:

FIG. 17 depicts a mask generated in accordance with the XOR logical operation shown in FIG. 4 using the binary IV setup object (BIVSO) of FIG. 16 and the binary setup object 2 (SO_2) of FIG. 14. FIG. 18 depicts a directional setup object (DSO) generated in accordance with the XOR logical operation shown in FIG. 3 using the binary IV setup object (BIVSO) of FIG. 16 and the binary setup object 0 (SO_0) of FIG. 14.

Generation of Movement Instructions and Masks for Sub-Screens:

FIGS. 19A-19B depict the bitwise pairing of the directional setup object (DSO) of FIG. 18 and the integer setup object 1 (SO_1) of FIG. 14. FIGS. 20A and 20B depict movement instructions for sub-screens 1-8 that are generated using the process of FIG. 5. FIG. 21 depicts the masks to be used with sub-screens 1-8 that are generated from the mask of FIG. 17. It can be seen that each "1" mask bit is shown as an "X" and each "0" mask bit is shown as blank.

Generation of Sub-Screens:

FIGS. 22A-22D depict the process of generating the remapping relationships for sub-screen 1 using the process of FIG. 7. For each index position in sub-screen 1, an instruction is provided that shows the initial position, the preliminary position prior to application of the mask for sub-screen 1, and the final position after application of the mask for sub-screen 1. Note that a mask bit that was previously a "1" but was changed to a "0" (in accordance with the process for checking the contents of the destination index position $(x_i', y_i')$, as described above) is shown as a "Y." It should be understood that the same process may be used to generate the remapping relationships for sub-screens 2-8. FIG. 23 depicts sub-screens 1-8 that are generated using the process of FIG. 7.

Generation of Screen and Inverse Screen:

FIG. 24 depicts a screen that is generated from assembling sub-screens 1-8 of FIG. 23. FIG. 25 depicts the screen of FIG. 24 provided with both index positions and cell references. FIG. 26 depicts the inverse screen corresponding to the screen of FIG. 25 provided with both index positions and cell references.

Generation of XOR Blocks:

FIG. 27 depicts the seed of LFSR A, which is created from LFSR object 0 (LO_0) of FIG. 15A with an LFSR seed length (λ) of 129 bits and a start bit position (i) of 199—i.e., 129 consecutive bits of LFSR object 0 (LO_0) starting at bit 199. FIGS. 28A-28B depict the first 48 steps of LFSR A (with some bits omitted) using taps at index positions 123 and 128, wherein an LFSR rate (ρ) of 16 is used to determine the steps from which the first three XOR blocks are created—i.e., steps 16 (ρ), 32 (2ρ) and 48 (3ρ) shown in black. FIG. 29 depicts the first three XOR blocks generated by LFSR A (forward and reverse) for input data block 0, input data block 1, and input data block 2. It should be understood that additional steps of LFSR A would be performed to create XOR blocks for additional input data blocks.

FIG. 30 depicts the seed of LFSR B, which is created from LFSR object 2 (LO_2) of FIG. 15A with an LFSR seed length ($\lambda$) of 130 bits and a start bit position (i) of 42—i.e., 130 consecutive bits of LFSR object 2 (LO_2) starting at bit 42. FIGS. 31A-31B depict the first 48 steps of LFSR B (with some bits omitted) using taps at index positions 126 and 129, wherein an LFSR rate ($\rho$) of 16 is used to determine the steps from which the first three XOR blocks are created—i.e., steps 16 ($\rho$), 32 (2$\rho$) and 48 (3$\rho$) shown in black. FIG. 32 depicts the first three XOR blocks generated by LFSR B (forward and reverse) for input data block 0, input data block 1, and input data block 2. It should be understood that additional steps of LFSR B would be performed to create XOR blocks for additional input data blocks.

FIG. 33 depicts the seed of LFSR C, which is created from LFSR object 3 (LO_3) of FIG. 15B with an LFSR seed length ($\lambda$) of 131 bits and a start bit position (i) of 252—i.e., 131 consecutive bits of LFSR object 3 (LO_3) starting at bit 252. FIGS. 34A-34B depict the first 48 steps of LFSR C (with some bits omitted) using taps at index positions 82, 83, 129 and 130, wherein an LFSR rate ($\rho$) of 16 is used to determine the steps from which the first three XOR blocks are created—i.e., steps 16 ($\rho$), 32 (2$\rho$) and 48 (3$\rho$) shown in black. FIG. 35 depicts the first three XOR blocks generated by LFSR C (forward and reverse) for input data block 0, input data block 1, and input data block 2. It should be understood that additional steps of LFSR C would be performed to create XOR blocks for additional input data blocks.

FIG. 36 depicts the seed of LFSR D, which is created from LFSR object 1 (LO_1) of FIG. 15A with an LFSR seed length ($\lambda$) of 132 bits and a start bit position (i) of 18—i.e., 132 consecutive bits of LFSR object 1 (LO_1) starting at bit 18. FIGS. 37A-37B depict the first 48 steps of LFSR D (with some bits omitted) using taps at index positions 102 and 131, wherein an LFSR rate ($\rho$) of 16 is used to determine the steps from which the first three XOR blocks are created—i.e., steps 16 ($\rho$), 32 (2$\rho$) and 48 (3$\rho$) shown in black. FIG. 38 depicts the first three XOR blocks generated by LFSR D (forward and reverse) for input data block 0, input data block 1, and input data block 2. It should be understood that additional steps of LFSR D would be performed to create XOR blocks for additional input data blocks.

FIGS. 39A-39B depict the XOR blocks for input data block 0, input data block 1, and input data block 2 (i.e., four XOR blocks for each input data block). It should be understood that the same approach may be used to generate the four XOR blocks for each of the additional input data blocks.

Data Encryption and Decryption:

FIGS. 40A-40F depict the process of encrypting input data block 0, input data block 1, and input data block 2 using the screen of FIG. 25 and the XOR blocks of FIGS. 39A-39B in accordance with the encryption scheme of FIG. 11. It should be understood that the same process may be used to encrypt additional input data blocks. FIGS. 41A-41F depict the process of decrypting input data block 0, input data block 1, and input data block 2 using the inverse screen of FIG. 26 and the XOR blocks of FIGS. 39A-39B in accordance with the decryption scheme of FIG. 12. It should be understood that the same process may be used to decrypt additional input data blocks.

It should be understood that implementation of this embodiment is not limited to the example provided above and that a variety of other examples are possible within the scope of the present invention. For example, the configuration may use other block sizes, sub-block sizes, number of sub-blocks, and number of XOR blocks. Also, XNOR blocks may be used in place of XOR blocks. In addition, other encryption and decryption schemes may be used. Other modifications will be apparent to one skilled in the art.

II. Computing Devices and Systems

Figure 42:
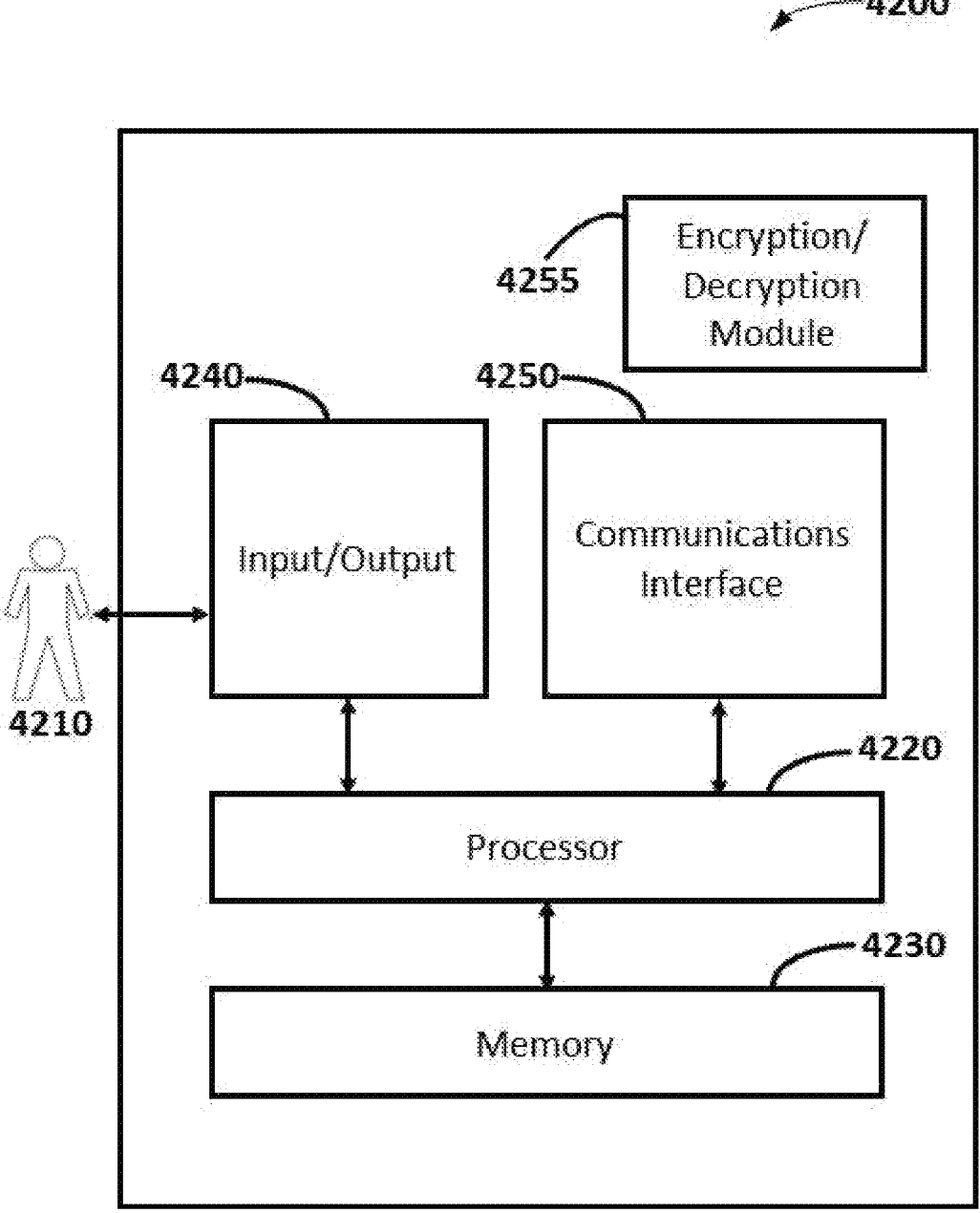
FIG. 42 is a block diagram of an exemplary computing device that enables the encryption and decryption of data.

FIG. 42 illustrates an exemplary computing device 4200 that enables the encryption of data for storage or transport in accordance with the different embodiments of the present invention. Computing device 4200 may comprise any type of computing device capable of performing the functions described herein, including, but not limited to, desktop computing devices, laptop computing devices, computing peripheral devices, smart phones, wearable computing devices, medical computing devices, tablet computing devices, mobile computing devices, vehicular computing devices, and the like. While exemplary components of computing device 4200 will be described below, it should be understood that other components with characteristics that are more or less advanced or functional than those of the described components may alternatively be used in accordance with the present invention.

In the exemplary configuration shown in FIG. 42, computing device 4200 is operated by a user 4210 and generally includes the following components: a processor 4220, a memory area 4230, an input/output unit 4240, a communications interface 4250, and an encryption/decryption module 4255. Of course, other components may also be provided depending on the configuration of the computing device. Each of the components shown in FIG. 42 will be described below.

Processor 4220 is configured to execute instructions stored in memory area 4230 and functions to control input/output unit 4240 and communications interface 4250. The processor may comprise central processing units, microprocessors, microcontrollers, reduced instruction set circuits (RISC), application specific integrated circuits (ASIC), logic circuits (e.g., field-programmable gate array), and any other circuit or processor capable of executing the functions described herein. Processor 4220 may also include one or more processing units, for example, a multi-core configuration. Memory area 4230 may comprise any type of memory that allows data and executable instructions to be stored and retrieved, such as a flash memory drive, digital versatile disc (DVD), compact disc (CD), fixed (hard) drive, diskette, optical disk, magnetic tape, or semiconductor memory such as read-only memory (ROM). The encrypted data blocks generated in accordance with the present invention may be stored in memory area 4230 in any format, including structured formats (e.g., structured files or databases) or unstructured formats.

Preferably, data passing from processor 4220 to memory area 4230 is encrypted via the application of a screen and one or more logic blocks and, conversely, encrypted data passing from memory area 4230 to processor 4220 is decrypted via the application of an inverse screen and one or more logic blocks. The data may be encrypted and decrypted at the file system layer so that the screens and/or logic blocks are applied to all reads and writes to the file system. Alternatively, the encryption and decryption may operate below the file system layer using, for example, a volume manager.

Input/output unit 4240 is configured to receive information from and provide information to user 4210. In some examples, input/output unit 4240 may include an output adapter such as a video adapter and/or an audio adapter. Input/output unit 4240 may alternatively include an output device such as a display device, a liquid crystal display (LCD), an organic light emitting diode (OLED) display, an "electronic ink" display, and/or an audio output device such as a speaker or headphones. Input/output unit 4240 may also include any device, module, or structure for receiving input from user 4210, including, but not limited to, a keyboard, a pointing device, a mouse, a stylus, a touch sensitive panel, a touch pad, a touch screen, a gyroscope, an accelerometer, a position detector, or an audio input device. A single component such as a touch screen may function as both an output device and an input device. Input/output unit 4240 may further include multiple sub-components for carrying out the input and output functions. In other examples, input/output unit 4240 may be of limited functionality or non-functional as in the case of some wearable computing devices.

Communication interface 4250 is configured to enable communication with a remote device, such as a remote server, a remote computing device, or any other suitable system. Communication interface 4250 may include, for example, a wired or wireless network adapter or a wireless data transceiver for use with a mobile data network or Worldwide Interoperability for Microwave Access (WiMAX).

Encryption/decryption module 4255 is configured to enable the encryption, decryption, and data security functions described herein. Specifically, encryption/decryption module 4255 includes instructions that are executed by processor 4220 to generate the screens, inverse screens and logic blocks and then apply those screens, inverse screens and logic blocks to encrypt and decrypt a plurality of data blocks, as described generally above.

Figure 43:
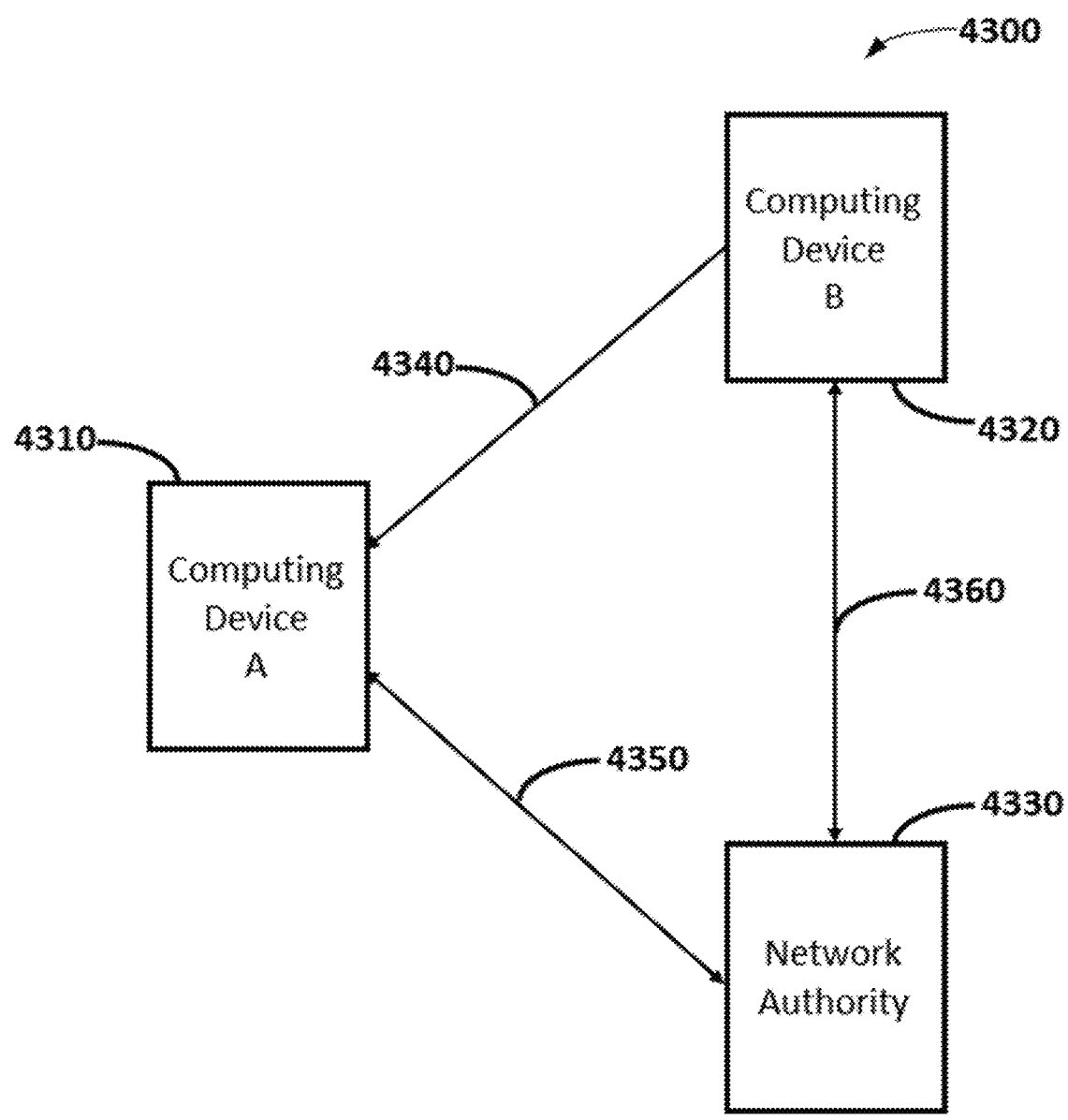
FIG. 43 is a block diagram of an exemplary system that enables the transport of encrypted data between first and second computing devices.

FIG. 43 is a block diagram of an exemplary system 4300 that enables the transport of encrypted data between a first computing device 4310 and a second computing device 4320 in accordance with the present invention. The configurations of first computing device 4310 and second computing device 4320 are the same as that of computing device 4200 shown in FIG. 42. In system 4300, a network authority 4330 is also provided to manage transport level encryption for data transmitted between first computing device 4310 and second computing device 4320.

As can be seen, first computing device 4310 is in communication with second computing device 4320 via a communication link 4340. Also, first computing device 4310 is in communication with network authority 4330 via a communication link 4350 and, similarly, second computing device 4320 is in communication with network authority 4330 via a communication link 4360. Communication links 4340, 4350 and 4360 represent any suitable wired or wireless communication links known in the art, including, but not limited to, those provided by the Internet or any other computer network.

Figure 44:
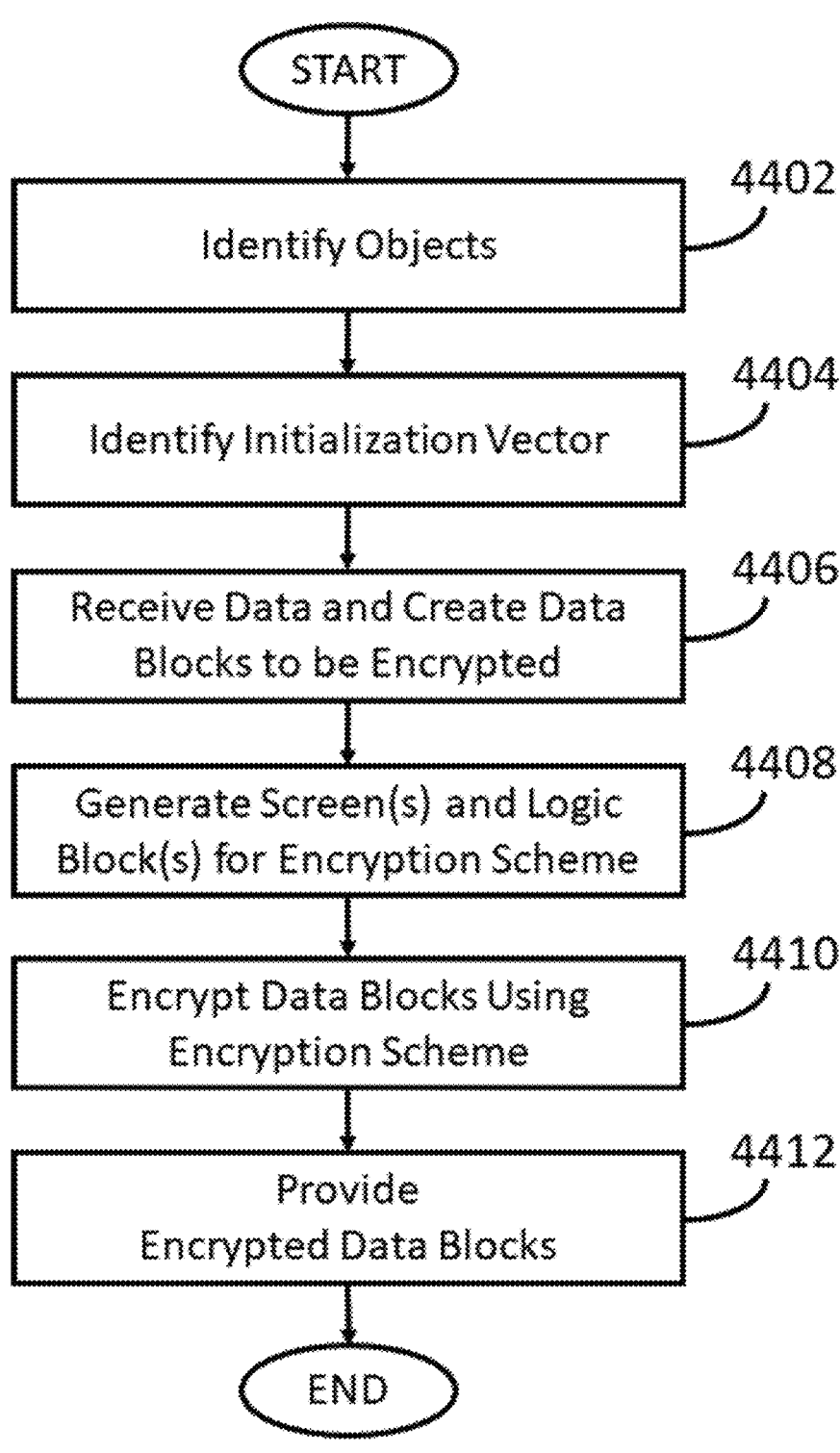
FIG. 44 is a flowchart of an exemplary data encryption method performed by the computing device of FIG. 42 or one of the computing devices of FIG. 43.

FIG. 44 is a flowchart of an exemplary data encryption method performed by computing device 4200 of FIG. 42 (or one of the computing devices of FIG. 43). In step 4402, computing device 4200 identifies the objects to be used in the encryption scheme. As described above, the objects may comprise a setup object set and an LFSR object set. In step 4404, computing device 4200 identifies an initialization vector to be used in the encryption scheme.

In step 4406, computing device 4200 receives data, identifies a plurality of data segments to be encrypted, and positions the bits of the data segments within index blocks to generate a plurality of data blocks. In step 4408, computing device 4200 generates one or more screen(s) and logic block(s) to be used in the encryption scheme. In step 4410, computing device 4200 encrypts each of the data blocks by applying the screen(s) and logic block(s) in accordance with the encryption scheme. Finally, in step 4412, computing device 4200 provides the encrypted data blocks for storage in memory area 4230. Alternatively, computing device 4200 may transport the encrypted data blocks to another computing device or to a remote server for storage.

Figure 45:
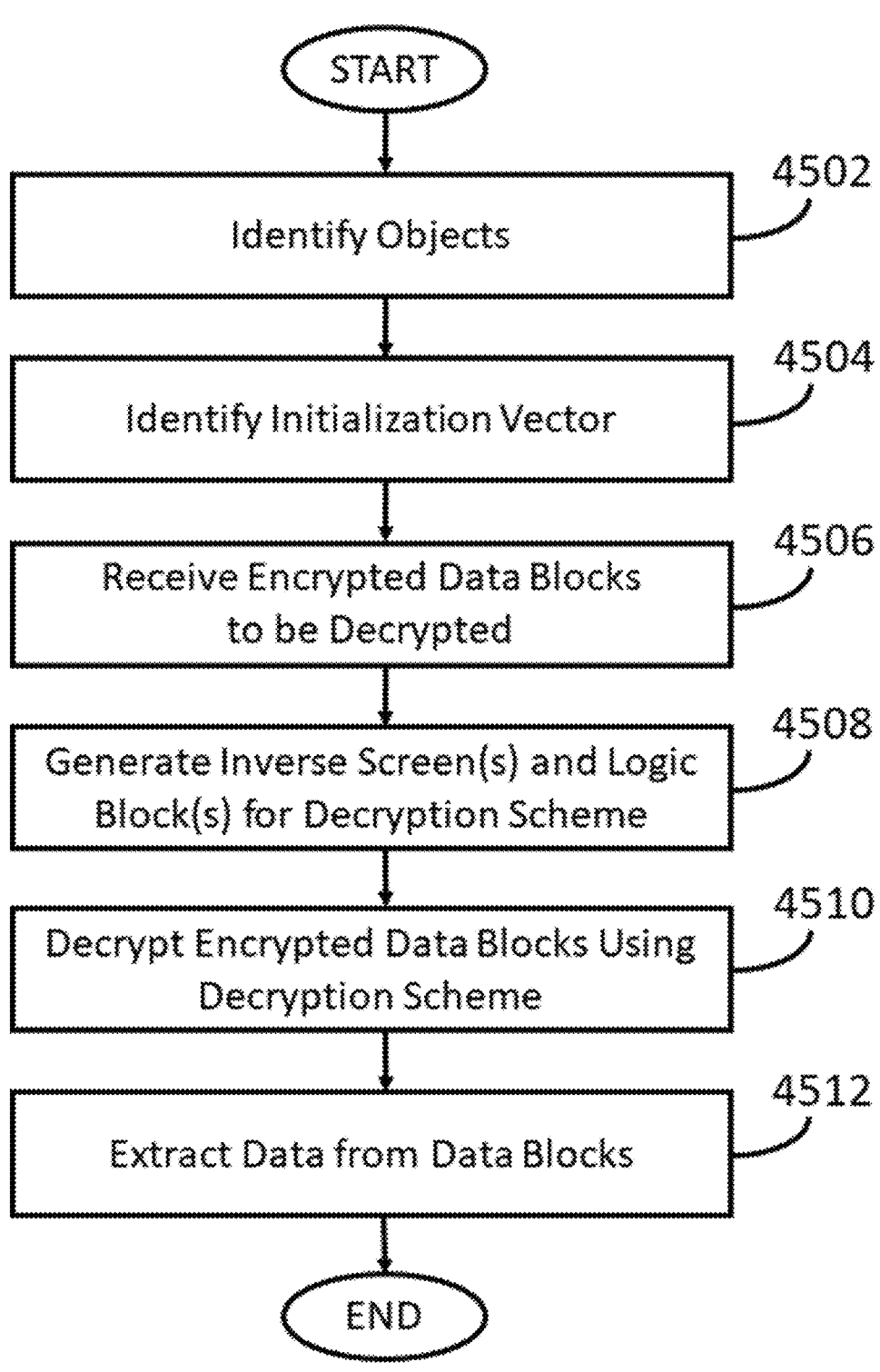
FIG. 45 is a flowchart of an exemplary data decryption method performed by the computing device of FIG. 42 or one of the computing devices of FIG. 43.

FIG. 45 is a flowchart of an exemplary data decryption method performed by computing device 4200 of FIG. 42 (or one of the computing devices of FIG. 43). In step 4502, computing device 4200 identifies the objects to be used in the decryption scheme. As described above, the objects may comprise a setup object set and an LFSR object set. In step 4504, computing device 4200 identifies an initialization vector to be used in the decryption scheme.

In step 4506, computing device 4200 receives previously encrypted data blocks to be decrypted. In step 4508, computing device 4200 generates one or more screen(s) and logic block(s) to be used in the decryption scheme. In step 4510, computing device 4200 decrypts each of the data blocks by applying the screen(s) and logic block(s) in accordance with the decryption scheme. Finally, in step 4512, computing device 4200 extracts the data from the decrypted data blocks in order to allow authorized users (e.g., users with the appropriate objects) to access the data.

One skilled in the art will appreciate that the data encryption and decryption methods described above in connections with FIGS. 44 and 45 may be implemented using any computer programming or engineering techniques including computer software, firmware, hardware or any combination or subset thereof. Any computer program, having computer-readable code means, may be embodied or provided within one or more computer-readable media, thereby making a computer program product, i.e., an article of manufacture. Computer-readable storage media are tangible and non-transitory and store information such as computer-readable instructions, data structures, program modules, and other data.

Computing devices that implement the encryption and decryption methods of the present invention provide several advantages that are not available from many existing encryption/decryption methodologies. For example, the encryption and decryption methods support error correcting code so as to increase reliability. Also, the encryption and decryption methods increase the efficiency and reduce the power consumption of the computing device, and may increase throughput—i.e., the amount of data moved from one place to another in a given time period. In addition, the encryption and decryption methods are flexible and may provide increased data security. Further, the encryption and decryption methods enable the use of smaller block sizes to support lower-latency applications. Finally, the encryption and decryption methods enable a larger volume of data to be secured by selecting a larger quantity of logic blocks and/or larger LFSR objects. Of course, other advantages will be apparent to one skilled in the art.

III. General Information

The description set forth above provides several exemplary embodiments of the inventive subject matter. Although each exemplary embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The use of any and all examples or exemplary language (e.g., "such as") provided with respect to certain embodiments is intended merely to better describe the invention and does not pose a limitation on the scope of the invention. No language in the description should be construed as indicating any non-claimed element essential to the practice of the invention.

The use of relative relational terms, such as first and second, top and bottom, and left and right, are used solely to distinguish one unit or action from another unit or action without necessarily requiring or implying any actual such relationship or order between such units or actions. For example, while the index blocks referenced herein require a certain spatial relationship between index positions of the index blocks, any equivalent structures may be used. Also, as described herein, the objects do not require any particular format, size, or definition other than to allow for the creation of the screens as described herein.

The use of the terms "comprises," "comprising," or any other variation thereof, are intended to cover a non-exclusive inclusion, such that a process, method, device, or system that comprises a list of elements does not include only those elements, but may include other elements not expressly listed or inherent to such process, method, device, or system.

While the present invention has been described and illustrated hereinabove with reference to several exemplary embodiments, it should be understood that various modifications could be made to these embodiments without departing from the scope of the invention. Therefore, the present invention is not to be limited to the specific configurations or methodologies of the exemplary embodiments, except insofar as such limitations are included in the following claims.

What is claimed and desired to be secured by Letters Patent is as follows:

1. A data encryption method using one or more linear-feedback shift registers (LFSRs), comprising: identifying one or more objects each of which comprises a sequence of object bits; identifying an LFSR rate associated with each of the objects; using each of the objects to generate a plurality of logic blocks by (a) creating an LFSR seed comprising at least a portion of the object bits of the object, wherein the LFSR seed provides an initial state of an LFSR, (b) implementing the LFSR to generate a plurality of LFSR outputs, and (c) using the LFSR outputs to generate the logic blocks, wherein using the LSFR outputs to generate the logic blocks comprises (1) selecting a plurality of the LFSR outputs based on the LFSR rate, and (2) truncating each of the selected LFSR outputs based on a block size to generate the logic blocks; and encrypting a plurality of data blocks in accordance with an encryption scheme that performs a bit modification operation in connection with each of the data blocks using one of the logic blocks generated from each of the objects.

2. The data encryption method of claim 1, further comprising identifying a start bit position and an LFSR seed length associated with each of the objects, and wherein the LFSR seed generated from each of the objects comprises a plurality of consecutive object bits in which (a) the consecutive object bits start at the start bit position associated with the object and (b) a number of the consecutive object bits equals the LFSR seed length associated with the object.

3. The data encryption method of claim 1, further comprising identifying a plurality of tap bit positions and an LFSR direction associated with each of the objects, and wherein the LFSR uses the tap bit positions and the LFSR direction associated with the object to generate the LFSR outputs.

4. The data encryption method of claim 3, wherein the LFSR performs a plurality of steps each of which generates one of the LFSR outputs by (a) analyzing the object bits located at the tap bit positions to determine an output bit for placement into a specified index position of the LFSR output and (b) shifting the object bits in the LFSR direction for placement into a plurality of additional specified index positions of the LFSR output.

5. The data encryption method of claim 1, further comprising identifying an object position associated with each of the objects, and wherein the logic blocks generated for each of the data blocks are applied in an order determined by the object position of each of the objects.

6. The data encryption method of claim 1, wherein a number of the objects equals a number of the logic blocks generated for each of the data blocks.

7. The data encryption method of claim 1, wherein each of the logic blocks comprises an exclusive OR (XOR) block.

8. The data encryption method of claim 1, wherein each of the logic blocks comprises an exclusive NOR (XNOR) block.

9. The data encryption method of claim 1, wherein each of the data blocks comprises a plurality of bits positioned in an index block comprising a plurality of index positions.

10. The data encryption method of claim 9, wherein each of the index positions contains one of the bits.

11. The data encryption method of claim 9, wherein each of the index positions contains a plurality of the bits.

12. The data encryption method of claim 9, wherein the encryption scheme also performs a bit remapping operation using a screen that identifies a correspondence between a plurality of initial index positions and a plurality of remapped index positions within the index block.

13. The data encryption method of claim 12, wherein the screen is generated based on a first object and a second object, wherein the first object comprises a sequence of bits and the second object comprises a sequence of integers.

14. The data encryption method of claim 13, wherein the first object is generated from a public binary setup object and a private binary setup object.

15. The data encryption method of claim 14, wherein the public binary setup object is unique to an encryption session.

16. The data encryption method of claim 13, wherein the second object comprises a private integer setup object.

17. The data encryption method of claim 13, wherein the screen is generated based on a set of movement instructions in which the bits of the first object are paired with the integers of the second object to create a set of bit/integer pairs, wherein the bit of each of the bit/integer pairs indicates a direction of bit movement within the index block and the integer of each of the bit/integer pairs indicates an offset of bit movement within the index block.

18. The data encryption method of claim 17, wherein the screen is further generated based on a mask.

19. The data encryption method of claim 18, wherein the screen is further generated based on an offset vector.

20. The data encryption method of claim 19, wherein the offset vector comprises a public integer pair that is unique to an encryption session.

21. A data encryption method using a plurality of linear-feedback shift registers (LFSRs), comprising: creating a plurality of data blocks each of which comprises a plurality of bits; identifying an LFSR rate associated with each of the objects; generating a plurality of logic blocks for each of the data blocks, wherein the logic blocks are generated by: (a) identifying a plurality of objects each of which comprises a sequence of object bits and (b) processing each of the objects by (i) creating an LFSR seed comprising at least a portion of the object bits of the object, wherein the LFSR seed provides an initial state of an LFSR, (ii) implementing the LFSR to generate a plurality of LFSR outputs, and (iii) using the LFSR outputs to generate one of the logic blocks for each of the data blocks, wherein using the LSFR outputs to generate the logic blocks comprises (1) selecting a plurality of the LFSR outputs based on the LFSR rate and (2) truncating each of the selected LFSR outputs based on a block size to generate the logic blocks; generating at least one screen; and encrypting the data blocks in accordance with an encryption scheme that transforms a data block into an encrypted data block by: (a) modifying the bits of the data block using one or more of the logic blocks generated for the data block to thereby generate a first intermediate state data block; (b) remapping the modified bits of the first intermediate state data block using the at least one screen to thereby generate a second intermediate state data block; and (c) modifying the remapped bits of the second intermediate state data block using one or more of the logic blocks generated for the data block to thereby generate the encrypted data block.

22. The data encryption method of claim 21, further comprising identifying a start bit position and an LFSR seed length associated with each of the objects, and wherein the LFSR seed generated from each of the objects comprises a plurality of consecutive object bits in which (a) the consecutive object bits start at the start bit position associated with the object and (b) a number of the consecutive object bits equals the LFSR seed length associated with the object.

23. The data encryption method of claim 21, further comprising identifying a plurality of tap bit positions and an LFSR direction associated with each of the objects, and wherein the LFSR uses the tap bit positions and the LFSR direction associated with the object to generate the LFSR outputs.

24. The data encryption method of claim 23, wherein the LFSR performs a plurality of steps each of which generates one of the LFSR outputs by (a) analyzing the object bits located at the tap bit positions to determine an output bit for placement into a specified index position of the LFSR output and (b) shifting the object bits in the LFSR direction for placement into a plurality of additional specified index positions of the LFSR output.

25. The data encryption method of claim 21, further comprising identifying an object position associated with each of the objects, and wherein the logic blocks generated for each of the data blocks are applied in an order determined by the object position of each of the objects.

26. The data encryption method of claim 21, wherein a number of the objects equals a number of the logic blocks generated for each of the data blocks.

27. The data encryption method of claim 21, wherein each of the logic blocks comprises an exclusive OR (XOR) block.

28. The data encryption method of claim 21, wherein each of the logic blocks comprises an exclusive NOR (XNOR) block.

29. The data encryption method of claim 21, wherein each of the data blocks comprises a plurality of bits positioned in an index block comprising a plurality of index positions.

30. The data encryption method of claim 29, wherein each of the index positions contains one of the bits.

31. The data encryption method of claim 29, wherein each of the index positions contains a plurality of the bits.

32. The data encryption method of claim 29, wherein the screen identifies a correspondence between a plurality of initial index positions and a plurality of remapped index positions within the index block.

33. The data encryption method of claim 32, wherein the screen is generated based on a first object and a second object, wherein the first object comprises a sequence of bits and the second object comprises a sequence of integers.

34. The data encryption method of claim 33, wherein the first object is generated from a public binary setup object and a private binary setup object.

35. The data encryption method of claim 34, wherein the public binary setup object is unique to an encryption session.

36. The data encryption method of claim 33, wherein the second object comprises a private integer setup object.

37. The data encryption method of claim 33, wherein the screen is generated based on a set of movement instructions in which the bits of the first object are paired with the integers of the second object to create a set of bit/integer pairs, wherein the bit of each of the bit/integer pairs indicates a direction of bit movement within the index block and the integer of each of the bit/integer pairs indicates an offset of bit movement within the index block.

38. The data encryption method of claim 37, wherein the screen is further generated based on a mask.

39. The data encryption method of claim 38, wherein the screen is further generated based on an offset vector.

40. The data encryption method of claim 39, wherein the offset vector comprises a public integer pair that is unique to an encryption session.

41. The data encryption method of claim 21, further comprising one or both of (a) storing the encrypted data block as a representation of the data block and (b) transporting the encrypted data block as a representation of the data block.

42. The data encryption method of claim 21, wherein the encryption scheme is implemented in a single round.

43. A data encryption and decryption method using a plurality of linear-feedback shift registers (LFSRs), comprising: creating a plurality of data blocks each of which comprises a plurality of bits; generating a first logic block, a second logic block, a third logic block, and a fourth logic block for each of the data blocks using a first LFSR, a second LFSR, a third LFSR and a fourth LFSR, respectively; generating an encryption screen; generating a decryption screen; encrypting the data blocks into a plurality of corresponding encrypted data blocks in accordance with an encryption scheme that transforms a data block into an encrypted data block by applying the encryption screen and the first logic block, the second logic block, the third logic block, and the fourth logic generated for the data block, wherein the first and second logic blocks are applied before the encryption screen and the third and fourth logic blocks are applied after the encryption screen; and decrypting the encrypted data blocks into the corresponding data blocks in accordance with a decryption scheme that transforms the encrypted data block into the data block by applying the decryption screen and the first logic block, the second logic block, the third logic block, and the fourth logic generated for the data block, wherein the third and fourth logic blocks are applied before the decryption screen and the first and second logic blocks are applied after the decryption screen.

44. The data encryption method of claim 43, wherein the first LFSR and the third LFSR are each implemented using a forward LFSR direction and the second LFSR and the fourth LFSR are each implemented using a reverse LFSR direction.

45. The data encryption method of claim 43, wherein each of the logic blocks comprises an exclusive OR (XOR) block.

46. The data encryption method of claim 43, wherein each of the logic blocks comprises an exclusive NOR (XNOR) block.

47. The data encryption method of claim 43, wherein each of the data blocks comprises a plurality of bits positioned in an index block comprising a plurality of index positions.

48. The data encryption method of claim 47, wherein each of the index positions contains one of the bits.

49. The data encryption method of claim 47, wherein each of the index positions contains a plurality of the bits.

50. The data encryption method of claim 47, wherein the screen identifies a correspondence between a plurality of initial index positions and a plurality of remapped index positions within the index block, and wherein the inverse screen identifies a correspondence between the remapped index positions and the initial index positions within the index block.

* * * * *